(12) United States Patent
Matsuda et al.

(10) Patent No.: US 6,313,462 B1
(45) Date of Patent: Nov. 6, 2001

(54) INFRARED-RAYS DETECTOR

(75) Inventors: Hiroshi Matsuda, Hirakata; Yuji Takada, Kyoto; Teruki Hatatani, Sanda, all of (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 09/257,509

(22) Filed: Feb. 25, 1999

(30) Foreign Application Priority Data

| Feb. 27, 1998 | (JP) | 10-046488 |
| Jun. 26, 1998 | (JP) | 10-180556 |
| Jul. 29, 1998 | (JP) | 10-213838 |
| Jul. 29, 1998 | (JP) | 10-214042 |
| Aug. 31, 1998 | (JP) | 10-244214 |
| Nov. 25, 1998 | (JP) | 10-333667 |

(51) Int. Cl.$^7$ .............................. G01J 5/10; G08B 13/18
(52) U.S. Cl. ............................ 250/338.3; 340/567
(58) Field of Search ........................ 250/338.1, 338.3, 250/338.2, 339.14, 342, 221; 340/567

(56) References Cited

U.S. PATENT DOCUMENTS

| 4,612,442 | * | 9/1986 | Toshimichi | 250/353 |
| 4,764,755 | * | 8/1988 | Pedtke et al. | 340/541 |
| 5,101,194 | * | 3/1992 | Sheffer | 340/567 |
| 5,107,120 | * | 4/1992 | Tom | 250/342 |
| 5,317,620 | * | 5/1994 | Smith | 379/40 |
| 5,369,269 | * | 11/1994 | Fukuda et al. | 250/221 |
| 5,917,187 | * | 6/1999 | Takada et al. | 250/338.3 |

FOREIGN PATENT DOCUMENTS

| 04350796 | 12/1992 | (JP) . |
| 7270546 | 10/1995 | (JP) . |
| 8184494 | 7/1996 | (JP) . |

OTHER PUBLICATIONS

Patent Abstracts of Japan, vol. 96, No. 2(013), Feb. 29, 1996.
Patent Abstracts of Japan, vol. 96, No. 11(022), Nov. 29, 1996.
English language Abstract, JP No. 04–350796.

* cited by examiner

*Primary Examiner*—Constantine Hannaher
*Assistant Examiner*—Albert Gagliardi
(74) *Attorney, Agent, or Firm*—Greenblum & Bernstein, P.L.C.

(57) ABSTRACT

In an infrared-rays detector, a pyroelectric element detects existence or movement of a human body, and the output signal of the pyroelectric element is converted to a voltage signal. Then, the voltage signal is subjected to waveform analysis. Then, a detection signal is outputted only when a waveform generated by a human body is detected by the waveform analysis. For example, the voltage signal is amplified at two different frequency ranges, and the amplified signals are used for discriminating a signal due to a human body. Then, a noise such as a popcorn noise of the pyroelectric element is prevented to be detected erroneously as generated by a human body.

26 Claims, 54 Drawing Sheets

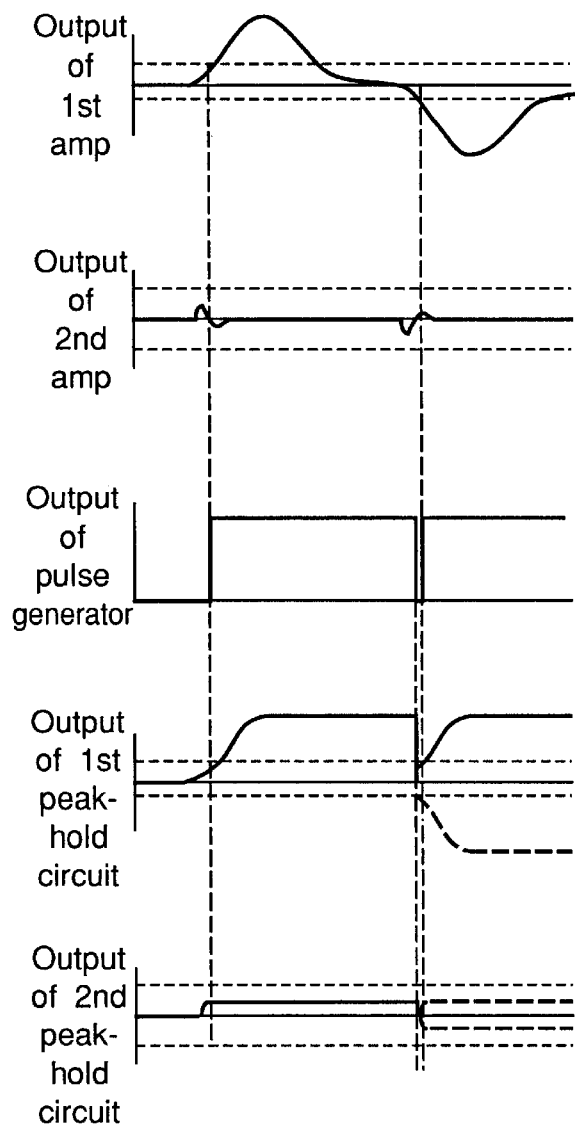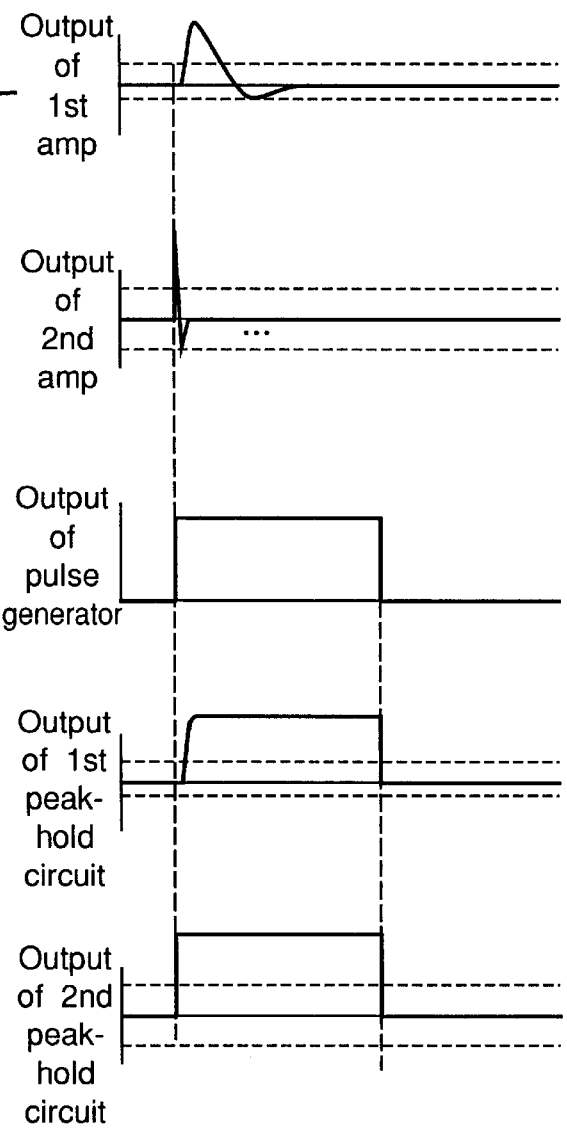

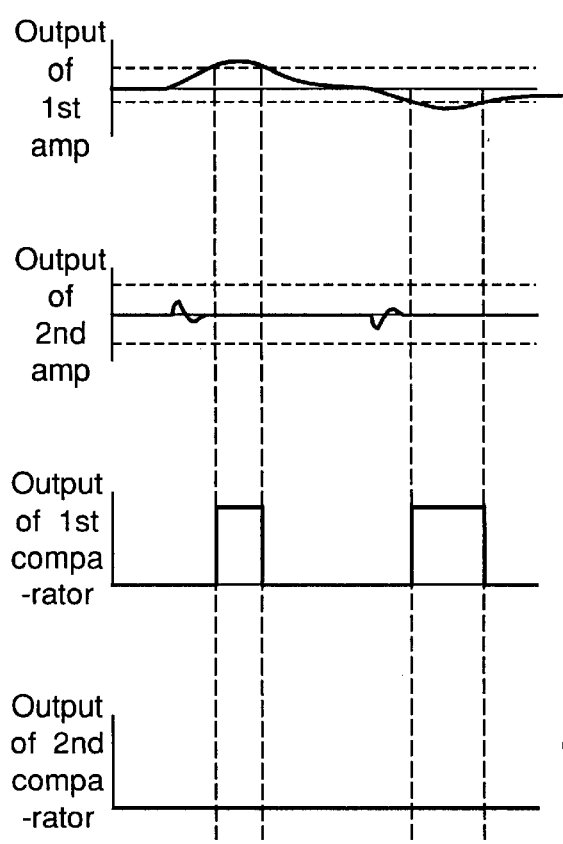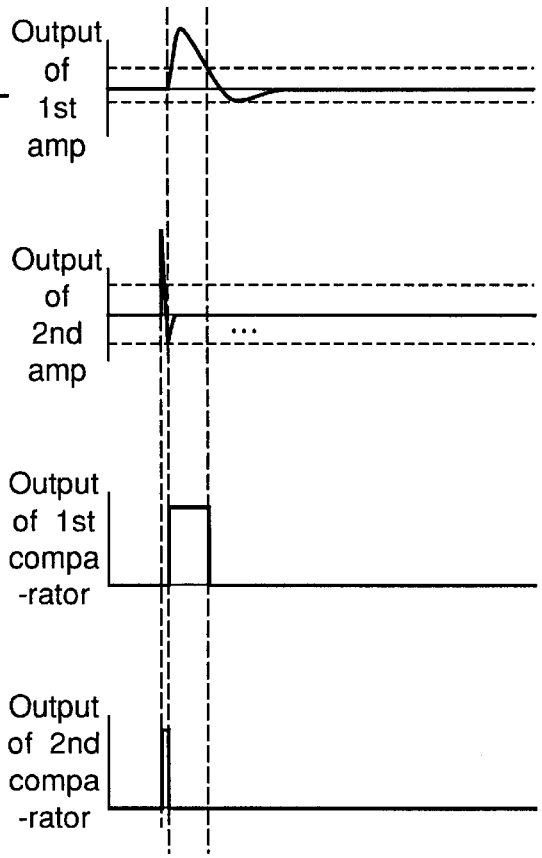

INFRARED-RAYS DETECTOR

BACKGROUND OF THE INVENTION

1. Field of the Invention

The present invention relates to an infrared-rays detector for detecting infrared energy radiated from a human body in order to detect the existence or movement of a human body.

2. Description of the Prior Art

A pyroelectric element is used widely to detect infrared-rays radiated from a human body. The pyroelectric element set for each of monitor areas outputs a current in correspondence to infrared radiation. Then, in an infrared-rays detector, a current-to-voltage converter converts the current to a voltage, and a voltage amplifier amplifies the voltage. When the output voltage exceeds a predetermined level, it is decided that a human body is detected, and a detection signal which means that a human body exists or moves in the monitor area is outputted.

The infrared-rays detector is designed to have the frequency characteristic for movement of a human body, and it has a characteristic of band-pass filter having a center of transmission band at about 1 Hz. Then, the sensitivity to a human body is enhanced, and a malfunction is prevented to be caused by signals at frequencies irrelevant to movement of a human body.

However, the pyroelectric element outputs a one-shot noise called as popcorn noise disadvantageously. It is thought that the popcorn noise is ascribed to generation of unnecessary electric charges in the pyroelectric element, and the unnecessary electric charges are generated by compression or tensile stress centered at defects in materials of a pyroelectric plate or electrodes or at pitchings, microcracks or the like generated by dicing or the like, due to differences in thermal expansion coefficient in a pyroelectric plate, electrodes, a support, an adhesive agent, a circuit board or the like in the pyroelectric element.

Previously, in order to reduce the occurrence of the popcorn noise as one-shot output noise, it is proposed to optimize the materials for the support, the circuit board, the electrically conductive adhesive, or the like, or to change the structure of the pyroelectric element. However, even if such proposals are adopted, the occurrence of the popcorn noise cannot be suppressed completely in the infrared-rays detector, and a malfunction is liable to be caused by the popcorn noise.

SUMMARY OF THE INVENTION

The invention intends to solve the problems and its object is to provide an infrared-rays detector which does not operate erroneously when a popcorn noise occurs.

An infrared-rays detector according to the invention comprises a pyroelectric element, a current-to-voltage converter which converts a current from the pyroelectric element to a voltage signal, and a signal processor which performs waveform analysis on the voltage signal received from the current-to-voltage converter and outputs a detection signal only when a waveform generated by a human body is detected by the waveform analysis. The signal processor may be realized in various ways as explained below.

For example, the signal processor comprises an amplifier which amplifies the voltage signal received from the current-to-voltage converter, a frequency analyzer which performs frequency analysis on an output signal of the amplifier, and a decision circuit which detects a waveform generated by a human body based on frequency components obtained by the frequency analyzer.

For example, the signal processor comprises a first amplifier which amplifies the voltage signal received from the current-to-voltage converter in a frequency range, and a second amplifier which amplifies the voltage signal received from the current-to-voltage converter in a frequency range different from that of the first amplifier, and a decision circuit which detects the waveform generated by a human body according to a ratio of amplitude levels of output signals of the first and second amplifiers.

For example, the signal processor comprises a first amplifier which amplifies the voltage signal received from the current-to-voltage converter in a frequency range, a second amplifier which amplifies the voltage signal received from the current-to-voltage converter in a frequency range different from that of the first amplifier, and a first comparator which compares an output signal of the first amplifier with a first threshold level, a second comparator which compares an output signal of the second amplifier with a second threshold level, a decision circuit which detects the waveform generated by a human body according to comparison signals of the first and second comparators.

For example, the signal processor comprises an amplifier which amplifies the voltage signal received from the current-to-voltage converter, and a frequency analyzer which performs frequency analysis on an output signal of the amplifier, and a decision circuit which detects the waveform generated by a human body according to time dependence of a result of the frequency analysis by the frequency analyzer.

For example, the signal processor comprises an amplifier which amplifies the voltage signal received from the current-to-voltage converter, a comparator which compares an output signal of the first amplifier with a threshold level, and a decision circuit which detects the waveform generated by a human body according to a length of time when the comparator detects that an output of the amplifier exceeds the threshold level.

For example, the signal processor comprises a first amplifier which amplifies the voltage signal received from the current-to-voltage converter in a frequency range, a second amplifier which amplifies the voltage signal received from the current-to-voltage converter in a frequency range different from that of the first amplifier, a first comparator which compares an output signal of the first amplifier with a first threshold level, a second comparator which compares an output signal of the second amplifier with a second threshold level, a decision circuit which measures pulse widths of output signals of the first and second comparators and detects the waveform generated by a human body according to the two pulse widths.

For example, the signal processor comprises an amplifier which amplifies the voltage signal received from the current-to-voltage converter, and a decision circuit which measures a rise time of an output signal of the amplifier and detects the waveform generated by a human body according to the rise time.

For example, the signal processor comprises a first amplifier which amplifies the voltage signal received from the current-to-voltage converter with a first band-pass filter characteristic having a center of transmission band at a first frequency, an output circuit which compares an output signal of the first amplifier with a predetermined threshold to output the detection signal, a second amplifier which amplifies the voltage signal received from the current-to-voltage converter with a second band-pass filter characteristic having a center of transmission band at a second frequency higher than the first frequency, a popcorn noise detector which compares an output signal of the second amplifier with a threshold value to output a popcorn detection signal, and a controller which controls at least one of the current-to-voltage converter, the first amplifier, said output circuit, the second amplifier and the popcorn noise detector to prevent that the controller outputs the detection signal when the popcorn detection signal is received from the popcorn noise detector. For example, when the popcorn detection signal is received from the popcorn noise detector, the controller decreases a gain of the current-to-voltage converter for a predetermined time, decreases a gain of the first amplifier for a predetermined time, or the controller decreases an output signal of the output circuit for a predetermined time, decreases a gain of the second amplifier for a predetermined time, or decreases a sensitivity to detect a popcorn signal by increasing a threshold of the popcorn detector for a predetermined time. When the controller controls at least two of them, a component located in the upstream side in the flow of signal is controlled for a first predetermined time shorter than a second predetermined time for a component located in the down stream side with respect to the former component.

Further, in the infrared-rays detector, the controller controls the output circuit to output an analog signal different from the output signal of the first voltage amplifier for a predetermined time when the popcorn detection signal is received from the popcorn noise detector. For example, the different signal is a reference voltage generated in a circuit of the infrared-rays detector, the ground potential in the circuit of the infrared-rays detector, an external supply voltage from an external voltage source, an oscillating signal supplied from an oscillator. Alternatively, the controller comprises a switch for supplying the detection signal, and an output signal of the switch has high impedance for a predetermined time when the popcorn detection signal is received from the popcorn noise detector.

An advantage of the present invention is that a malfunction of an infrared-rays detector due to a popcorn noise is prevented.

BRIEF DESCRIPTION OF THE DRAWINGS

These and other objects and features of the present invention will become clear from the following description taken in conjunction with the preferred embodiments thereof with reference to the accompanying drawings, and in which:

FIG. 9 is a time chart of representative waveforms due to a human body in the infrared-rays detector;

FIG. 10 is a time chart of representative waveforms due to a popcorn noise in the infrared-rays detector;

FIG. 19 is a time chart of representative waveforms due to a human body in the infrared-rays detector;

FIG. 20 is a time chart of representative waveforms due to a popcorn noise in the infrared-rays detector;

DETAILED DESCRIPTION OF THE PREFERRED EMBODIMENTS

Figure 1:
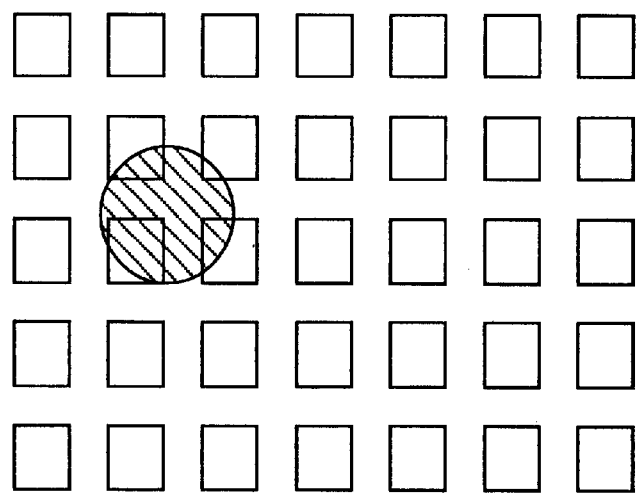
FIG. 1 is a diagram of monitor areas for an infrared-rays detector.

Referring now to the drawings, wherein like reference characters designate like or corresponding parts throughout the views, FIG. 1 shows an example of monitor areas in an optical system for an infrared-rays detector for detecting a human body in the monitor area. The monitor areas are arranged in two dimensions. The optical system condenses infrared rays from an object existing or moving in a monitor area, and a pyroelectric element in the infrared-rays detector receives the condensed infrared rays from a human body. In FIG. 1, a human body is shown schematically with a circle with hatching. An output current of the pyroelectric element is converted to a voltage with a current-to-voltage (I/V) converter. When a signal due to infrared rays of a human body is detected, a detection signal is outputted to inform that a human body is detected in the monitor area.

Figure 2:
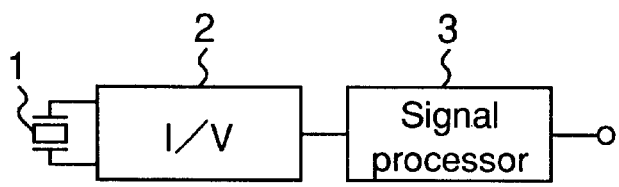
FIG. 2 is a block diagram of an infrared-rays detector according to the invention.

In order to prevent erroneous detection of a human body due to a popcorn noise liable to occur in the pyroelectric element, the infrared-rays detector of the invention analyzes waveform of the signal obtained by the pyroelectric element. As shown in FIG. 2, the infrared-rays detector comprises a pyroelectric element 1, a current-to-voltage (I/V) converter 2, and a signal processor 3. The pyroelectric element 1 set for a monitor area outputs a current in correspondence to infrared radiation, and the I/V converter 2 converts the detected current to a voltage signal. The signal processor 3 analyzes the waveform of the voltage signal and outputs a detection signal only when a waveform generated by a human body is detected by the waveform analysis. The optical system for condensing infrared rays to the pyroelectric element 1 is not shown in FIG. 2 and in drawings to be explained later.

Figure 3:
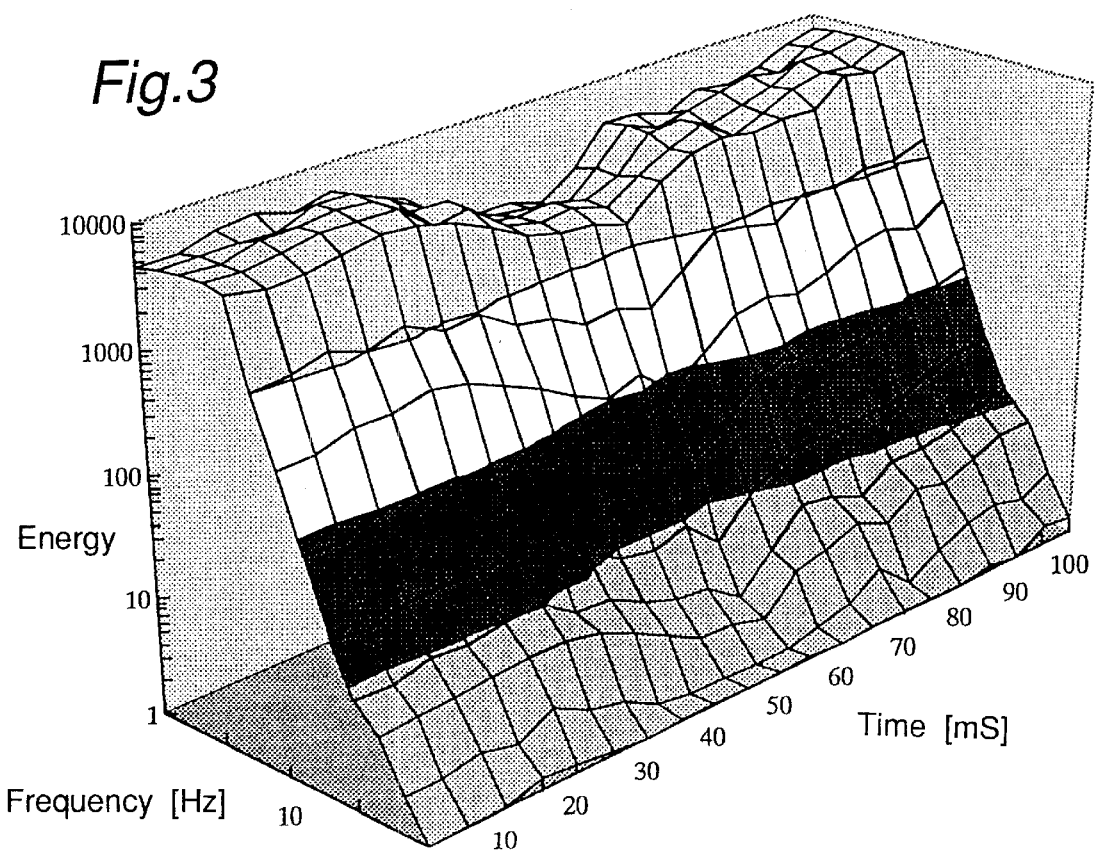
FIG. 3 is a time chart of an example of frequency spectra due to a human body in the monitor area.
Figure 4:
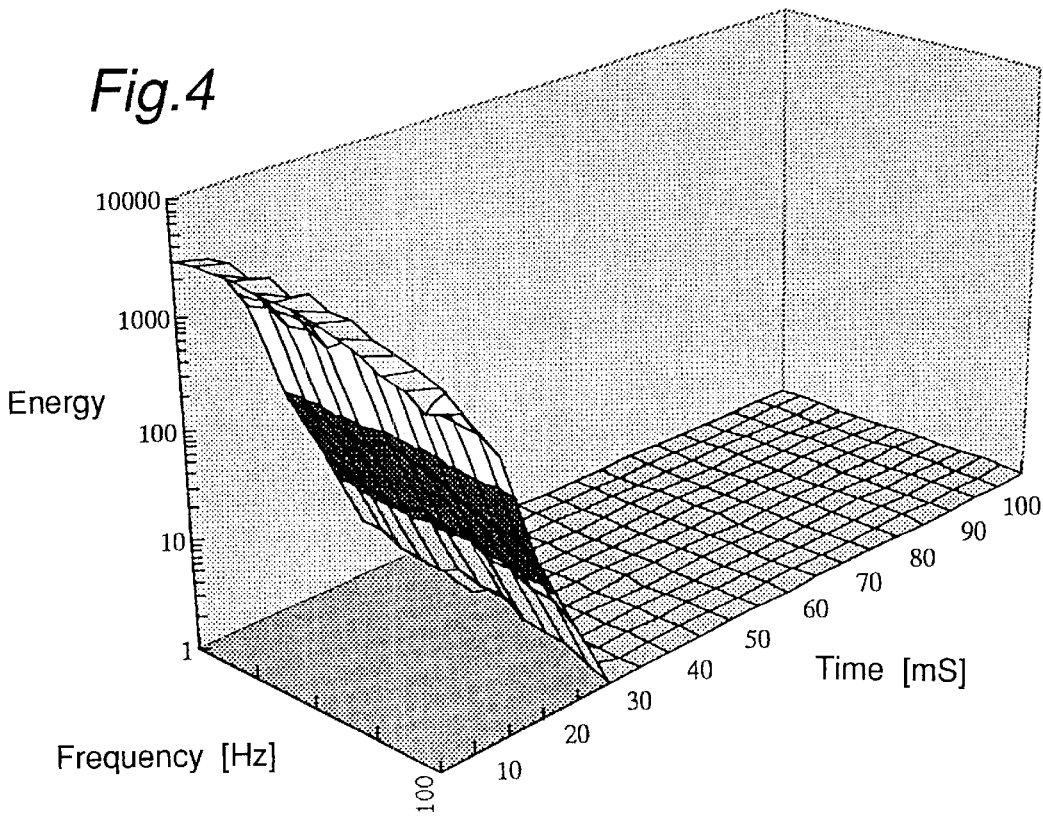
FIG. 4 is a time chart of an example of frequency spectra due to a popcorn noise.

With reference to the analysis of waveforms, FIGS. 3 and 4 show frequency spectra of energy on the output current of the pyroelectric element 1 due to a human body and on a popcorn noise of the pyroelectric element 1, respectively. The frequency spectrum of the signal due to a human body has low frequency components mainly, while that due to a popcorn noise extends to higher frequencies. Further, an external electrical noise also has high frequency components. It is also to be noted that a signal due to the human body is outputted continuously for a relatively long time when a human body moves in the monitor area, while a popcorn noise or an external electrical noise exists only for a short time. The signal processor 3 analyzes the waveform of the input signal and discriminates a signal due to a human body. Then, the signal due to a human body is detected surely, and erroneous detection of the human body is prevented. Because the detection signal is outputted after checking characteristics of waveforms, a malfunction due to a noise such as a popcorn noise is prevented, and a human body is detected with good precision. The signal processor 3 is fabricated in various forms as will be explained below.

Figure 5:
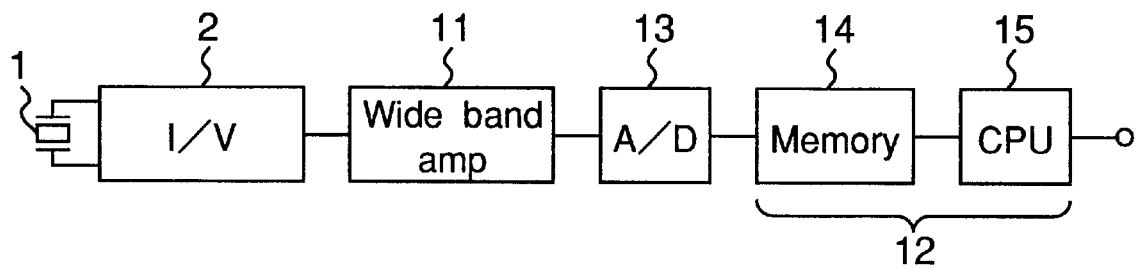
FIG. 5 is a block diagram of an infrared-rays detector of a first embodiment according to the invention.

FIG. 5 shows a block diagram of an infrared-rays detector according to a first embodiment of the invention. The infrared-rays detector comprises a pyroelectric element 1, a current-to-voltage (I/V) converter 2, a wide band amplifier 11 and a waveform analyzer 12. The I/V converter 2 converts an output current of the pyroelectric element 1 to a voltage signal. The amplifier 11 amplifies the output voltage of the I/V converter 2 in a sufficiently wide frequency band. The waveform analyzer 12 analyzes the waveform of the output voltage of the amplifier 11. The waveform analyzer 12 includes an analog-to-digital (A/D) converter 13 which converts an input signal from the amplifier 3 to a digital data, for example, at a constant time interval, a memory device 14 which stores the digital data, and a central processing unit (CPU) 15 for analyzing the waveform based on the digital data received from the A/D converter 13 and the data stored in the memory device 14.

The digital data after the A/D conversion are stored in the memory device 14 for a few seconds, and the CPU 15 calculates frequency distribution of the signals based on the digital data. If signals of low frequency components exist with a power larger than a predetermined level and those of high frequency components equal to or higher than a few tens Hz exist with a power smaller than a predetermined level, a detection signal for human body is outputted. On the contrary, if signals of high frequency components equal to or higher than a few tens Hz exist with a power larger than a predetermined level, they are decided to be noises and a detection signal for human body is not outputted.

Figure 6:
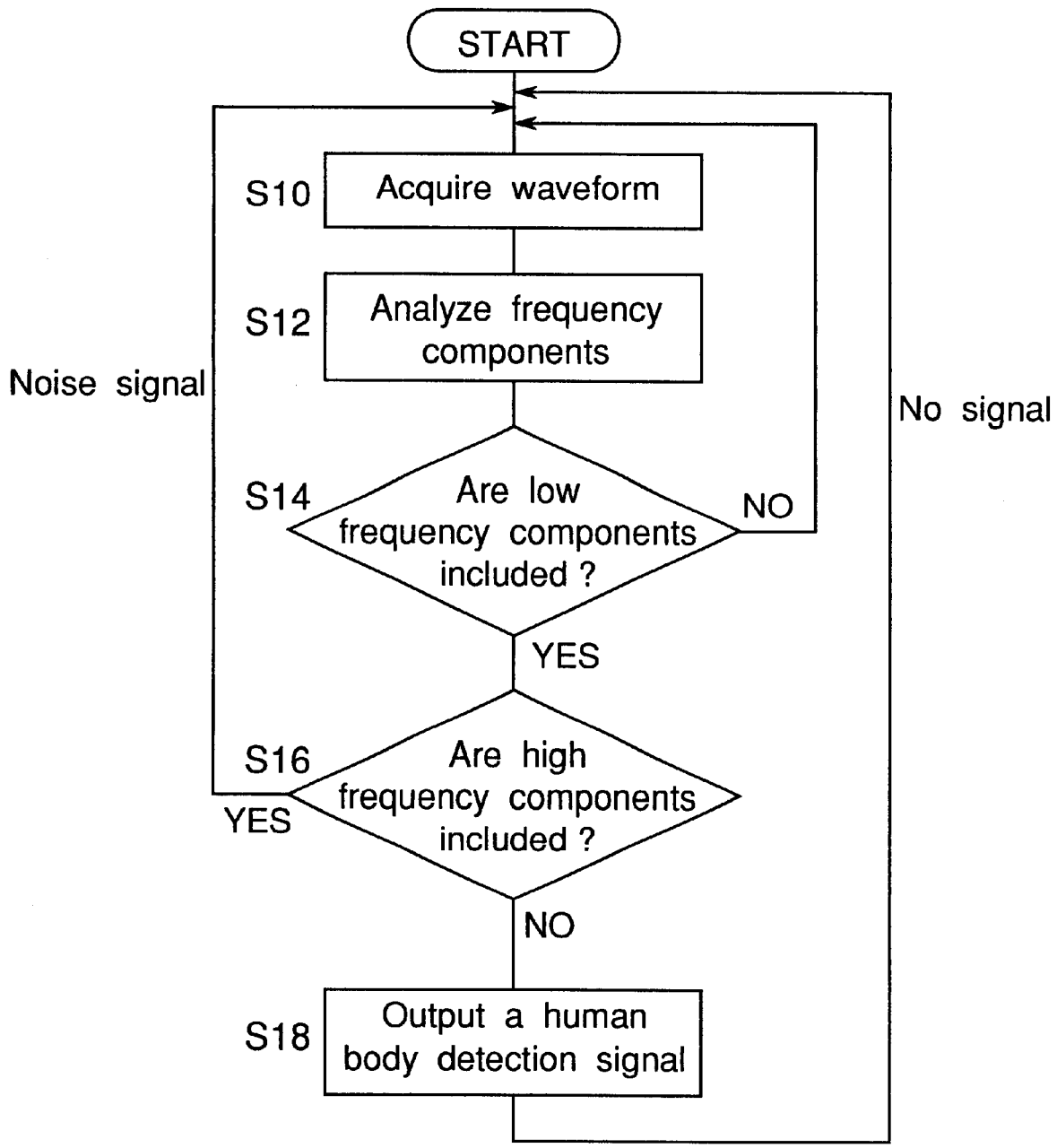
FIG. 6 is a flowchart of signal processing in the infra-red rays detector.

FIG. 6 shows a flow of the signal processing by the CPU 15. First, the digital data stored in the memory device 14 on the waveform is received for a predetermined time (S10), and frequency components are analyzed on the digital data (S12). Then, it is checked whether the waveform data include low frequency components or not (S14). If it is decided that the waveform data include no low frequency components, the flow returns to S10. On the other hand, if it is decided that the waveform data include low frequency components, it is decided next whether the waveform data include high frequency components or not (S16). If it is decided that the waveform data include high frequency components, it is decided that a noise is detected, and the flow returns to S10. On the other hand, if it is decided that the waveform data include no high frequency components, a human body detection signal is outputted (S18), and the flow returns to S10.

Figure 7:
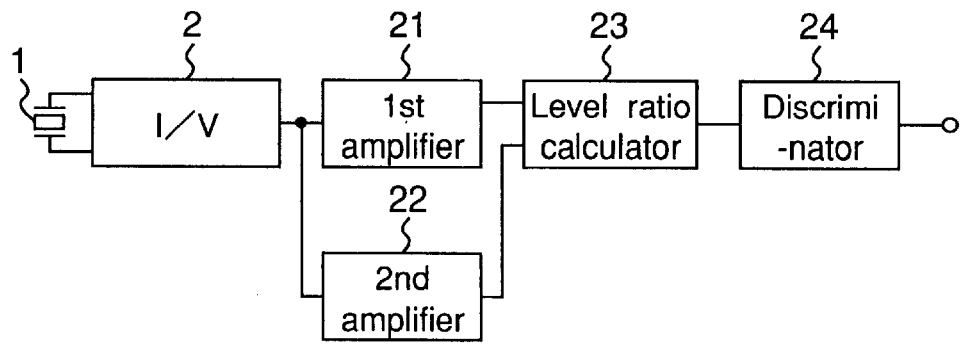
FIG. 7 is a block diagram of an infrared-rays detector of a second embodiment according to the invention.

FIG. 7 shows an infrared-rays detector of a second embodiment according to the invention. In this embodiment, the frequency distribution on the signal of the pyroelectric element is analyzed and a human body is discriminated according to a ratio of the signal levels at two different frequency ranges. The infrared-rays detector comprises a pyroelectric element 1, an I/V converter 2, a first amplifier 21, a second amplifier 22, a level ratio calculator 23 and a discriminator 24. The first amplifier 21 amplifies signals in a frequency band having a center at around 1 Hz, and the second amplifier 22 amplifies signals in another frequency band between a few tens Hz to a few hundreds Hz. The level ratio calculator 23 determines a ratio of the output levels of the first and second amplifiers 21 and 22. Then, the discriminator 24 compares the ratio with a predetermined value and outputs a human body detection signal when the ratio is larger than the predetermined value.

Figure 8:
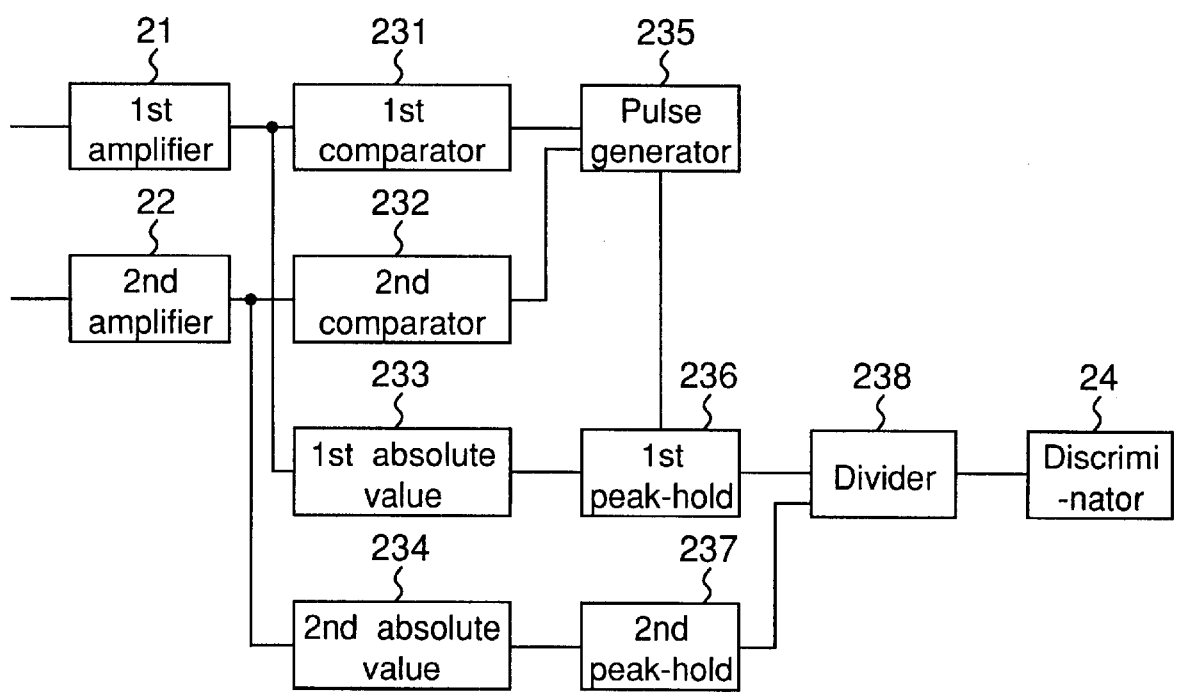
FIG. 8 is a block diagram of an example of a level ratio calculator.

FIG. 8 shows an example of the level ratio calculator 23. In the level ratio calculator 23, the signals amplified by the first and second amplifiers 21, 22 are sent to first and second comparators 231, 232 for comparing them with threshold levels respectively. The signals are also sent to first and second absolute value circuits 233, 234 to obtain absolute values thereof. A pulse generator 235 generates a pulse signal when it receives signals from the comparators 231, 232 for a predetermined time which is used as level comparison section, and the pulse signal is supplied to first and second peak-hold circuits 236 and 237. The first and second peak-hold circuit 236, 237 connected to the first and second absolute value circuits 233, 234 hold the maximum signal in the level comparison section. A divider circuit 238 divides the absolute value signals received from the first and second peak-hold circuits 236, 237. If the quotient is larger than a predetermined level, the discriminator 24 outputs a human body detection signal. That is, a signal due to a human body is discriminated.

FIGS. 9 and 10 show representative waveforms due to a human body and due to a popcorn noise in the infrared-rays detector. In FIG. 9, because signals due to a human body have frequency components equal to or lower than a few tens Hz, a large signal is provided by the first amplifier 21, while a small signal is provided by the second amplifier 22. On the other hand, in FIG. 10, because signals due to a popcorn noise have components up to high frequencies, both amplifiers 21, 22 supply large signals. When the output of the first or second amplifier 21, 22 exceeds a threshold level, the pulse generator 235 outputs a pulse signal to the peak-hold circuits 236 and 237. Then, each of the peak hold circuits 236 and 237 holds a peak of the voltage inputted thereto in a level comparison period when the pulse signal is received. For the signal due to a human body as shown in FIG. 9, the output of the first peak-hold circuit 236 is large, while that of the second one 237 is small. On the other hand, for the waveform due to a popcorn noise, both peak-hold circuits 236, 237 output large signals. Therefore, a waveform due to a human body is discriminated from that due to a popcorn noise by the divider circuit 238 and the discriminator 24.

Though an example of the level ratio calculator 23 is explained above, the level ratio may be obtained in a different way. It is also possible to use a difference between the maximum signals instead of the quotient for discriminating a signal due to a human body from that due to a popcorn noise.

Figure 11:
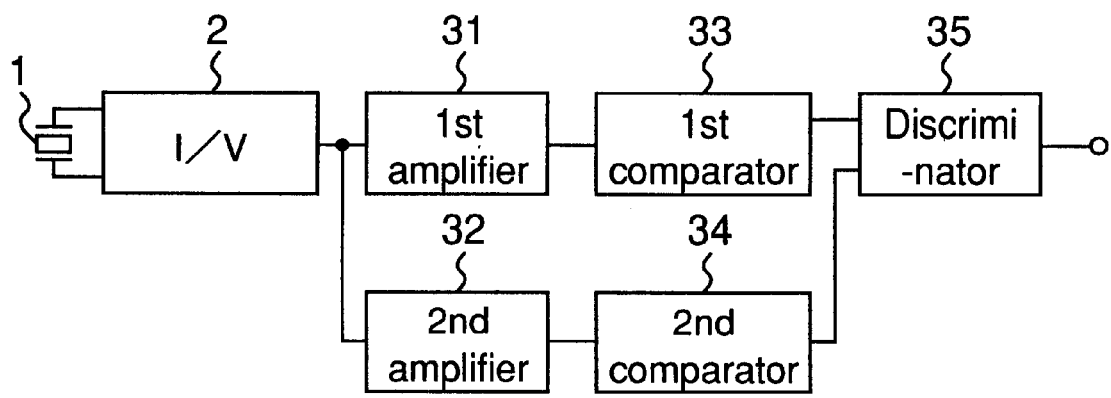
FIG. 11 is a block diagram of an infrared-rays detector of a third embodiment according to the invention.

FIG. 11 shows an infrared-rays detector of a third embodiment according to the invention. In this embodiment, the frequency distribution on the signal of the pyroelectric element is analyzed and a human body is discriminated according to the signal levels at two different frequency ranges. The infrared-rays detector comprises a pyroelectric element 1, an I/V converter 2, a first amplifier 31, a second amplifier 32, a first comparator 33, a second comparator 34, and a discriminator 35. Similarly to the first and second amplifiers 21 and 22, the first amplifier 31 amplifies signals in a frequency band with a center at around 1 Hz, and the second amplifier 32 amplifies signals in another frequency band between a few tens Hz to a few hundreds Hz. The signals passing the first and second amplifiers 31, 32 are supplied to the first and second comparators 33, 34 for comparing them with threshold levels respectively. Then, the discriminator 35 discriminates a signal due to a human body according to the comparison results of the comparators 33, 34.

Figure 12:
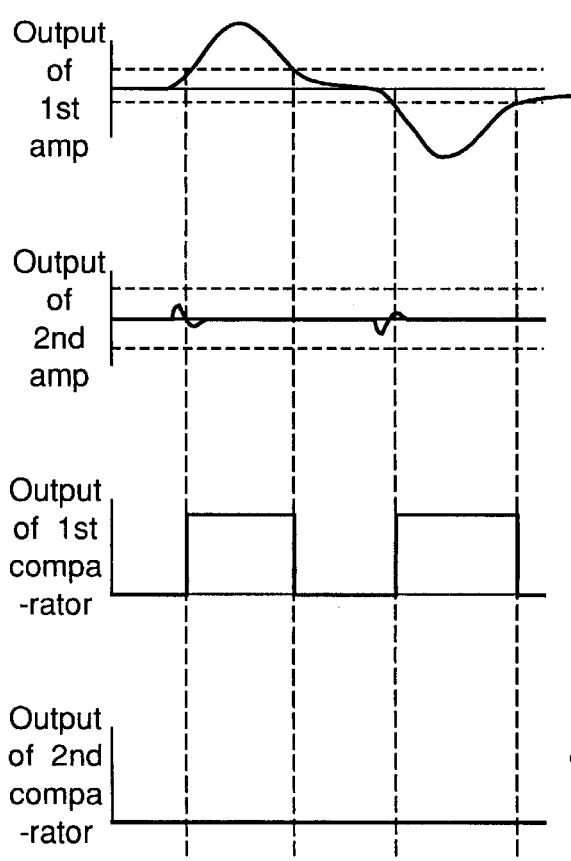
FIG. 12 is a time chart of representative waveforms due to a human body in the infrared-rays detector.
Figure 13:
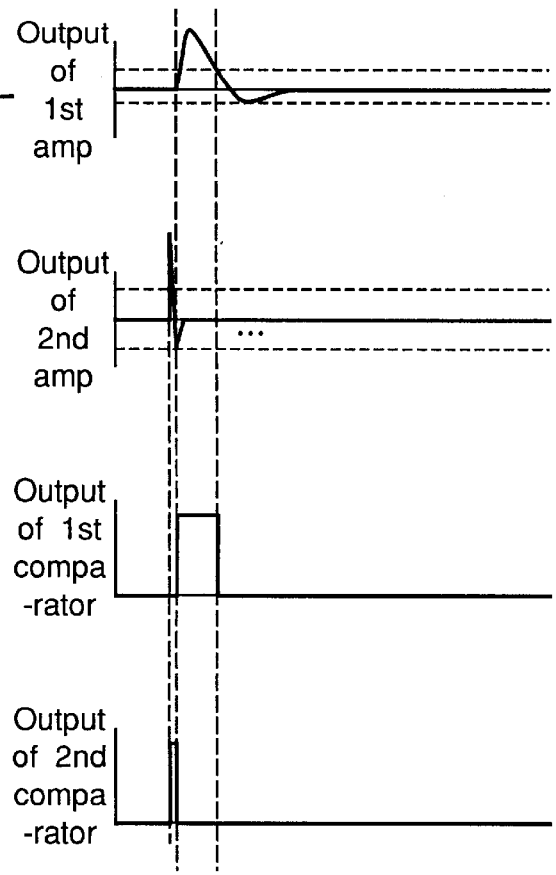
FIG. 13 is a time chart of representative waveforms due to a popcorn noise in the infrared-rays detector.

FIGS. 12 and 13 show waveforms of output signals due to a human body and due to a popcorn noise respectively. Because a signal due to a human body have frequency components equal to or lower than a few tens Hz, a large signal is provided by the first amplifier 31, while a small signal is provided by the second amplifier 32. Because signals due to a popcorn noise have components up to high frequencies, both amplifiers 31, 32 provide large signals. Therefore, when the first and second comparators 33, 34 compare the output signals of the amplifiers 31, 32 with appropriate threshold levels, for a signal for a human body, the first comparator 33 for the first amplifier 31 outputs a comparison signal, while the second comparator 34 for the second amplifier 32 does not output a comparison signal. On the other hand, for signals due to a popcorn noise or due to electrical noise, the two comparators 33, 34 supply output signals. The discriminator section 35 outputs a human body detection signal when the first comparator 33 outputs a comparison signal but the second comparator 34 does not output a comparison signal.

Next, an infrared-rays detector according to a fourth embodiment of the invention is explained. For signals due to a human body, the frequency components show no change practically for a relatively long time, while for signals due to a noise such as a popcorn noise, they vanish in a short time. In this embodiment, the signal is subjected to frequency analysis and a human body is discriminated according to time dependence of the signal. For example, a human body detection signal is outputted when like frequency components exist in the signal for a certain continuous time.

The block diagram of the infrared-rays detector is similar to that of the first embodiment shown in FIG. 3, and it is not displayed here. A wide band amplifier 11 amplifies an output voltage from an I/V converter 2 in a sufficiently wide band, and the signal supplied to the waveform analyzer 12 has the frequency spectrum distribution shown in FIGS. 3 and 4. The waveform analyzer 12 has an A/D converter 13 which converts an input waveform to a digital value, a memory device 14 which stores the digital data, and a CPU 15 for analysis. The data stored in the memory device 14 is updated each time a signal is received from the A/D converter 13. The CPU 15 analyzes frequency components thereof and checks time dependence of the frequency spectrum. The CPU 15 outputs a human body detection signal when like frequency components exist for a certain continuous time. In the signal processing of the CPU 15, data in a time period is subjected to frequency analysis, and a human body detection signal is outputted if a length of time when the low frequency components have a power larger than a predetermined value exceeds a threshold. Alternatively, a change in frequency components can be detected, for example, by measuring a length of time when the signal exceeds a threshold within a predetermined long time.

Figure 14:
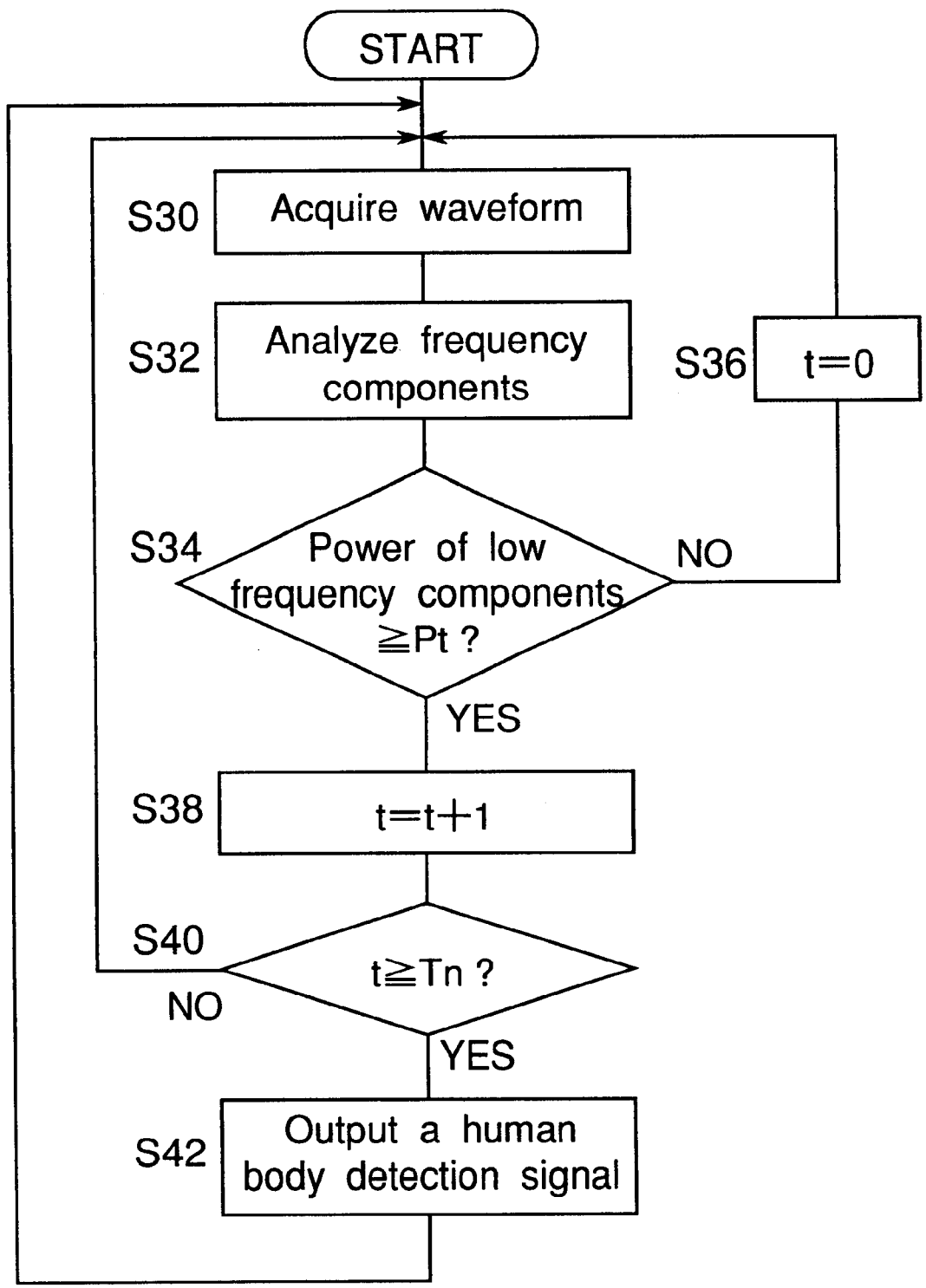
FIG. 14 is a flowchart in a fourth embodiment according to the invention.

FIG. 14 shows an example of a flow of the signal processing by the CPU 15. First, the digital data stored in the memory device 14 on the waveform are received for a predetermined time (S30), and frequency components are analyzed on the digital data (S32). Then, it is checked whether a power of low frequency components in the data not smaller than a predetermined power Pt (S34). If it is decided that the power is smaller than Pt, t is reset to 0 (S36), and the flow returns to S30. On the other hand, if it is decided that the power is not smaller than Pt, the time t is incremented by one (S38), and it is decided next whether $t \geq Tn$ or not (S40). If it is decided that $t < Tn$, the flow returns to S30. On the other hand, if it is decided that $t \geq Tn$, a length of time when the low frequency components have a power larger than a predetermined value exceeds the threshold Tn, and a human body detection signal is outputted (S42). Then, the flow returns to S30.

Figure 15:
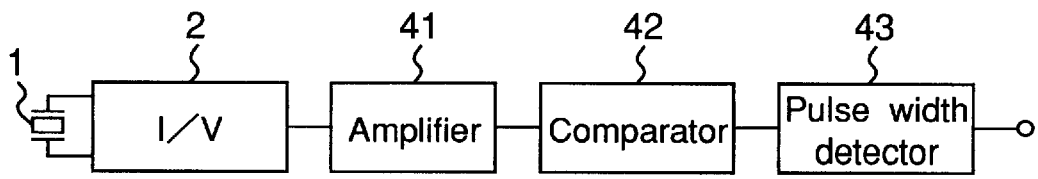
FIG. 15 is a block diagram of an infrared-rays detector of a fifth embodiment according to the invention.
Figure 16:
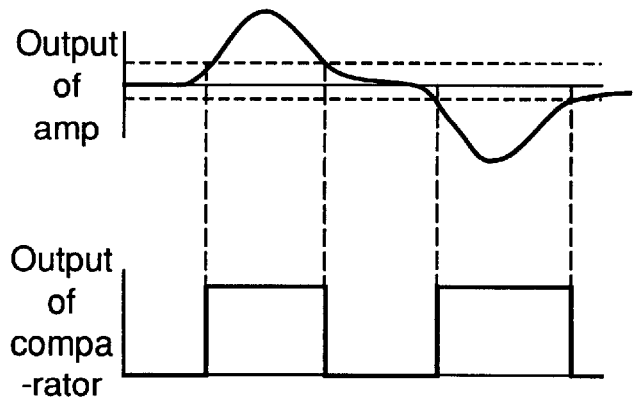
FIG. 16 is a time chart of representative waveforms due to a human body in the infrared-rays detector.
Figure 17:
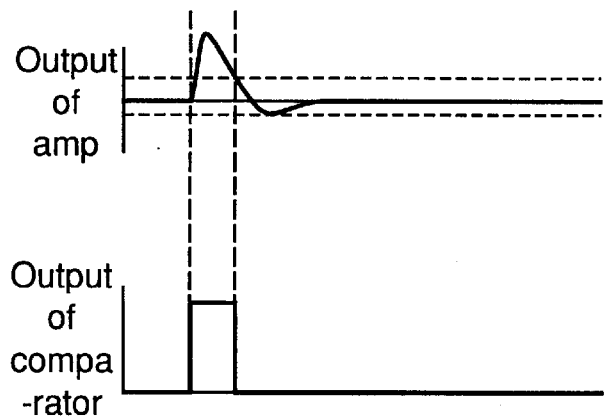
FIG. 17 is a time chart of representative waveforms due to a popcorn noise in the infrared-rays detector.

FIG. 15 shows an infrared-rays detector of a fifth embodiment according to the invention, wherein the frequency distribution on the signal of the pyroelectric element is analyzed and a human body is discriminated according to the length of time of a signal in a frequency range ascribable to a human body. The infrared-rays detector comprises a pyroelectric element 1, an I/V converter 2, an amplifier 41, a comparator 42 and a pulse width detector 43. The amplifier 41 has a characteristic of band-pass filter which transmits and amplifies signals in a frequency band with a center at around 1 Hz in order to acquire a signal due to a human body. The comparator 42 compares a signal outputted by the amplifier 41 with a predetermined threshold and outputs a detection signal while the signal exceeds the threshold. The pulse width detector 43 outputs a signal only when the pulse width exceeds a certain value. FIGS. 16 and 17 show representative waveforms due to a human body and due to a popcorn noise in the infrared-rays detector. A signal due to a human body is relatively long than that due to a noise such as popcorn noise. In the infrared-rays detector, the amplifier transmits a signal in the frequency range in correspondence to existence of a human body, and when the pulse width detector 43 decides that the pulse width of the signal outputted by the amplifier 41 is relatively long, a human body detection signal is outputted.

In this example, the detection signal is generated according to the length of a one-shot output signal from the comparator 41. Alternatively, the detection signal is generated by measuring a pulse width of a signal from the comparator 42 after the pulse width detector 43 receives the signal from the comparator 42.

Figure 18:
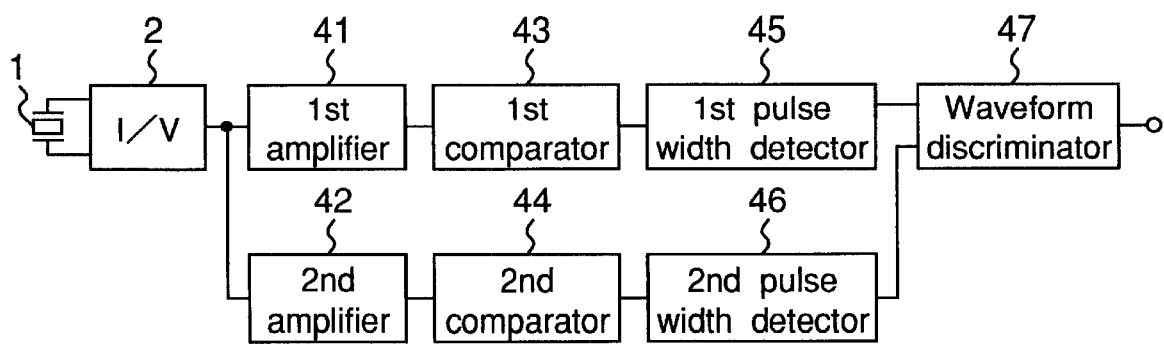
FIG. 18 is a block diagram of an infrared-rays detector of a sixth embodiment according to the invention.

FIG. 18 shows an infrared-rays detector of a sixth embodiment according to the invention. In this embodiment, the frequency distribution on the signal of the pyroelectric element is analyzed, and a human body is discriminated according to the lengths of time of signals in two frequency ranges. The infrared-rays detector comprises a pyroelectric element 1, an I/V converter 2, a first amplifier 41, a second amplifier 42, a first comparator 43, a second comparator 44, a first pulse width detector 45, a second pulse width detector 46, and a waveform discriminator 47. The first amplifier 41 amplifies a signal in a frequency band with a center at around 1 Hz and the second amplifier 42 amplifies signals in another frequency band between a few tens Hz to a few hundreds Hz. The first and second comparators 43, 44 compare the signals from the first and second amplifiers 41, 42 with threshold levels respectively. FIGS. 19 and 20 show time charts of output signals of the first and second comparators 43, 44. The first comparator 43 outputs a pulse signal with a relatively narrow width for popcorn noise or the like. When a temperature difference between the background and a human body is large and an output signal from the pyroelectric element 1 is large, the first comparator 43 outputs a pulse of a long pulse width. On the other hand, it outputs a pulse with a narrow width when the temperature difference between the background and a human body is small. In this case, it is difficult to discriminate the signal due to a human body from that due to popcorn noise. However, the second comparator 44 outputs a signal surely for a popcorn noise or the like, but it does not output a signal due to a human body because the second amplifier 44 outputs a very small signal for a human body. Thus, a signal due to a human body can be detected surely. As explained above, the first and second pulse width detectors 45 and 46 detect pulse widths of the signals supplied by the comparators 43 and 44, respectively, and the waveform discriminator 47 discriminates a signal due to a human body according to the detected pulse widths on signals at different frequency ranges.

Figure 21:
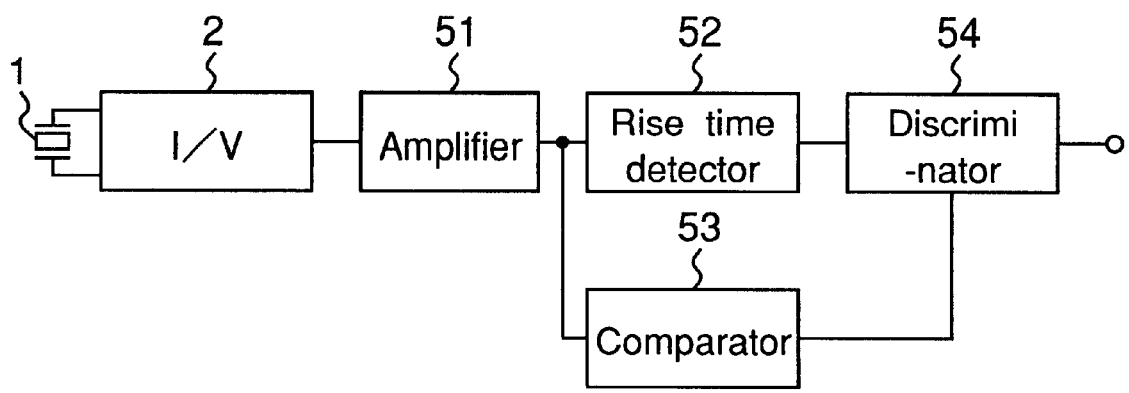
FIG. 21 is a block diagram of an infrared-rays detector of a seventh embodiment according to the invention.

FIG. 21 shows an infrared-rays detector of a seventh embodiment according to the invention. In this embodiment, a human body is discriminated by measuring a rise time of a signal. The infrared-rays detector comprises a pyroelectric element 1, an I/V converter 2, an amplifier 51, a rise time detector 52, a comparator 53, and a discriminator section 54. The amplifier 51 has a characteristic of band-pass filter in order to acquire a signal due to a human body. The rise time detector 52 outputs a rise time by measuring a length of time of the output signal of the amplifier 51 passing between two different levels.

Figure 22:
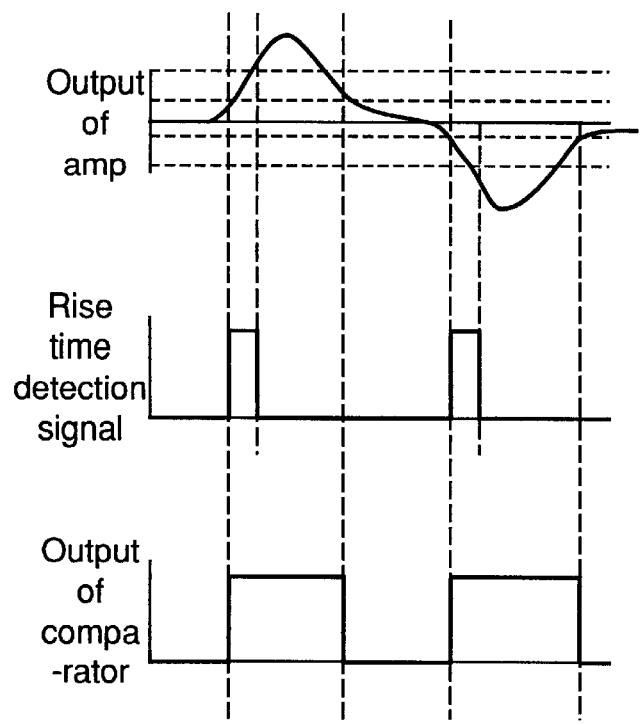
FIG. 22 is a time chart of representative waveforms due to a human body in the infrared-rays detector.
Figure 23:
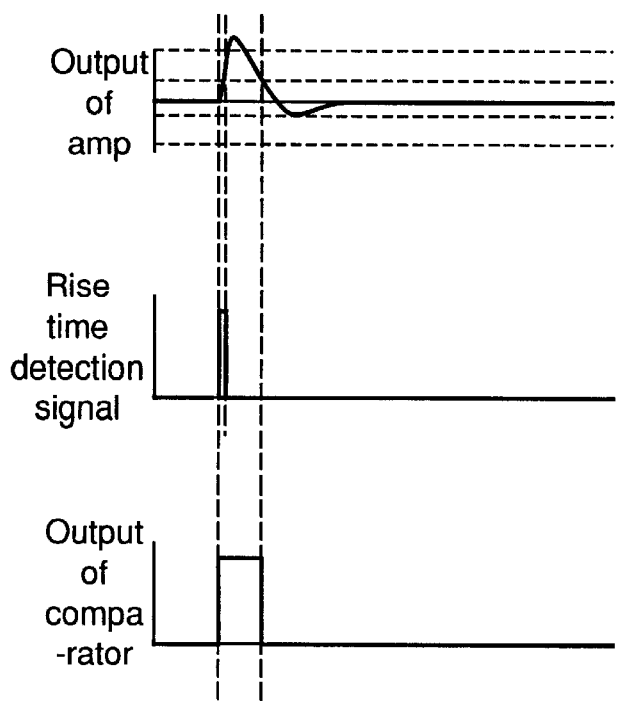
FIG. 23 is a time chart of representative waveforms due to a popcorn noise in the infrared-rays detector.

FIGS. 22 and 23 show output signals of the amplifier 51 due to a human body and due to popcorn noise and rise time detection signals of the rise time detector 52 respectively. A popcorn noise or the like rises rapidly and has a short pulse width, while a signal due to human body rises rather gradually because a human body enters into each monitor area at a low speed. The rise time becomes longer for a signal due to popcorn noise or the like while shorter for a signal due to human body. If the signal due to a human body becomes large, the rise time becomes shorter, but the pulse width of the comparison result of the comparator 53 becomes longer. Then, the discriminator 54 receives the rise time from the rise time detector 52 and the pulse width from the comparator 53 and detects a human body with high precision by taking the rise time and the pulse width into account.

Figure 24:
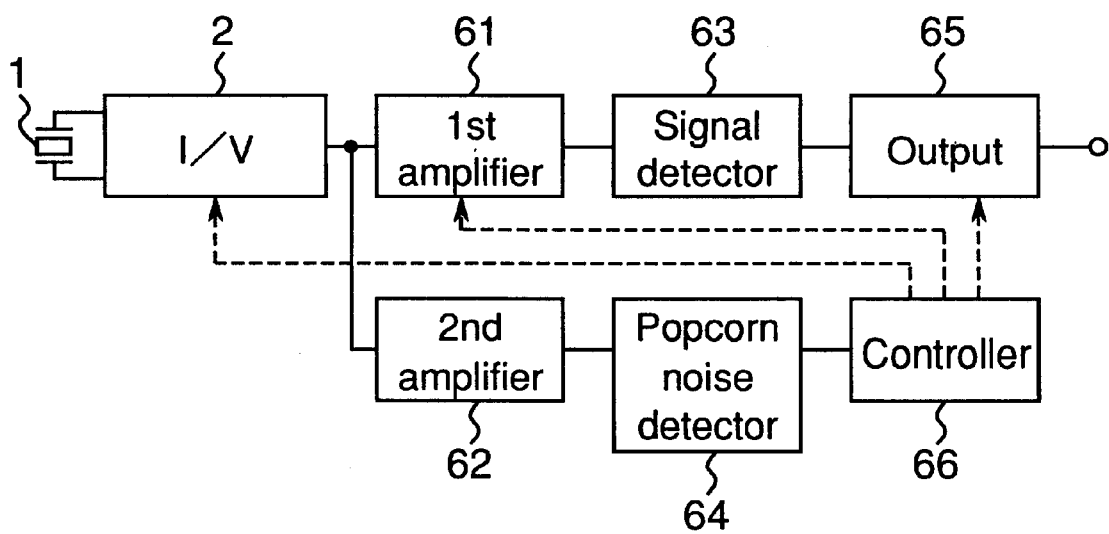
FIG. 24 is a block diagram of an infrared-rays detector having a different type of signal processor.

An infrared-rays detector according of the present invention having a different type of signal processor will be explained below with reference to FIG. 24. The infrared-rays detector comprises a pyroelectric element 1, a current-to-voltage (I/V) converter 2, and a signal processor including a first voltage amplifier 61, a second voltage amplifier 62, a signal detector section 63, a popcorn noise detector 64, an output circuit 65 and a controller 66. The output voltage of the I/V converter 2 is amplified by the first voltage amplifier 61 and by the second voltage amplifier 62. The first voltage amplifier 61 has a characteristic of a band-pass filter passing components around 1 Hz in correspondence to the speed of movement of a human body, while the second voltage amplifier 62 amplifies the signal received from the I/V converter 2 by selecting frequencies higher than the first voltage amplifier 61 in order to detect a popcorn noise. The signal detector 63 compares the signal outputted from the first voltage amplifier 61 with a predetermined value with a comparator, and it outputs a detection signal to the output circuit 65 if the signal received from the first voltage amplifier 61 has an amplitude exceeding the predetermined value.

The second voltage amplifier 62 amplifies the input signal at frequencies higher than the first voltage amplifier 61 because a popcorn noise in the pyroelectric element 1 rises much faster than a signal due to movement of a human body or the like. Then, the second voltage amplifier 62 has a characteristic of a band-pass filter which transmits components of frequencies equal to or higher than a few tens Hz in order to discriminate the popcorn noise from the output signal due to movement of human body. However, if a signal at unnecessarily high frequencies is transmitted, S/N ratio becomes worse, and the popcorn noise submerges in noises. Then, the second voltage amplifier 62 has a characteristic of band-pass filter which transmits frequency components in a transmission band from a few tens Hz to a few hundreds Hz. The popcorn noise detector 64 outputs a popcorn noise detection signal to the controller 66 when the output of the second voltage amplifier 62 has an amplitude equal to or higher than a predetermined value. When the popcorn noise is detected, the controller 66 outputs a control signal to a component in the infrared-rays detector such as the I/V converter 2, the first voltage amplifier 61 or the output circuit 65 to prevent an erroneous detection signal due to a popcorn noise.

In a modified example, one amplifier amplifies an output signal of the I/V converter 2, and the output voltage of the amplifier is supplied to two filters having different frequency characteristics from each other. The first filter is a band-pass filter passing components around 1 Hz in correspondence to the speed of movement of a human body, while the second filter is a band-pass filter which transmits components from a few tens to a few hundreds Hz. The outputs of the first and second filters are supplied to the signal detector and to the popcorn noise detector, respectively. That is, the filters are used instead of the voltage amplifiers to analyze the waveform of the signal detected by the pyroelectric element.

As explained above, the output signal of the pyroelectric sensor is detected at two different frequency ranges, and a human body can be detected according analysis on the signals at the two frequency ranges. Then, an erroneous report of the existence or movement of a human body is prevented. Therefore, the infrared-rays detector is very reliable and does not output a false output signal when a popcorn noise occurs. Various embodiments of this type of signal processing are explained below.

Figure 25:
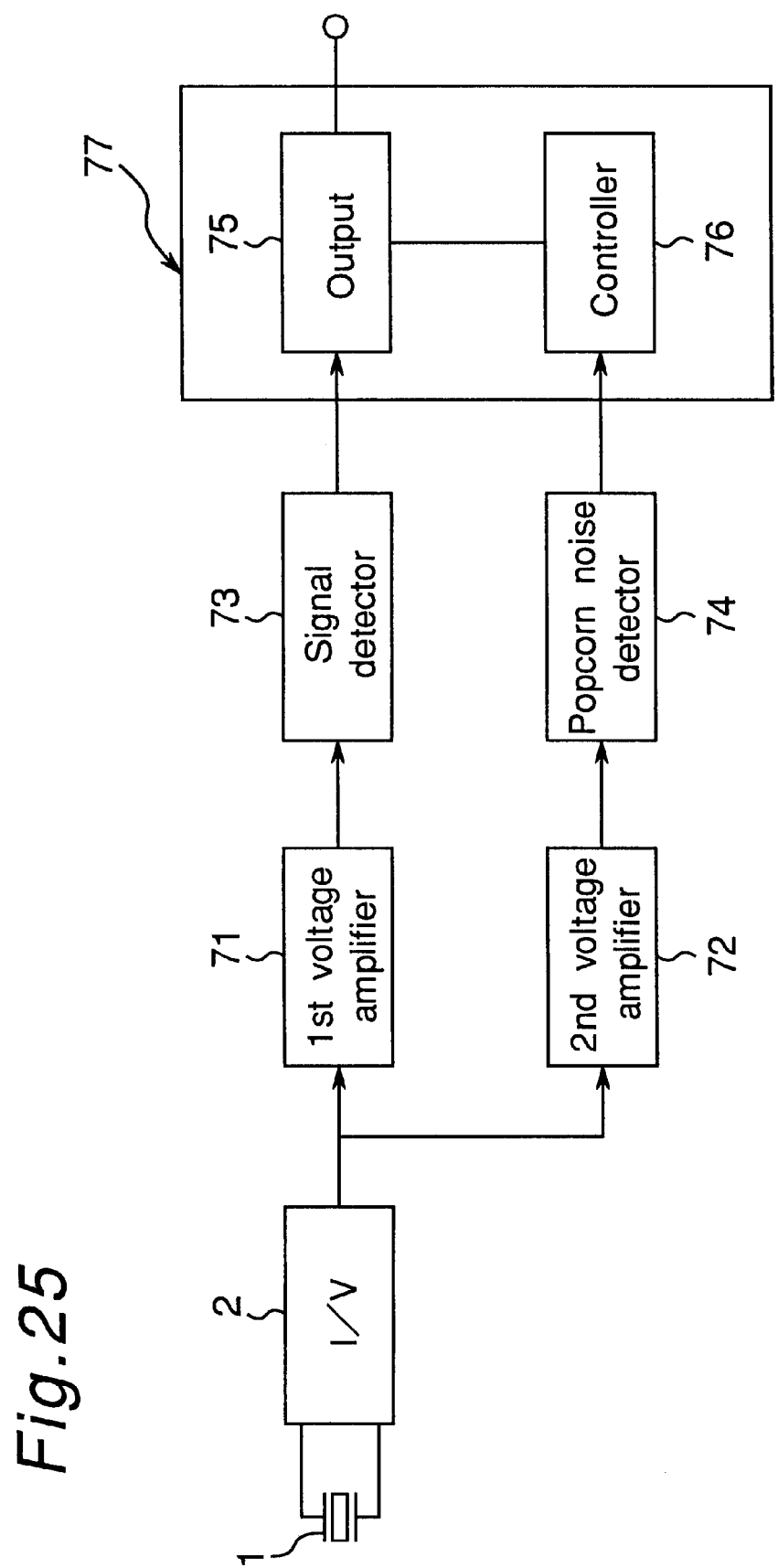
FIG. 25 is a block diagram of an infrared-rays detector of an eighth embodiment according to the invention.
Figure 26:
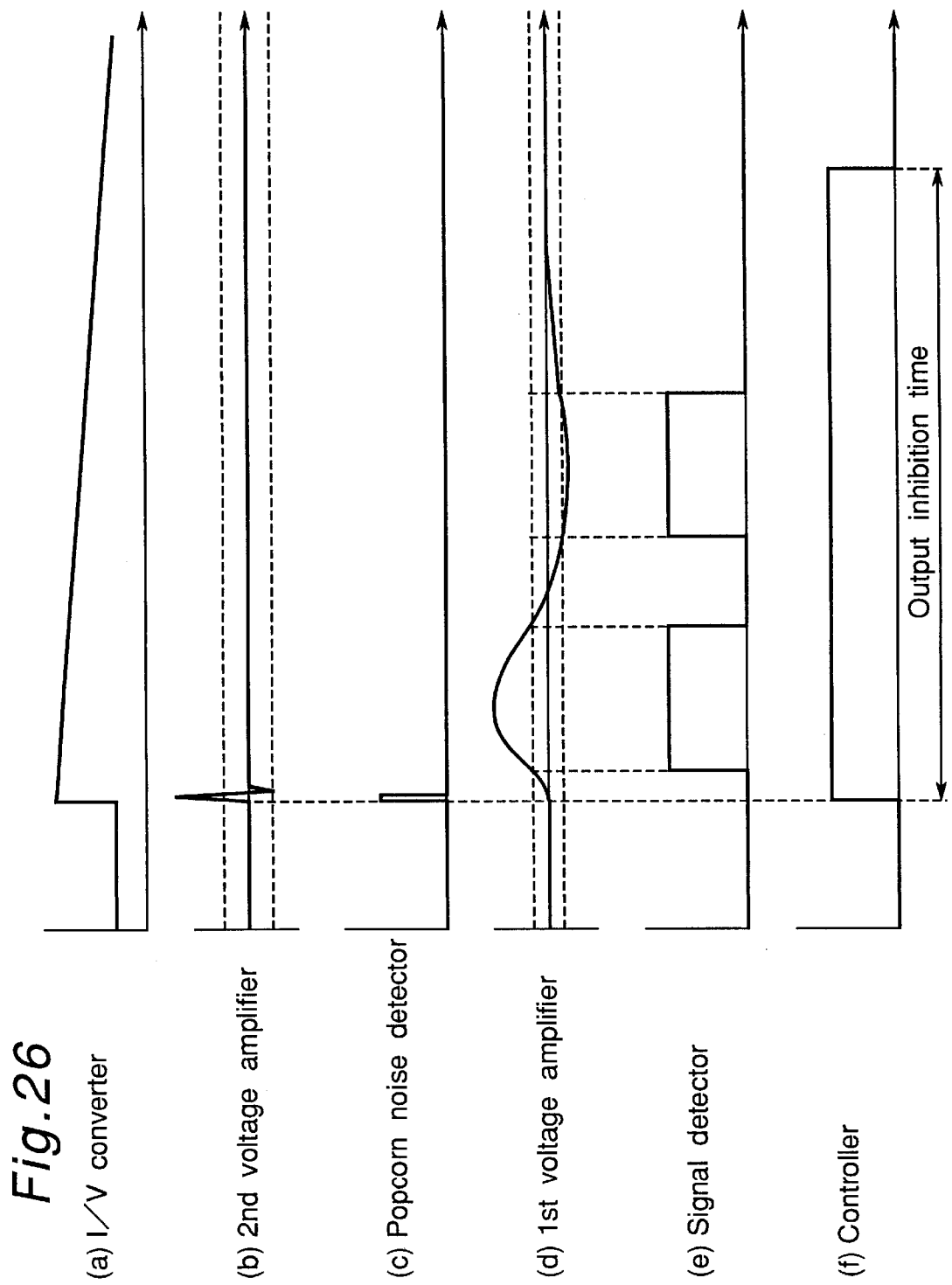
FIG. 26 is a time chart on signals in the infrared-rays detector.

An infrared-rays detector of an eighth embodiment according to the present invention will be explained below with reference to FIGS. 25 and 26. As shown in FIG. 25, the infrared-rays detector comprising a pyroelectric element 1, an I/V converter 2, a first voltage amplifier 71, a second voltage amplifier 72, a signal detector section 73, a popcorn noise detector 74, and an output controller 77 including a controller 76 having a timer circuit and an output circuit 75. The output voltage signal of the I/V converter 2 is supplied to the first voltage amplifier 71 and to the second voltage amplifier 72. The first voltage amplifier 71 amplifies the signal received from the I/V converter 2 and sends the output voltage to the signal detector 73. The first voltage amplifier 71 has a characteristic of a band-pass filter passing components around 1 Hz in correspondence to the speed of movement of a human body. The signal detector 73 compares the signal outputted from the first voltage amplifier 71 with a predetermined value with a comparator. It outputs a detection signal to the output circuit 75 if a signal received from the first voltage amplifier 71 has an amplitude exceeding the predetermined value.

The second voltage amplifier 72 has a characteristic of band-pass filter which transmits components in a transmission band from a few tens to a few hundreds Hz. The popcorn noise detector 74 outputs a popcorn noise detection signal to the controller 76 when the output of the second voltage amplifier 72 has an amplitude equal to or higher than a predetermined value.

The controller 76 has a timer and outputs an output inhibition signal to the output circuit 75 for a predetermined time when the popcorn noise is received. When a popcorn noise happens, it decays quickly or it is nonpersistent. Therefore, the time for the timer in the controller 76 for outputting the output inhibition signal is set to a few seconds.

As far as the output inhibition signal is not received from the controller, the output circuit 75 transmits the detection signal therethrough when it receives the detection signal from the signal detector 73. However, while the output inhibition signal is outputted by the controller 76, it inhibits to output the signal to the external or it does not output the detection signal even if the detection signal is received from the signal detector 73.

Next, operation of the infrared-rays detector is explained with reference to FIG. 26, which shows a time chart of output signals of (a) the I/V converter 2, (b) the second voltage amplifier 72, (c) the popcorn noise detector 74, (d) the first voltage amplifier 71, (e) the signal detector 73, and (f) the controller 76.

The output signal (a) of the I/V converter 2 is sent to the first and second voltage amplifiers 71 and 72. When the output signal (d) of the first voltage amplifier 71 exceeds the predetermined value, the signal detector 73 decides that a human body exists or moves in the monitor area, to output a detection signal (e).

On the other hand, the popcorn noise detector 74 outputs a popcorn noise detection signal (b) to the controller 76 because it decides that a popcorn noise is outputted from the pyroelectric element 1 when the output signal (c) of the second voltage amplifier 72 exceeds the predetermined value. When the popcorn noise detection signal is received, the controller 76 outputs an output inhibition signal (f) to the output circuit 75 for a few seconds. The output circuit 75 inhibits to output the detection signal received from the signal detector 73 to the external in a time when the output inhibition signal is output (hereinafter referred to as output inhibition time). That is, until the output inhibition time elapses, the detection signal is not outputted from the infrared-rays detector, and a malfunction due to a popcorn noise is prevented. Therefore, because the rise time of the output signal from the second voltage amplifier 72 is faster than that from the first one 71, an erroneous detection report due to popcorn noise is not outputted before the output inhibition signal is outputted. As explained above, when a popcorn noise occurs, the output controller 77 is controlled not to output a signal until a predetermined time elapses. Then, a false report due to popcorn noise can be prevented completely by setting the predetermined time for the signal control.

Figure 27:
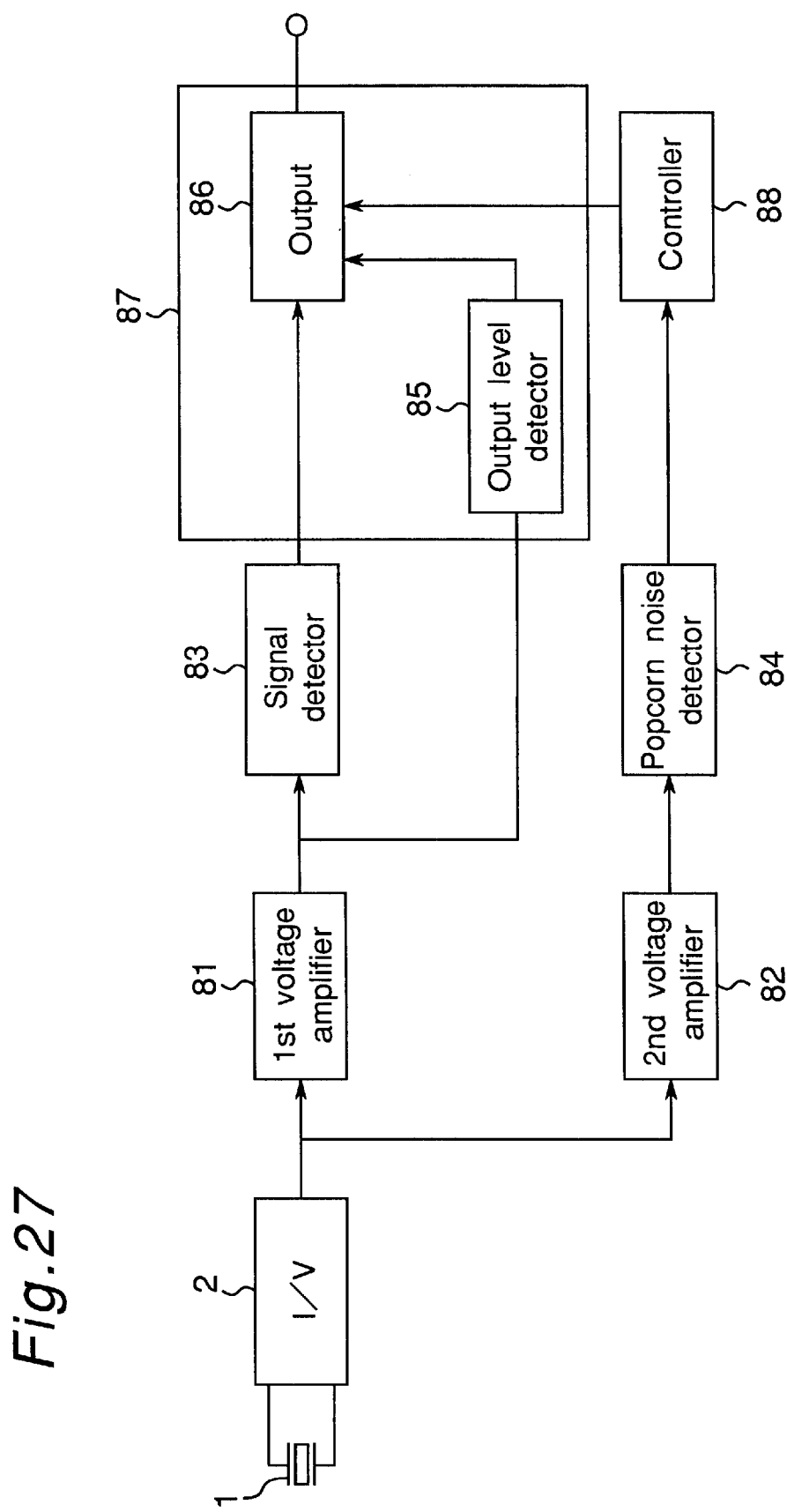
FIG. 27 is a block diagram of an infrared-rays detector of a ninth embodiment according to the invention.

An infrared-rays detector of a ninth embodiment according to the present invention will be explained below with reference to FIGS. 27 and 28. As shown in FIG. 27, the infrared-rays detector comprises a pyroelectric element 1, an I/V converter 2, a first voltage amplifier 81, a second voltage amplifier 82, a signal detector 83, a popcorn noise detector 84, and an output controller 87 including an output circuit 86 and an output level detector 85, and a controller 88 having a timer. The basic structure of the infrared-rays detector of this embodiment is similar to that of the seventh embodiment shown in FIG. 25.

When a signal is received from the first voltage amplifier 81, the output level detector 85 compares the input signal with a predetermined value with a comparator. If the input signal level is higher, it sends a high level detection signal. The predetermined values used for comparison by the signal detector 83 and by the output level detector 85 are not necessarily the same each other, and they can be set appropriately for desired detection sensitivity.

Figure 28:
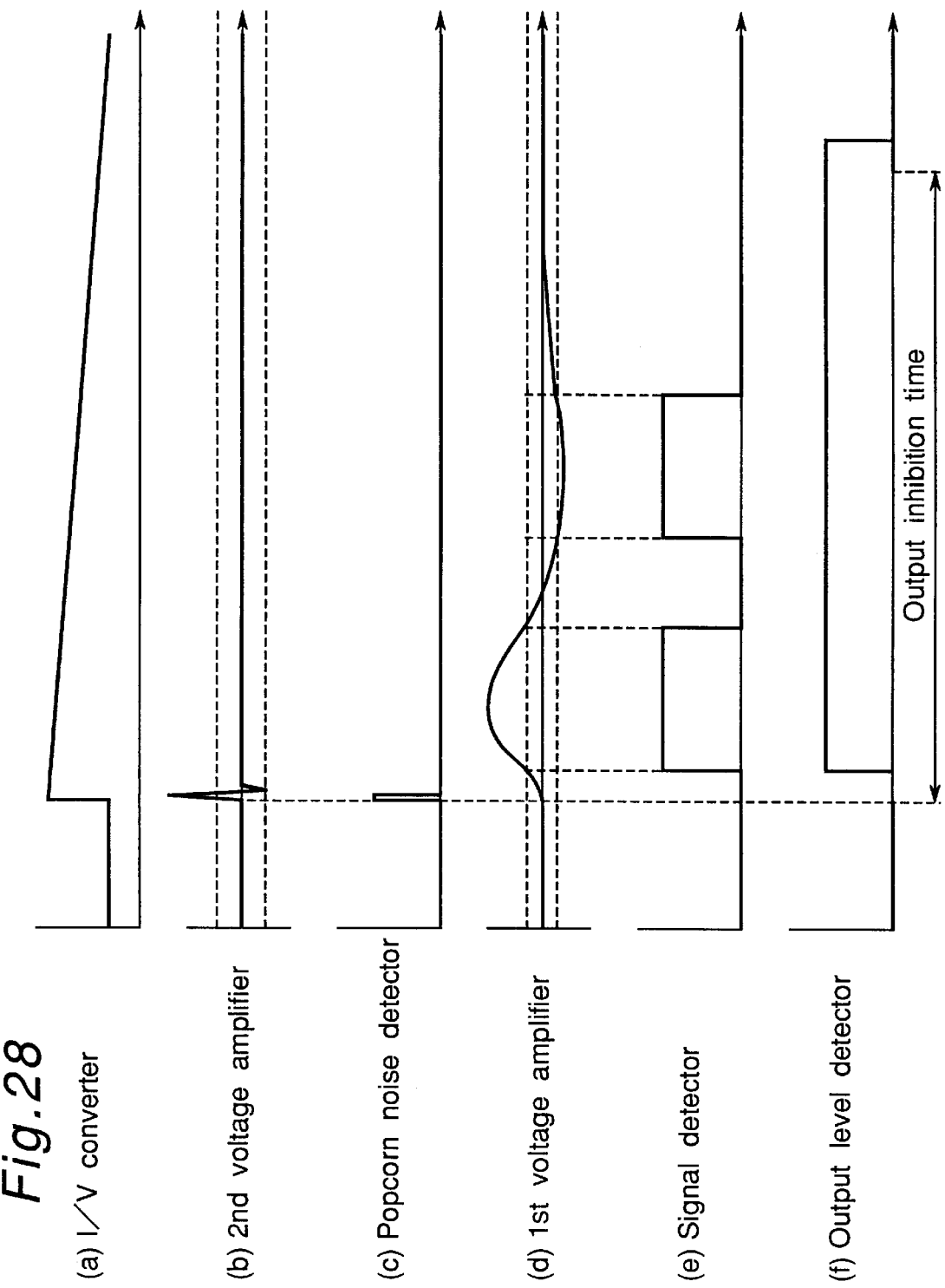
FIG. 28 is a time chart on signals in the infrared-rays detector.

When the output level of popcorn noise is high, the detector 83 may output a detection signal even if the signal level received from the first voltage amplifier 81 becomes lower temporarily than the predetermined value in the output level detector 85 (refer to signals (d) and (e) in FIG. 28). Then, once the high level detection signal is outputted, the output level detector 85 continues to output the high level detection signal until the signal level received from the first voltage amplifier 81 becomes lower than the predetermined value continuously for a predetermined time. Therefore, even when the signal level received from the first voltage amplifier 81 becomes lower than the predetermined value, the output of the high level detection signal will not be stopped quickly.

As far as the output inhibition signal is not received from the controller 88, the as-received detection signal is transmitted to the external when the detection signal is received from the signal detector 83. However, after the popcorn noise detection signal is outputted by the popcorn noise detector 84, the detection signal is inhibited to be outputted to the external even if the detection signal is received from the detector 83 or the detection signal is not output to the external until the level detection signal is stopped to be outputted.

Next, operation of the infrared-rays detector is explained with reference to FIG. 28, which shows an output signal (a) of the I/V converter 2, an output signal (b) of the second voltage amplifier 82, an output signal (c) of the popcorn noise detector 84, an output signal (d) of the first voltage amplifier 81, an output signal (e) of the signal detector 83, and an output signal (f) of the output level detector 85.

The output signal (a) of the I/V converter 2 is sent to the first and second voltage amplifiers 81 and 82. The output signal (d) of the first voltage amplifier 81 exceeds the predetermined value, the signal detector 83 decides that a human body exists or moves in the detection area and outputs a detection signal (e).

On the other hand, the popcorn noise detector 84 outputs a popcorn noise detection signal (b) to the output circuit 86 because a popcorn noise is decided to be outputted from the pyroelectric element 1 when the output signal (c) of the second voltage amplifier 82 exceeds the predetermined value. The output level detector 85 outputs a high level detection signal (f) to the output circuit 86 when the output signal (d) from the first voltage amplifier 81 exceeds the predetermined value. The output circuit 86 is inhibited to output the detection signal received from the signal detector 83 to the external at the same time when the signal is received from the popcorn noise detector 84, and it continues to be in the inhibition state until the signal output from the output level detector 85 is stopped. That is, an output inhibition time is after the signal is outputted from the popcorn noise detector 84 until the output signal from the output level detector 85 is stopped. Therefore, it is important to adjust the reference values for the comparators appropriately, so that the high level detection signal will be outputted while the popcorn noise detection signal is outputted.

As explained above, after a popcorn noise detection signal is received, the output circuit does not output a signal until a predetermined time elapses until the output of the first voltage amplifier does not exceed a predetermined level for a predetermined time. Because the signal control time by the output controller is determined according to the output level of the popcorn noise, when the output level of popcorn noise is small, the signal control is cancelled quickly, and a possibility of false report can be decreased.

Figure 29:
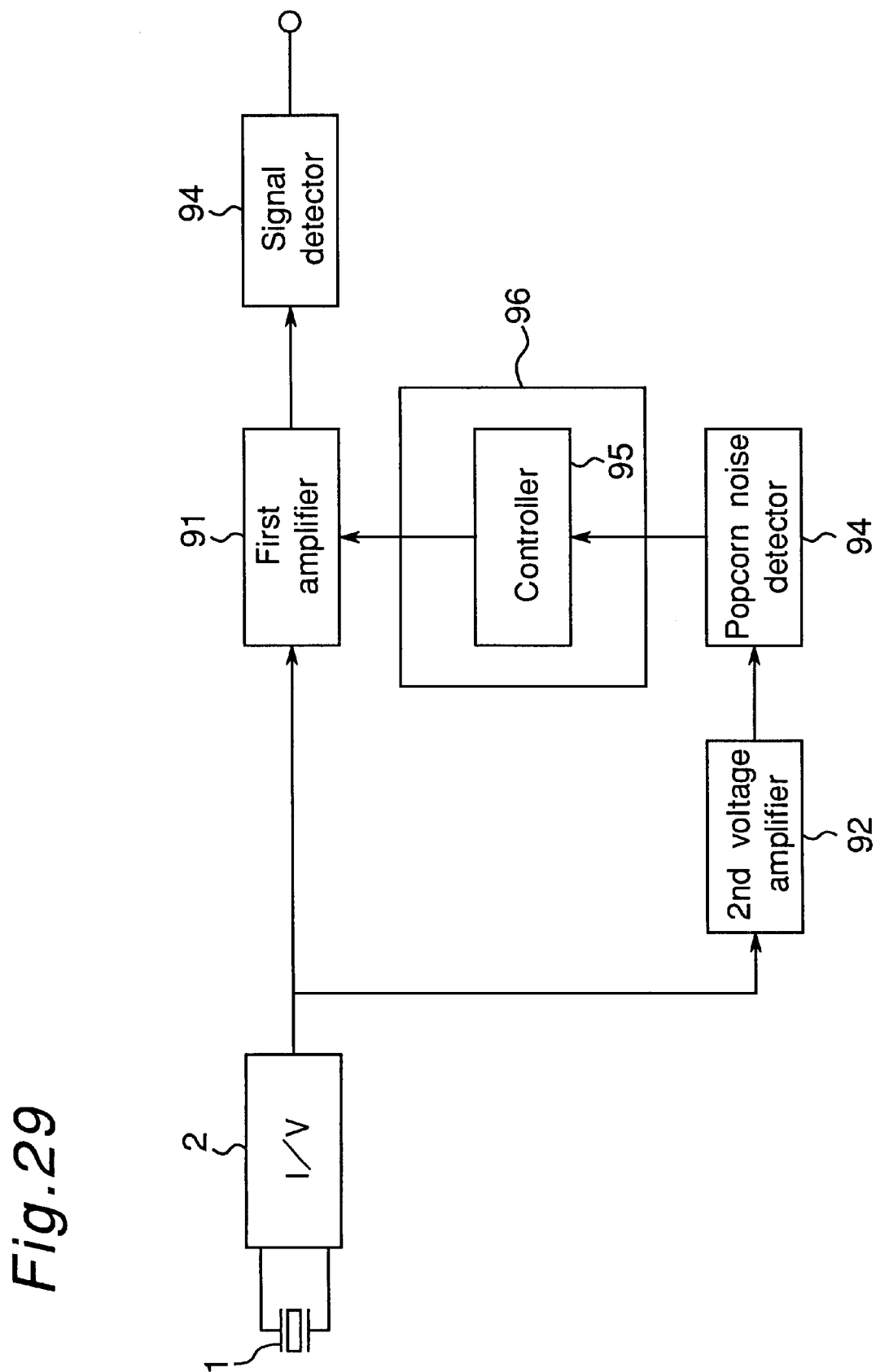
FIG. 29 is a block diagram of an infrared-rays detector of a tenth embodiment according to the invention.
Figure 30:
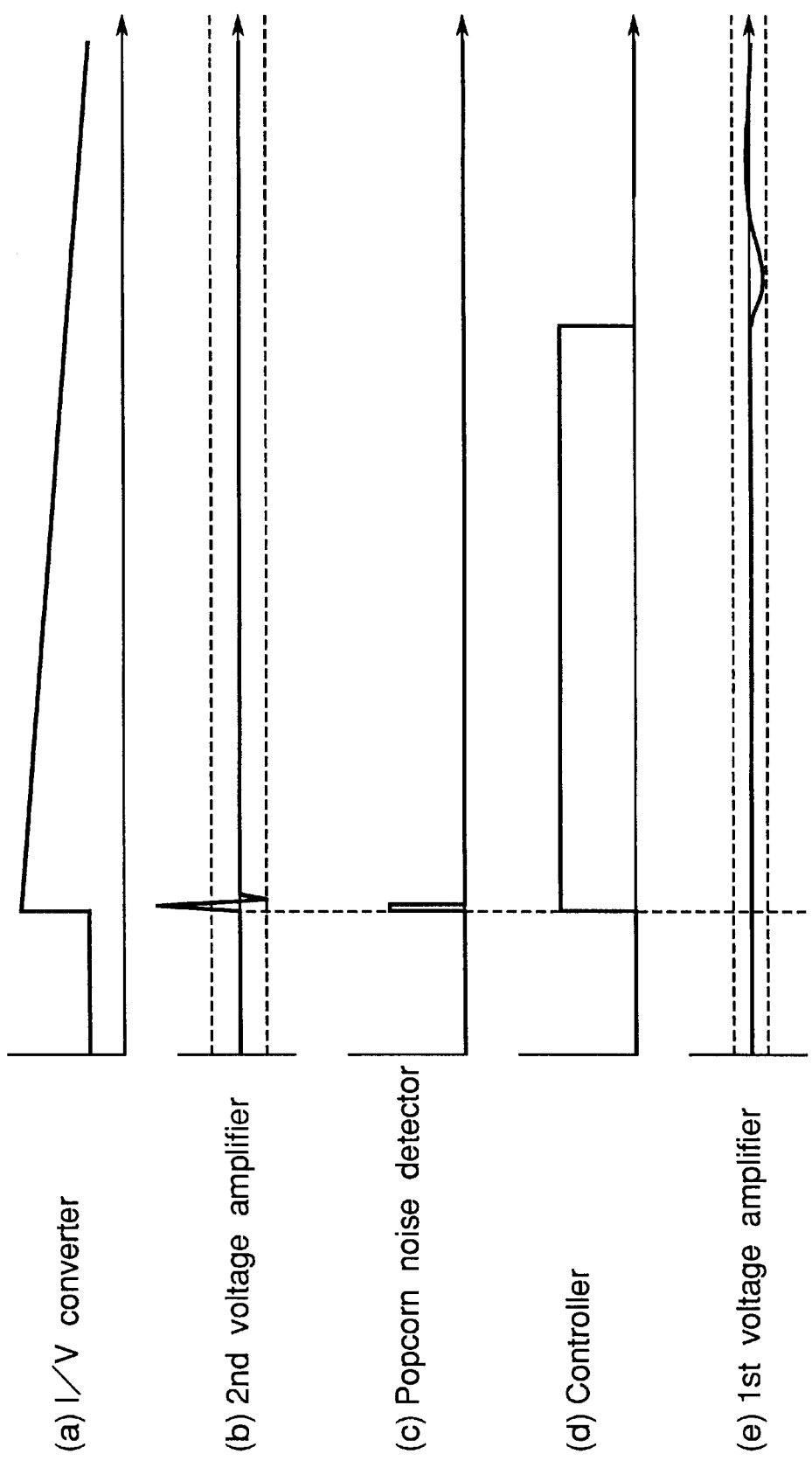
FIG. 30 is a time chart on signals in the infrared-rays detector.

An infrared-rays detector of a tenth embodiment according to the present invention will be explained below with reference to FIGS. 29 to 31. As shown in FIG. 29, the infrared-rays detector comprises a pyroelectric element 1, an I/V converter 2, a first voltage amplifier 91, a second voltage amplifier 92, a signal detector 93, a popcorn noise detector 94, and a controller 95 having a timer as an output controller 96. The basic structure of the infrared-rays detector of this embodiment is similar to that shown in FIG. 25.

Next, operation of the infrared-rays detector is explained with reference to FIG. 30, which shows an output signal (a) of the I/V converter 2, an output signal (b) of the second voltage amplifier 92, an output signal (c) of the popcorn noise detector 94, an output signal (d) of the controller 95, and an output signal (e) of the first voltage amplifier 91. The output signal (a) of the I/V converter 2 is sent to the first and second voltage amplifiers 91 and 92. When the output signal (b) of the second voltage amplifier 92 exceeds the predetermined value, the popcorn noise detector 94 decides that a popcorn noise is outputted by the pyroelectric element 1 and outputs a popcorn noise detection signal (c) to the controller 95. The controller 95 outputs an output inhibition signal (d) for a predetermined time of a few seconds when the popcorn noise detection signal is received from the popcorn noise detector 94.

While the controller 95 outputs an output inhibition signal, the first voltage amplifier 91 decreases the gain thereof to a degree such that the signal detector 93 does not output the detection signal. Then, even if the signal detector 93 receives the output signal (e) from the first voltage amplifier 91, the signal does not exceed a predetermined value in a length of time when a popcorn noise is considered to occur, and the detection signal is not sent to the external. Because the gain for the signal received by the first voltage amplifier is decreased in a very short time when a popcorn noise happens, the possibility of false report due to a popcorn noise is decreased.

Figure 31:
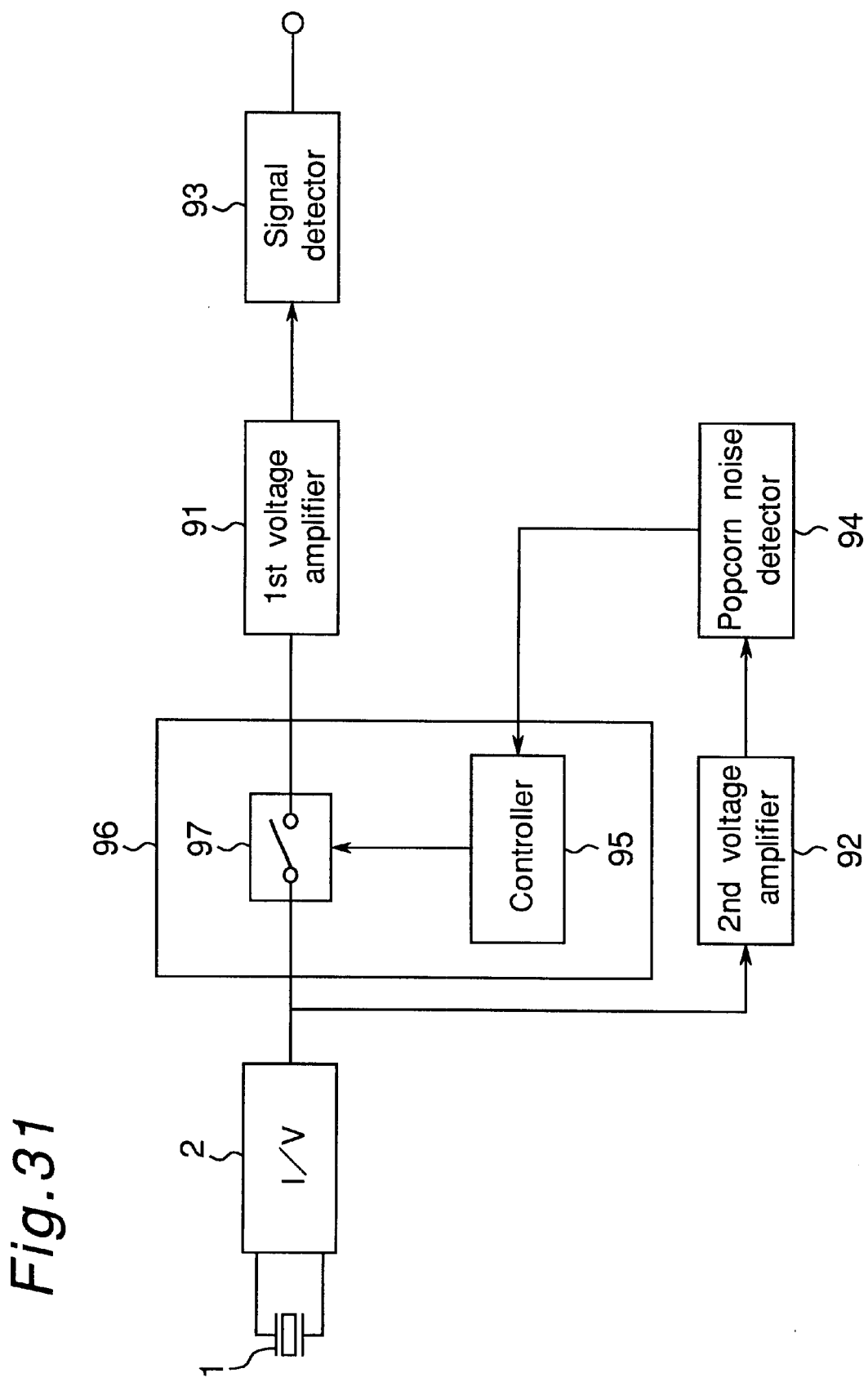
FIG. 31 is a block diagram of a modified infrared-rays detector in the tenth embodiment according to the invention.

Alternatively, as shown in FIG. 31, a switch circuit 97 may be provided between the I/V converter 2 and the first voltage amplifier 91. While an output inhibition signal is outputted by the controller 95, the signal from the I/V converter 2 is not sent to the first voltage amplifier 91.

Figure 32:
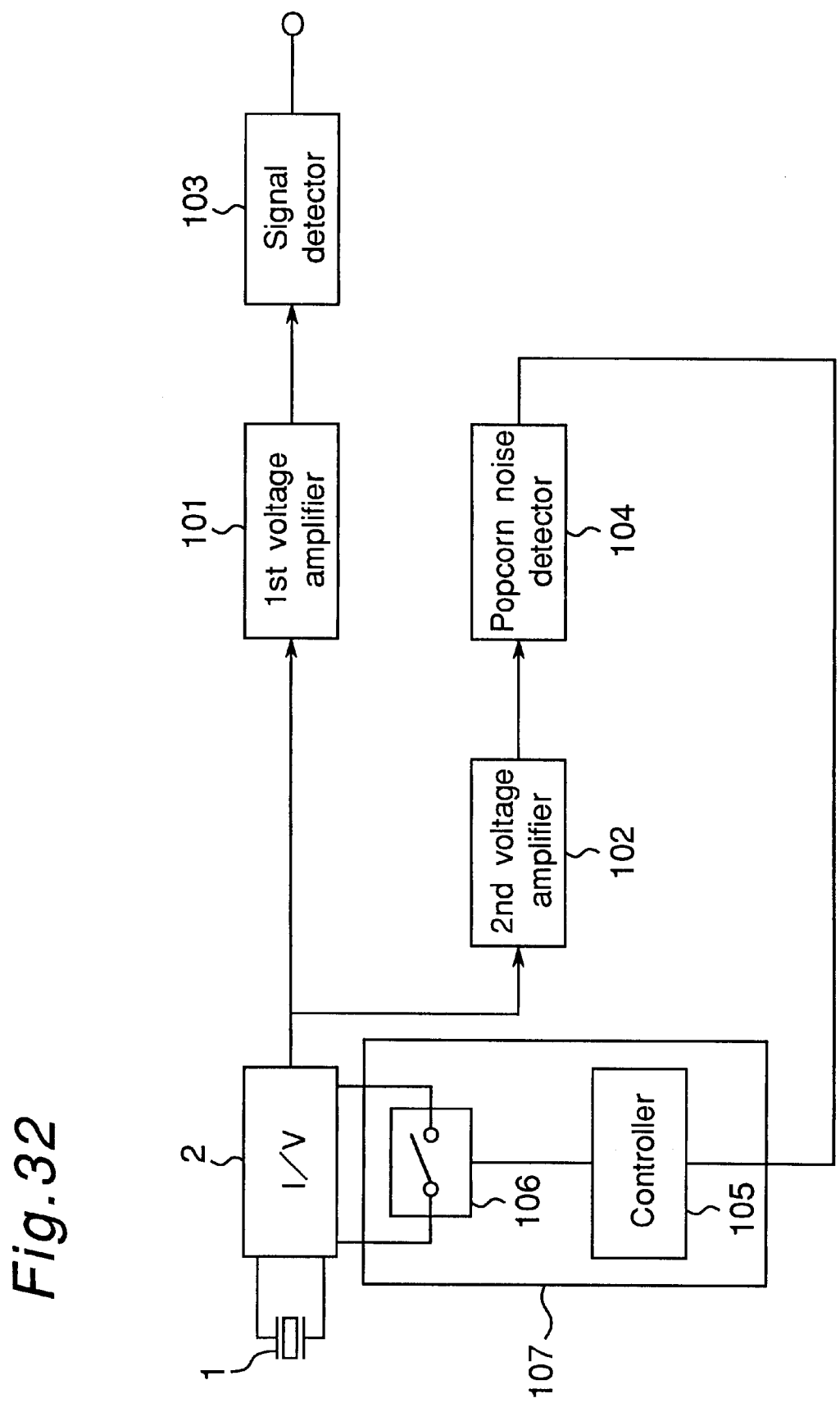
FIG. 32 is a block diagram of an infrared-rays detector of an eleventh embodiment according to the invention.
Figure 33:
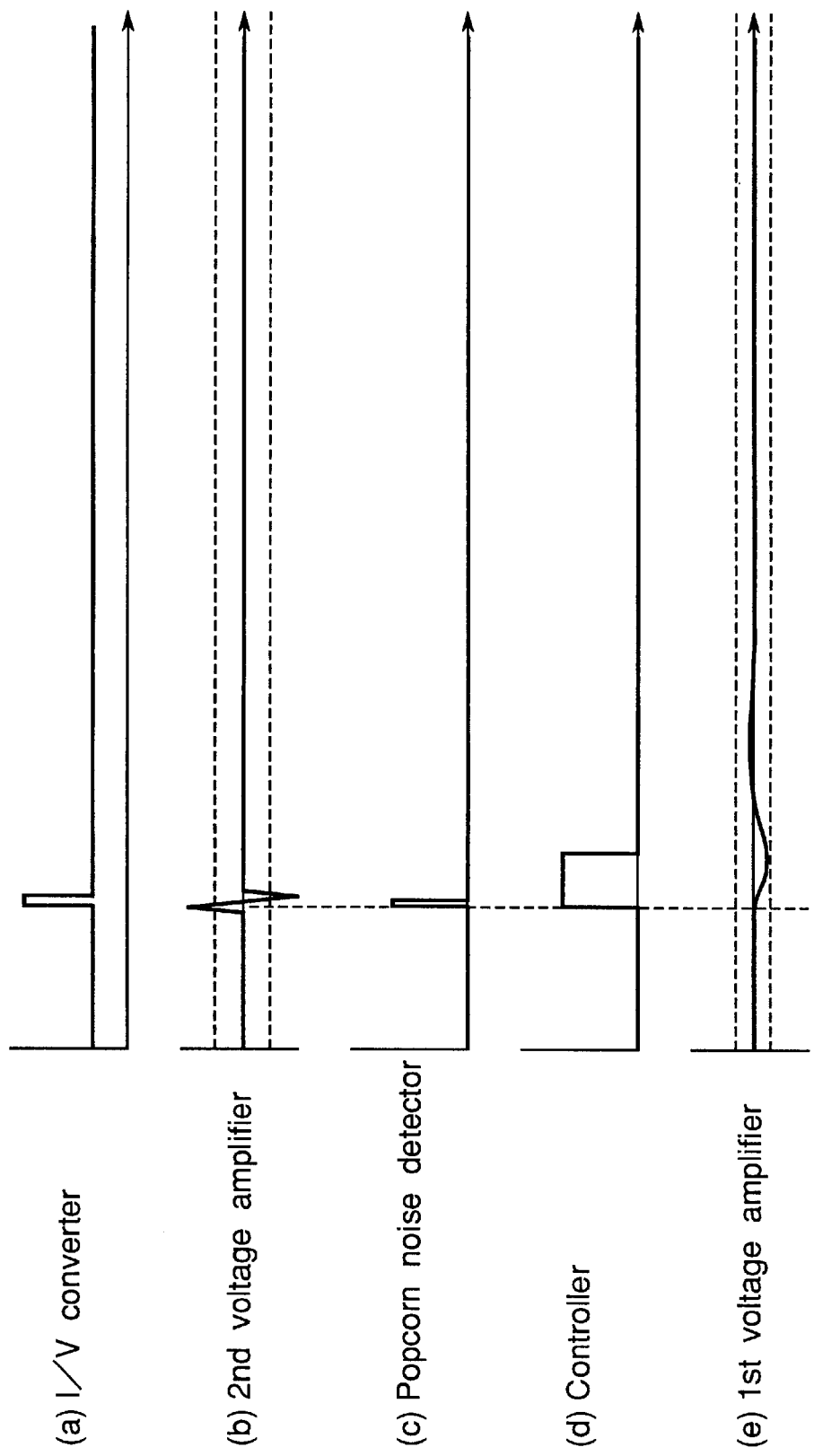
FIG. 33 is a time chart on signals in the infrared-rays detector.

An infrared-rays detector of an eleventh embodiment according to the present invention will be explained below with reference to FIGS. 32 and 33. As shown in FIG. 32, the infrared-rays detector comprises a pyroelectric element 1, an I/V converter 2, a first voltage amplifier 101, a second voltage amplifier 102, a detector 103, a popcorn noise detector 104, and an output controller 107 including a controller (timer circuit) 105 and a switch circuit 106. The basic structure of the infrared-rays detector of this embodiment is similar to that of the embodiment shown in FIG. 25.

While the controller 105 outputs an output inhibition signal, the switch 106 decreases the conversion impedance of the I/V converter 2 to decrease signal level for a signal due to popcorn noise received from the first voltage amplifier 101. Then, the output signal of the first voltage amplifier 101 does not exceed the predetermined value in the signal detector 103, and a malfunction due to popcorn noise can be prevented.

Next, operation of the infrared-rays detector is explained with reference to FIG. 33, which shows an output signal (a) of the I/V converter 2, an output signal (b) of the second voltage amplifier 102, an output signal (c) of the popcorn noise detector 104, an output signal (d) of the controller 105, and an output signal (e) of the first voltage amplifier 101. The output signal (a) of the I/V converter 2 is sent to the first and second voltage amplifier 101 and 102. When the output signal (b) of the second voltage amplifier 102 exceeds the predetermined value, the popcorn noise detector 104 decides that a popcorn noise is outputted by the pyroelectric element 1 and outputs a popcorn noise detection signal (c) to the controller 105. The controller 105 outputs an output inhibition signal (d) for a few seconds to the switch 106 when the popcorn noise detection signal is received from the popcorn noise detector 104.

While the controller 105 outputs the output inhibition signal, the switch 106 decreases the conversion impedance of the I/V converter 2. Then, while a popcorn noise occurs, even if the signal detector 103 receives the output signal (e) from the first voltage amplifier 101, the output signal of the first voltage amplifier 101 does not exceed the predetermined value, and the detection signal is not sent to the external.

As explained above, the gain of the I/V converter 2 is decreased only when a popcorn noise is outputted in this embodiment. Then, a time when the controller 105 outputs the output inhibition signal becomes very short.

Figure 34:
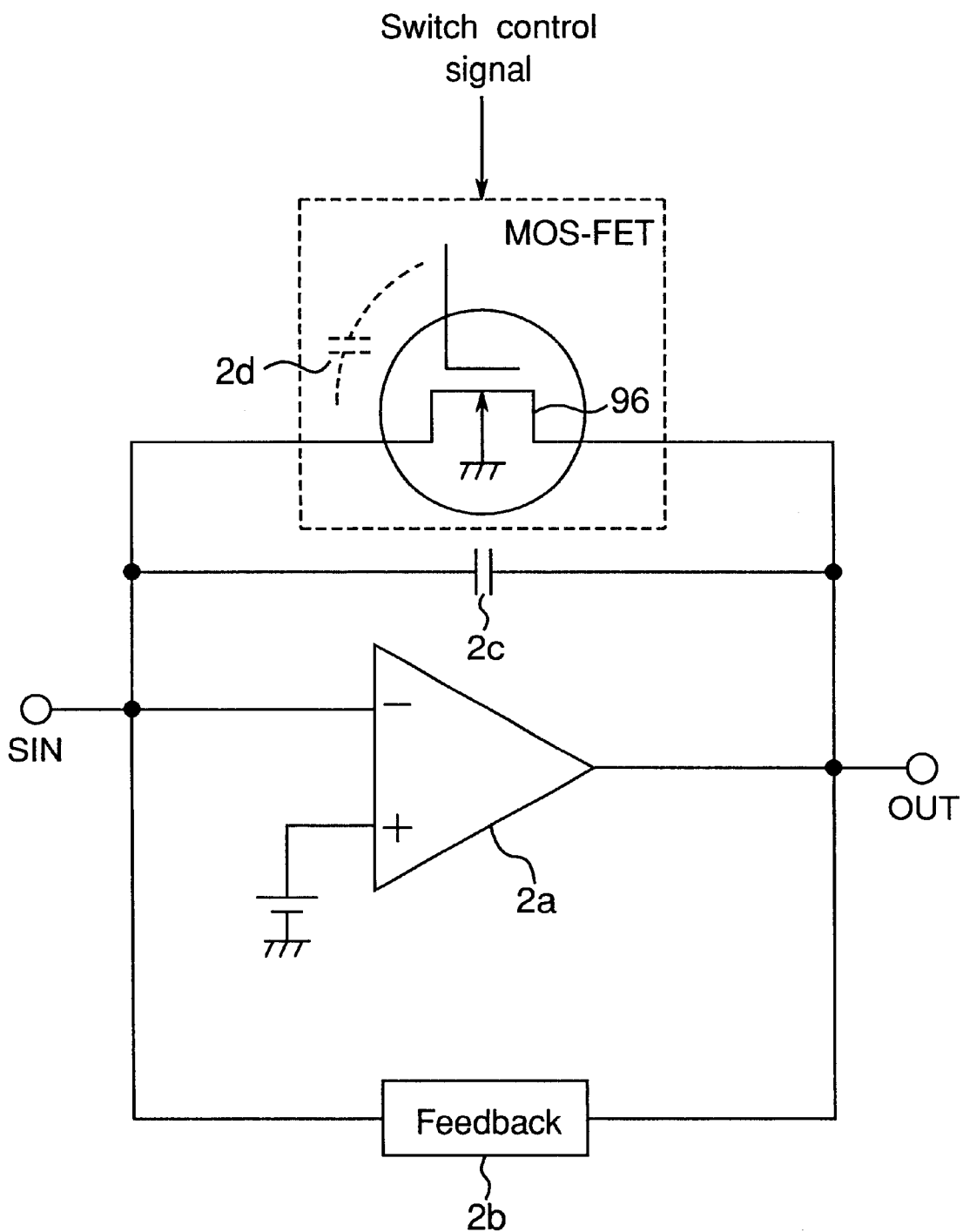
FIG. 34 is a circuit diagram of an I/V converter and a switch.

The infrared-rays detector shown in FIG. 32 is affected by a switching noise when the switch 96 is turned off, as will be explained below. FIG. 34 shows an example of the I/V converter 2 and the switch 96. The I/V converter 2 comprises an operational amplifier 2a, a feedback circuit 2b and a capacitor 2b. The switch 127 is a MOS-FET connected in parallel to the I/V converter 2. Because the I/V converter 2 has a very high impedance, when the switch 96 is operated, a switching noise arises at high frequencies due to a stray capacitance 2d in the MOS-FET. Then, it is desirable to prevent an erroneous report caused by such a switching noise.

An infrared-rays detector of a twelfth embodiment according to the present invention which solves this problem will be explained below with reference to FIGS. 35 and 36.

Figure 35:
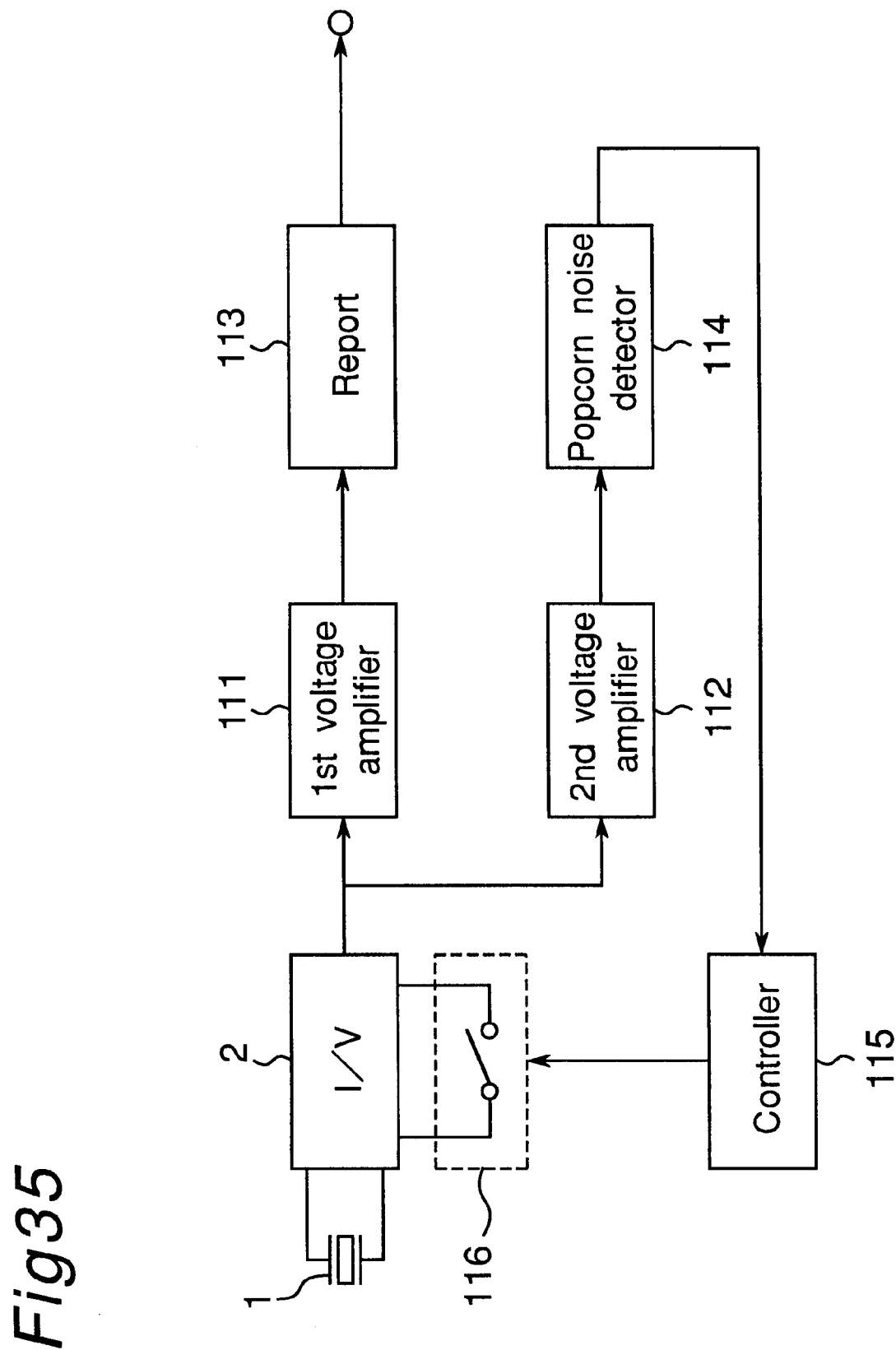
FIG. 35 is a block diagram of an infrared-rays detector of a twelfth embodiment according to the invention.
Figure 36:
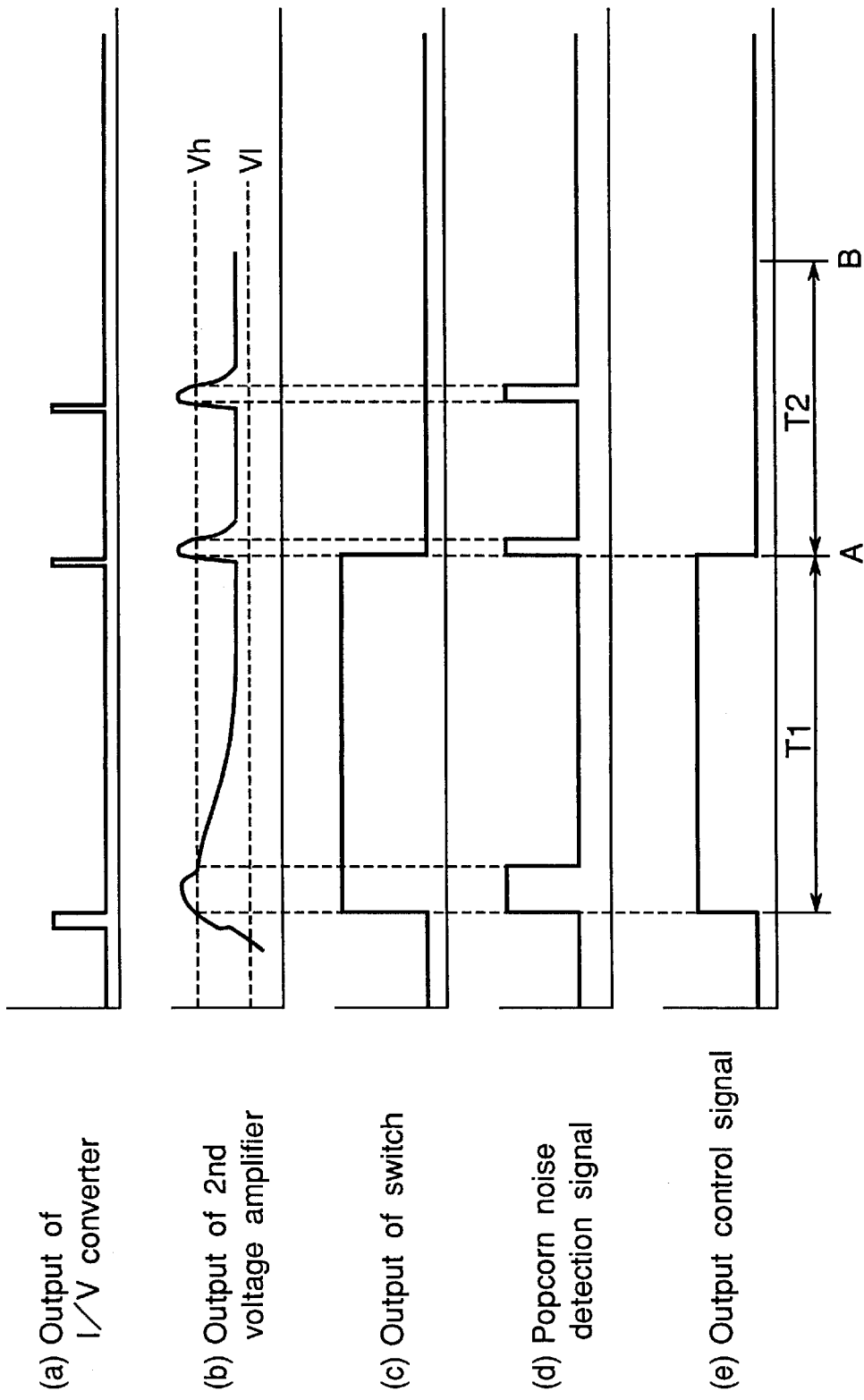
FIG. 36 is a timing chart for illustrating operation of the infrared-rays detector.

As shown in FIG. 35, the infrared detection apparatus comprises a pyroelectric element 1, an I/V converter 2, a first voltage amplifier 111, a second voltage amplifier 112, a report section 113, a popcorn noise detector 114, a controller 115, and a switch circuit 116. The pyroelectric element 1 outputs a current in correspondence to infrared-rays radiated from a monitor area, and the I/V converter 2 converts the detected current outputted from the pyroelectric element 1 to a voltage signal. The voltage signal is supplied to the first and second voltage amplifiers 111 and 112.

The first voltage amplifier 111 amplifies the voltage signal received from the I/V converter 2 and sends the result to the report section 113. The first voltage amplifier 111 has a characteristic of a band-pass filter passing components around 1 Hz in correspondence to the speed of movement of a human body. The report section 113 compares the signal outputted from the first voltage amplifier 111 with a predetermined value with a comparator, and it outputs a report signal if the signal received from the first voltage amplifier 111 has an amplitude exceeding the predetermined value.

The second voltage amplifier 112 has a characteristic of band-pass filter which transmits components in a transmission band from a few tens to a few hundreds Hz. When the output of the second voltage amplifier 112 has amplitude equal to or higher than a predetermined value, the popcorn noise detector 114 outputs a popcorn noise detection signal to the controller 115. The controller 115 outputs an output control signal (e) to the switch circuit 116 for a predetermined time T1 when the popcorn noise detection signal (d) is received. Once a popcorn noise is outputted, even if a signal is received from the popcorn noise detector 114, a signal is not outputted for a predetermined time T2 from an end A of the signal to B as shown in FIG. 36. Therefore, even if a switching noise is propagated to the popcorn noise detector 114 when the switch circuit 116 is turned off, the switch circuit 116 is not turned on again (refer to signal (c) in FIG. 36). As explained above, an erroneous report that a human body is detected is prevented to be outputted when a popcorn noise occurs in the pyroelectric element. Further, even if a switching noise happens, missing of report can be prevented by decreasing detection sensitivity for a certain time.

Figure 37:
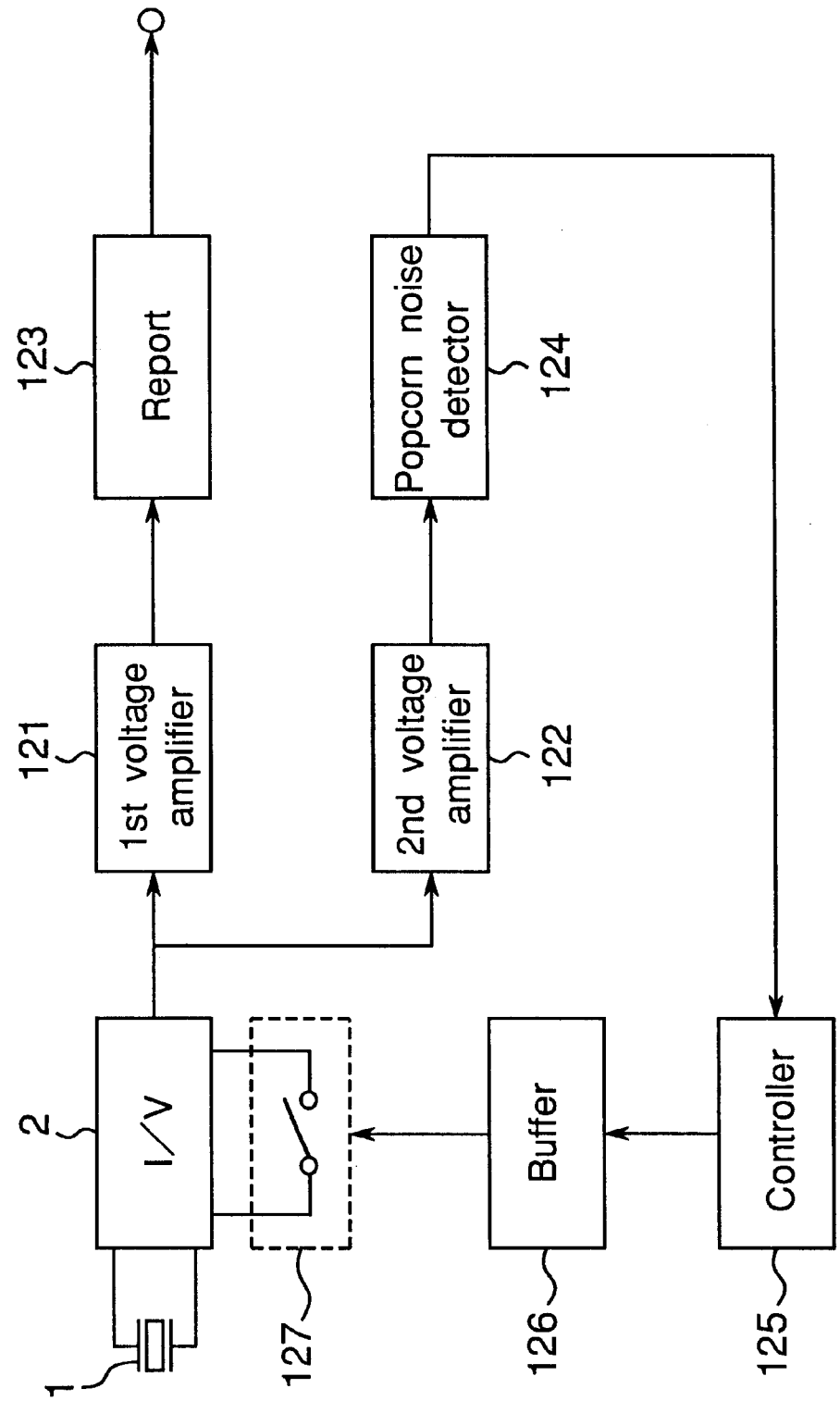
FIG. 37 is a block diagram of an infrared-rays detector of a thirteenth embodiment according to the invention.

An infrared-rays detector of a thirteenth embodiment according to the present invention which also solves the problem of switching noise will be explained below with reference to FIGS. 37–40. As shown in FIG. 37, the infrared-rays detector comprises a pyroelectric element 1, an I/V converter 2, a first voltage amplifier 121, a second voltage amplifier 122, a report section 123, a popcorn noise detector 124, and a controller 125, a buffer circuit 126 and a switch circuit 127. The pyroelectric element 1 outputs a current in correspondence to infrared-rays radiated from a monitor area. The I/V converter 2 converts the detected current outputted from the pyroelectric element 1 to a voltage and outputs the voltage to the first voltage amplifier 121 and to the second voltage amplifier 122.

The first voltage amplifier 121 amplifies the signal received from the I/V converter 2 and sends the result to the report section 123. The first voltage amplifier 121 has a characteristic of band-pass filter passing components around 1 Hz in correspondence to the speed of movement of a human body. The report section 123 compares the signal outputted from the first voltage amplifier 121 with a predetermined value with a comparator, and it outputs a detection signal if a signal received from the first voltage amplifier 121 has an amplitude exceeding the predetermined value. On the other hand, the second voltage amplifier 122 has a characteristic of band-pass filter which transmits components from a few tens to a few hundreds Hz, and it amplifies the signal received from the I/V converter 2.

Figure 38:
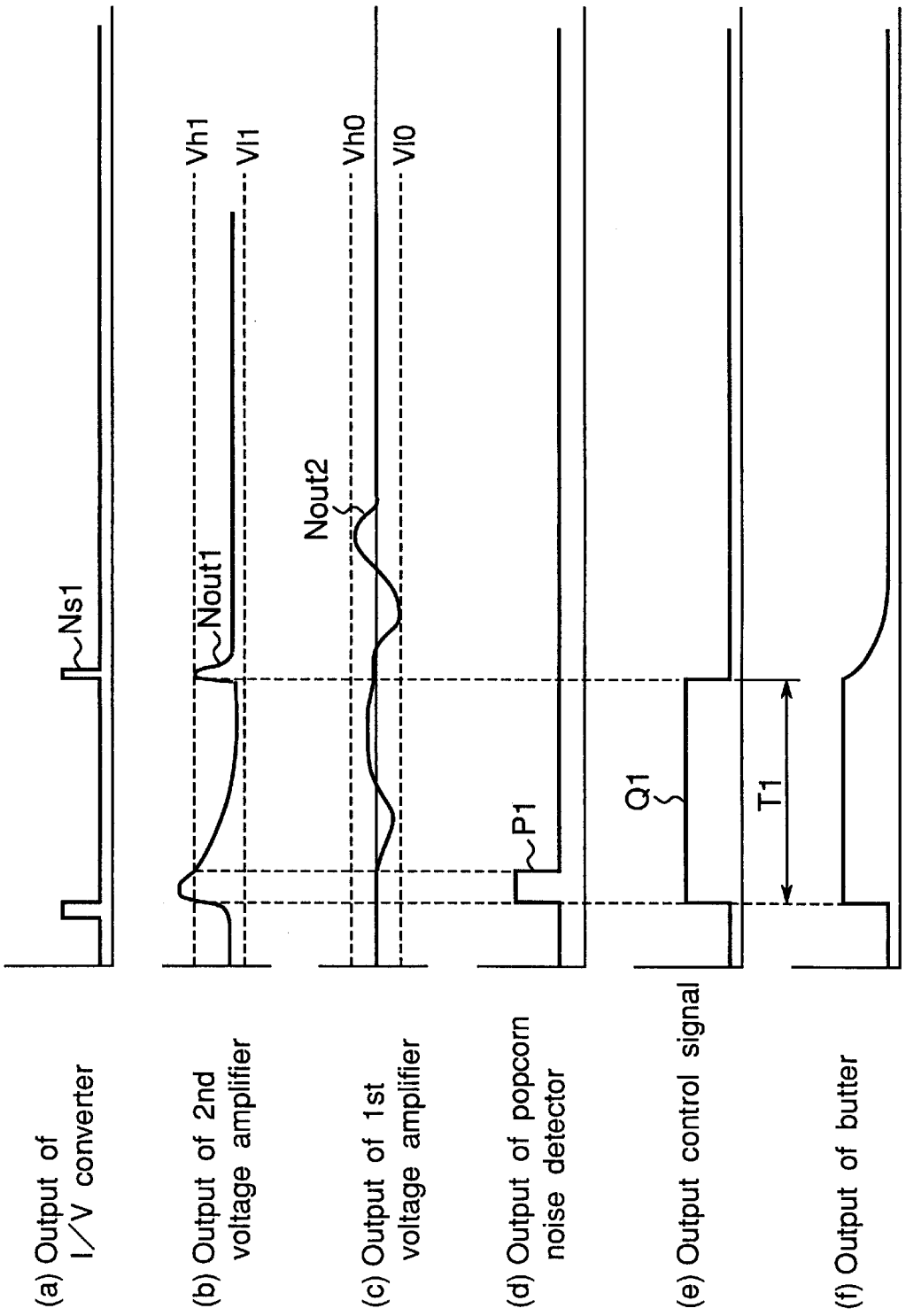
FIG. 38 is a timing chart for illustrating operation of the infrared-rays detector.

FIG. 38 is a timing chart for illustrating operation of the infrared-rays detector. The popcorn noise detector 124 outputs a popcorn noise detection signal (d) to the controller 125 when the output (b) of the second voltage amplifier 122 has an amplitude equal to or higher than a predetermined value Vh1, Vl1. The controller 125 outputs an output inhibition signal Q1 to the buffer circuit 126 for a predetermined time T1 when the popcorn noise is received.

While the output control signal Q1 is received through the buffer circuit 126, the switch 127 decreases conversion impedance of the I/V converter 2 so as to decrease the level of the signal generated by a popcorn noise. Then, the output signal (c) of the first amplifier does not exceed the predetermined values Vh0, Vl0 in the report section 123, and a popcorn noise is prevented to be output as a report signal. As explained above, by providing the buffer circuit 126, the switching noise is suppressed.

Figure 40:
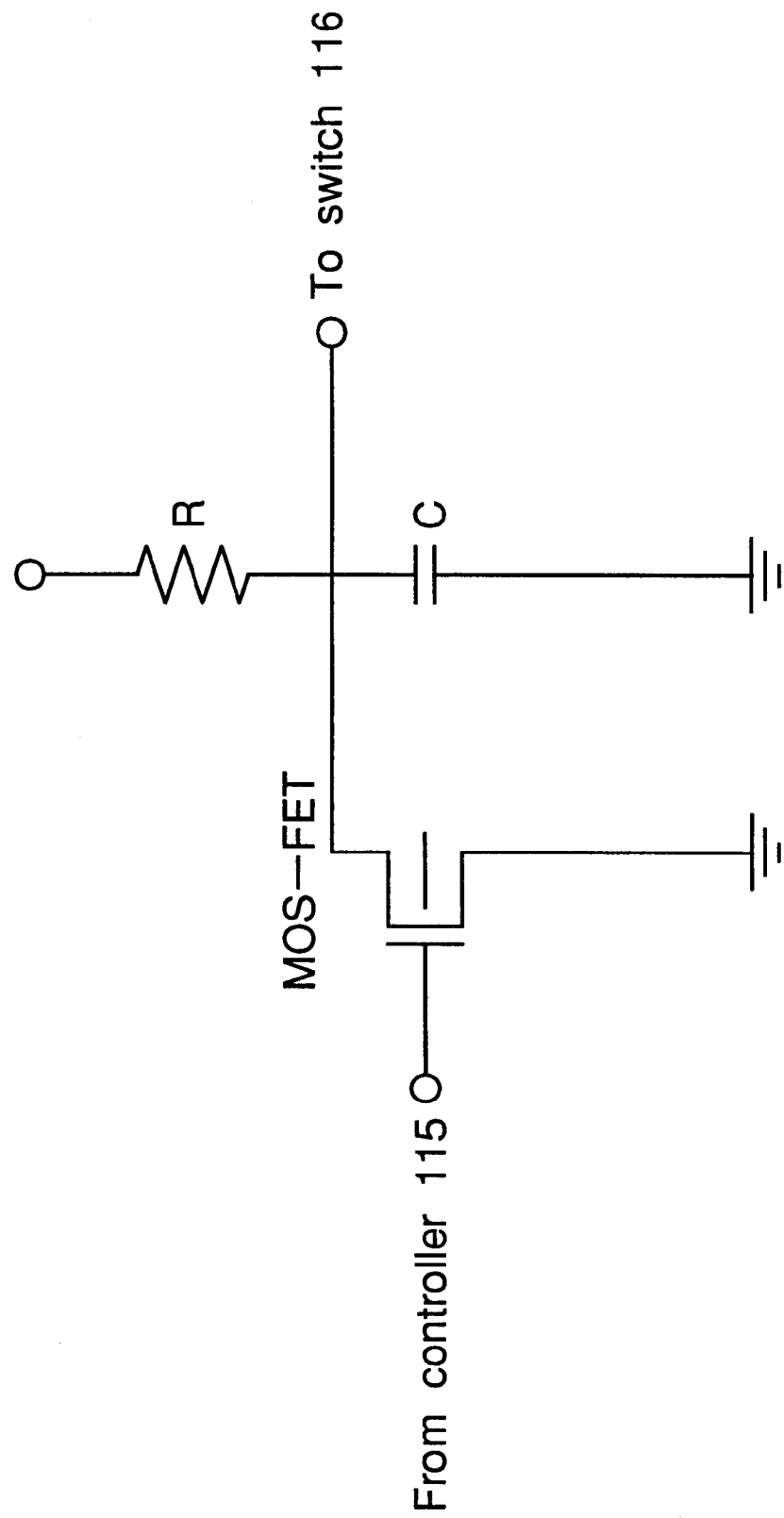
FIG. 40 is a circuit diagram of a main part of the buffer circuit in the infrared-rays detector.

As shown in FIG. 40, an example of the buffer circuit 126 is constructed by C, R and the like, and it adjusts the decay time of the output control signal Q1 from the output controller 125 to the switch circuit 127. The time constant of the buffer circuit 126 is determined by C and R.

Figure 39:
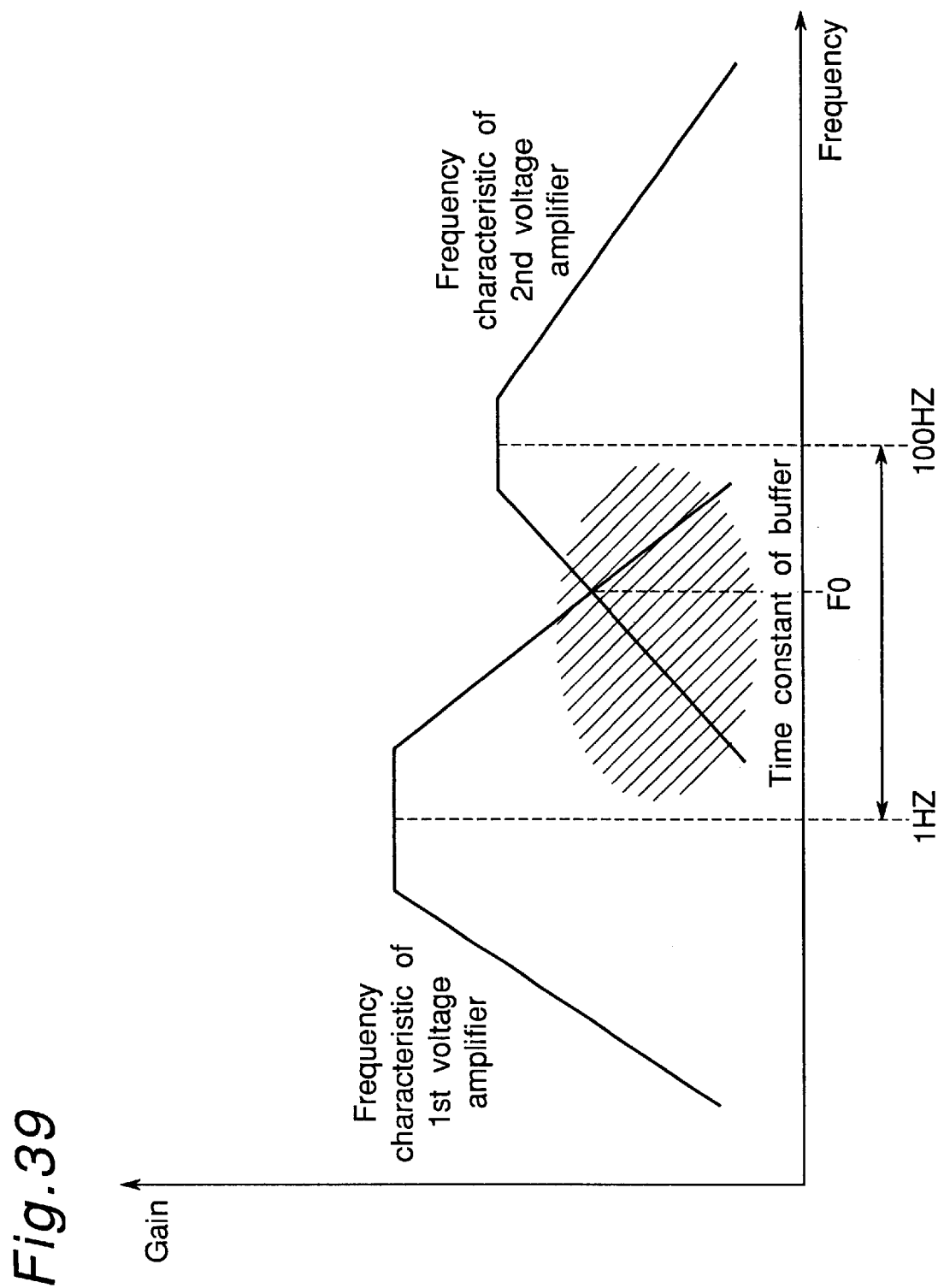
FIG. 39 is a graph of frequency characteristic of a buffer circuit in the infrared-rays detector.

As shown in FIG. 39 on frequency characteristic of the buffer circuit 126 in the infrared-rays detector, the time constant is set for a frequency F0 which is most suitable between about 1 Hz where the gain of the first voltage amplifier 121 becomes maximum and about 100 Hz where the gain of the second voltage amplifier 122 becomes maximum. That is, the gain is set so that the switching noise (a) shown as Ns1 in FIG. 38 is amplified by the first voltage amplifier 121 but does not exceed the predetermined value Vh0, V10. This prevents a false report by the report section 123. The gain is also set so that the switching noise is also amplified by the second voltage amplifier 122 but does not exceed the predetermined value Vh1, V11. This prevents a popcorn noise detection signal to be supplied by the popcorn noise detector 124. In an experiment, the most suitable frequency F0 for supplying a stable output signal is set to about 10 Hz.

Therefore, by using a small circuit made of R, C and the like, an erroneous report that an object is detected due to a popcorn noise from the pyroelectric element 1 can be prevented to be caused by a switching noise at the switch 127. Even if a switching noise happens, the infrared-rays detector is very reliable and does not output a false output signal when a popcorn noise occurs. Further, missing of report that the existence or movement of a human body can not detected is also prevented though detection sensitivity is decreased for a certain time.

Figure 41:
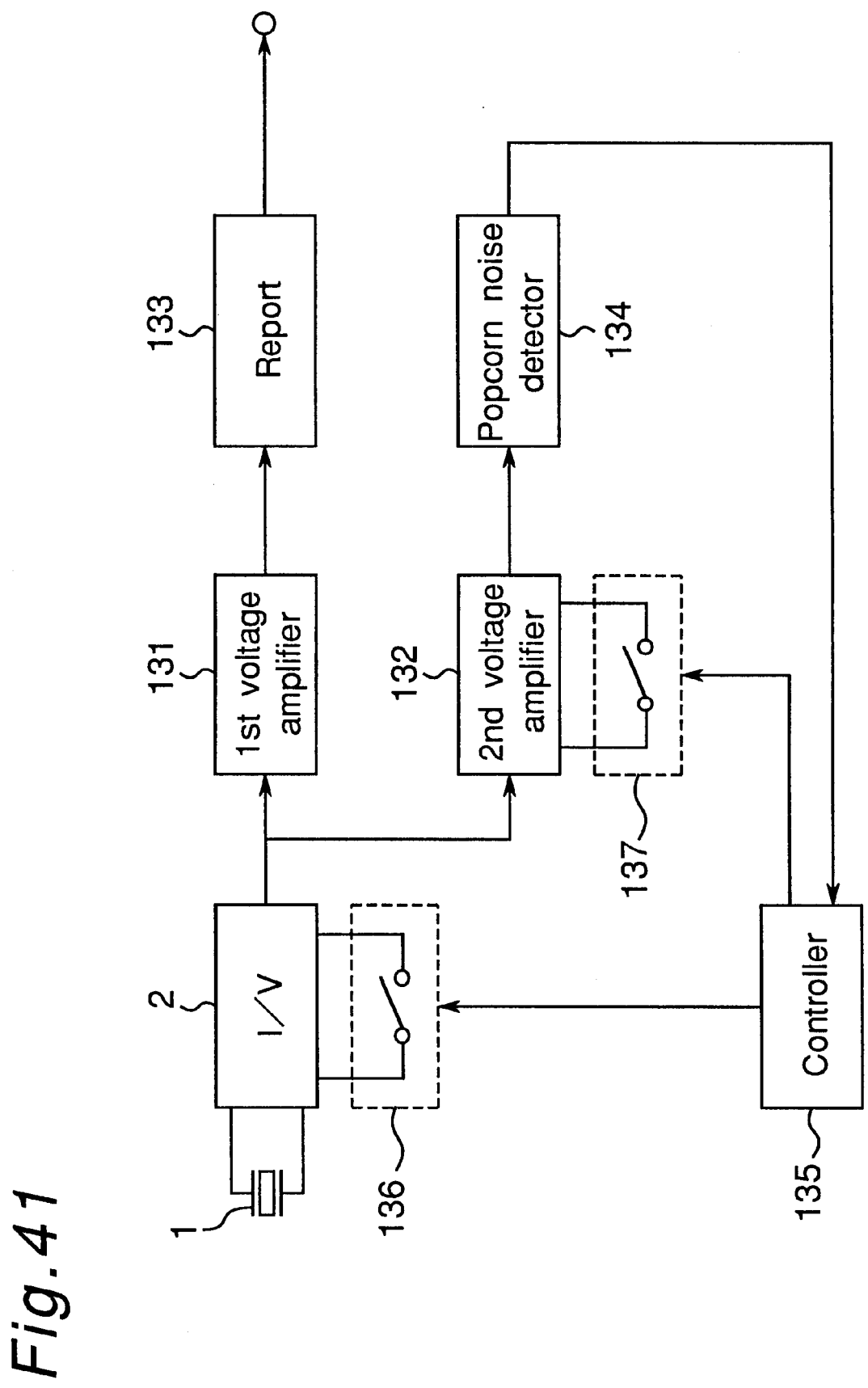
FIG. 41 is a block diagram of an infrared-rays detector of a fourteenth embodiment according to the invention.
Figure 42:
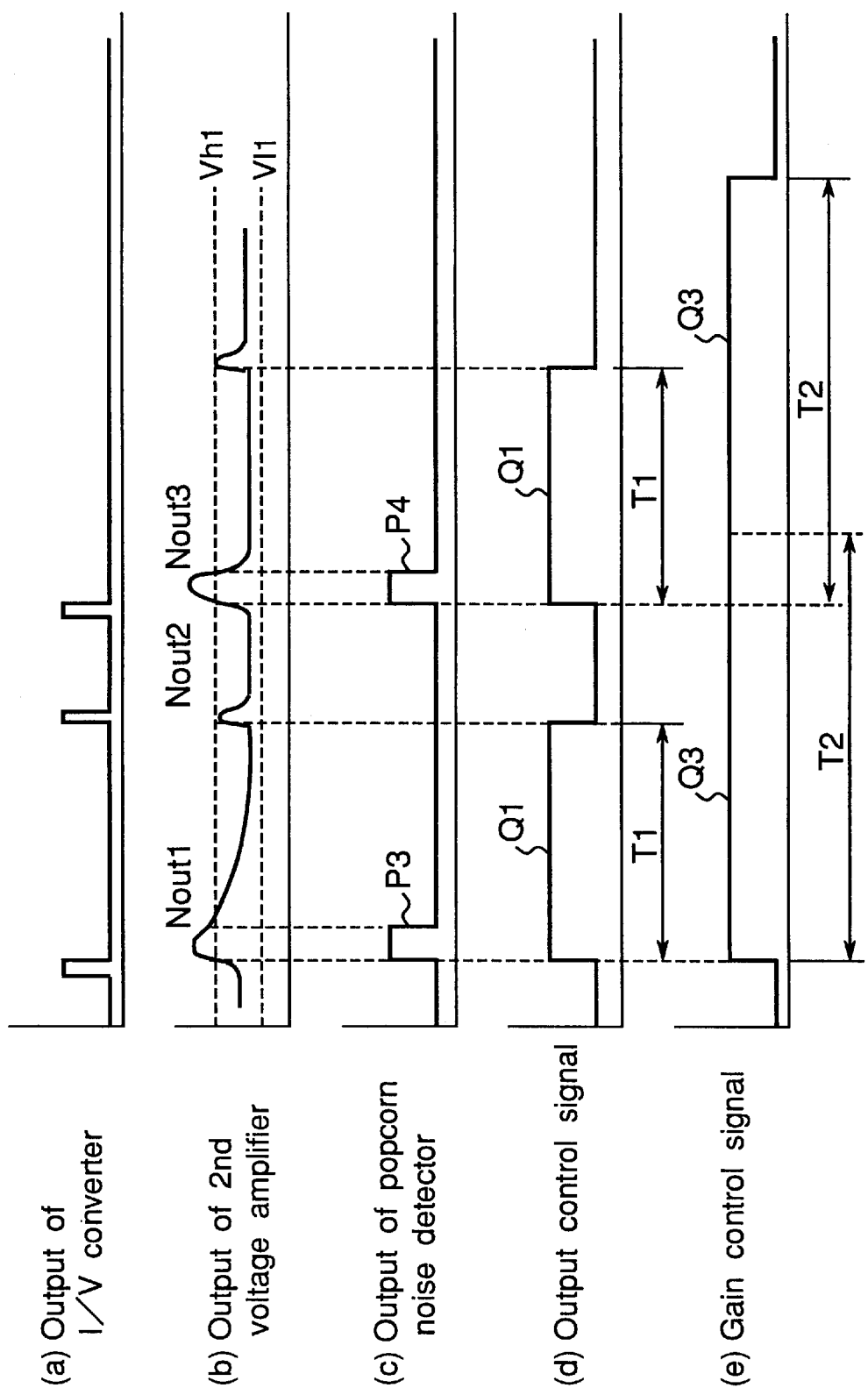
FIG. 42 is a timing chart for illustrating operation of the infrared-rays detector.

An infrared-rays detector of a fourteenth embodiment according to the present invention will be explained below with reference to FIGS. 41 and 42. A switching noise is a high frequency signal. In the infrared-rays detector shown in FIG. 32, the switching noise is amplified by the second voltage amplifier, and a popcorn noise detection signal is outputted which controls the I/V converter. Then, the output control signal is outputted intermittently, and the output of the I/V converter remain to be low, and the sensitivity to detect infrared rays is decreased. This embodiment solves this problem by using two timers. As shown in FIG. 41, the infrared-rays detector comprises a pyroelectric element 1, an I/V converter 2, a first voltage amplifier 131, a second voltage amplifier 132, a report section 133, the popcorn noise detector 134, a controller 135, a switch circuit 136 and another switch circuit 137. FIG. 42 is a timing chart for illustrating operation of the infrared-rays detector.

The pyroelectric element 1 outputs a current in correspondence to infrared rays radiated from a monitor area. The I/V converter 2 converts the detected current outputted from the pyroelectric element 1 to a voltage, and the voltage is supplied to the first voltage amplifier 131 and to the second voltage amplifier 132. The first voltage amplifier 131 amplifies a signal received from the I/V converter 2 and sends the result to the report section 133. The first voltage amplifier 131 has a characteristic of a band-pass filter passing components around 1 Hz in correspondence to the speed of movement of a human body. The report section 133 compares the signal outputted from the first voltage amplifier 131 with a predetermined value with a comparator, and it outputs a report signal if the signal received from the first voltage amplifier 131 has an amplitude exceeding the predetermined value.

Figure 43:
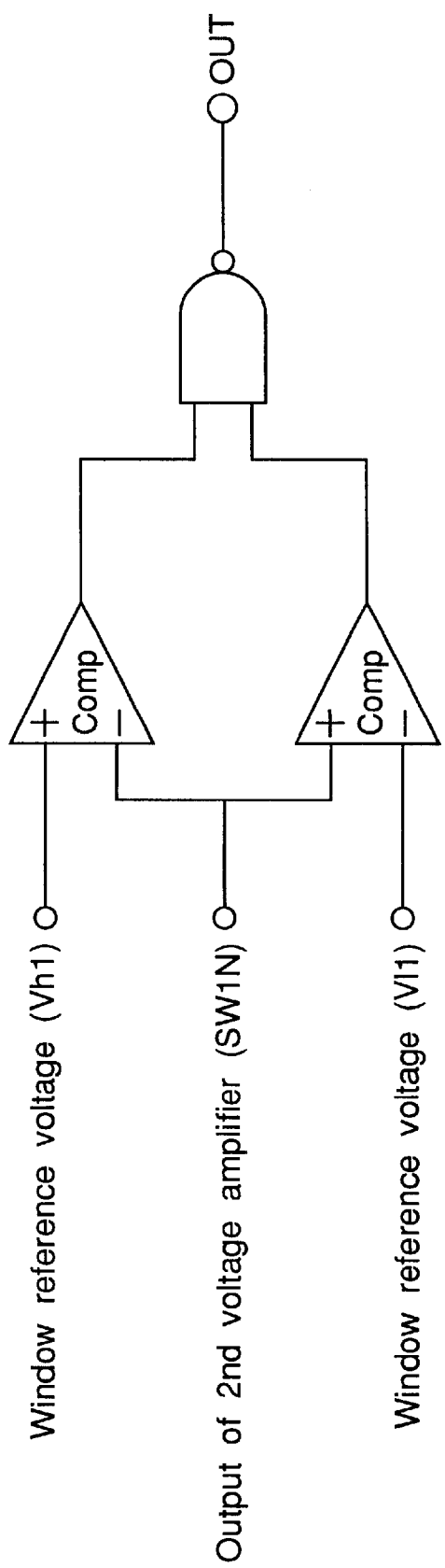
FIG. 43 is a block diagram of an infrared-rays detector of a fifteenth embodiment according to the invention.

On the other hand, the second voltage amplifier 132 amplifies the signal received from the I/V converter 2. The second voltage amplifier 132 has a characteristic of band-pass filter which transmits components from a few tens to a few hundreds Hz. The popcorn noise detector 134 outputs a popcorn noise detection signal P3, shown in (b) as Nout1 in FIG. 42, to the controller 135 when the output of the second voltage amplifier 132 has an amplitude equal to or higher than a predetermined value Vh1, V11. FIG. 43 shows an example of the popcorn noise detector 134.

As shown in FIG. 43, the popcorn noise detector 134 is a window comparator having two comparators, and it decides whether a signal SWIN received from the second voltage amplifier 132 exceeds the positive and negative reference voltages Vh1, Vl1 of the comparator. That is, the signal received from the second voltage amplifier 132 is compared with the predetermined reference voltages Vh1, V11. If SWIN>Vh1 or SWIN<Vl1, the popcorn noise detector 134 decides that a popcorn noise is detected and outputs a popcorn noise detection signal.

The controller 135 outputs an output control signal Q1 ((d) in FIG. 42), to the I/V converter 2 through the switch circuit 136 for a predetermined time T1 when the popcorn noise is received. At the same time, it outputs a gain suppression signal Q3 ((e) in FIG. 42) to the second voltage amplifier 132 through the switch circuit 137 for a predetermined time T2. It is to be noted that when a popcorn noise happens, it decays quickly or it is nonpersistent. When a popcorn noise is measured, it is found that the pulse width thereof is equal to or shorter than a few milliseconds though the peak levels thereof are various. Then, in order to decrease the conversion impedance of the I/V converter 2 and the gain of the second voltage amplifier 132, it is desirable that the times T1, T2 for outputting the output control signal Q1 and the gain suppression signal Q3 are set to a few seconds and that T1<T2.

Further, the amplitude of the switching noise is about 1 mV. Then, the switch circuit 137 decreases the gain of the second voltage amplifier 132 while the controller 135 outputs the gain suppression signal. Then, when the switch circuit 137 is turned off, signal level of the switching noise generated in the I/V converter 2 is decreased, as shown in Nout2 in the output (b) of the second voltage amplifier 132.

Therefore, because the output of the second voltage amplifier 132 does not exceed the predetermined values Vh1, V11 in the popcorn noise detector 134, a popcorn noise detection signal is not outputted from the popcorn noise detector 134, and the switch circuit 136 is not turned on again. However, the gain of the second voltage amplifier 132 is not set to zero, but it is decreased to a degree such that a popcorn noise detection signal due to switching noise is not outputted. Therefore, even in the time T2 where the gain suppression signal P4 is outputted, as shown in (c) in FIG. 42, the popcorn noise detector 134 can detect a popcorn noise Nout2 having a large amplitude, as shown in (b) in FIG. 42, generated by the pyroelectric element 1. That is, while the output of the I/V converter 2 is controlled, a popcorn noise having a large amplitude can be deleted. Then, an erroneous report signal that an object is detected is prevented at high precision to be outputted because a popcorn noise from the pyroelectric element 1 having a large amplitude can be eliminated when the output of the I/V converter 2 is controlled.

As explained above, an erroneous report signal for report is prevented that an object is detected when a popcorn noise occurs in the pyroelectric element. Further, though detection sensitivity is decreased for a certain time, missing of report that the existence or movement of a human body is detected is prevented. Thus an excellent infrared-rays detector is provided.

Figure 44:
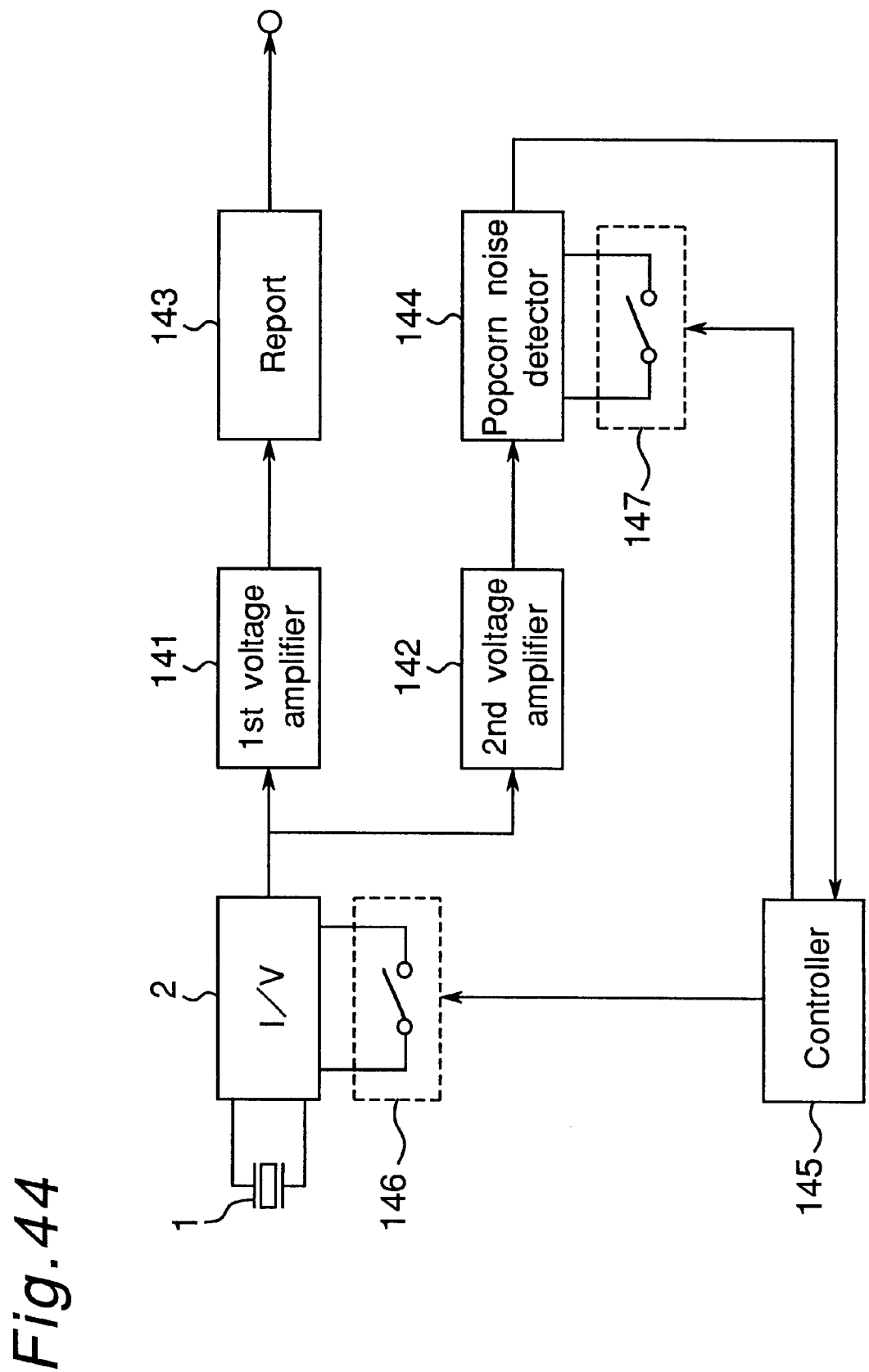
FIG. 44 is a circuit diagram of a main part of a popcorn noise detector in the infrared-rays detector.

An infrared-rays detector of a fifteenth embodiment according to the present invention will be explained below with reference to FIG. 44. The infrared-rays detector comprises a pyroelectric element 1, an I/V converter 2, a first voltage amplifier 141, a second voltage amplifier 142, a report section 143, a popcorn noise detector 144, a switch circuit 146 and another switch circuit 147. The basic structure of the infrared-rays detector of this embodiment is similar to that of the fourteenth embodiment, but the switch 147 is provided for the popcorn noise detector 144 instead of the switch circuit 137.

Figure 45:
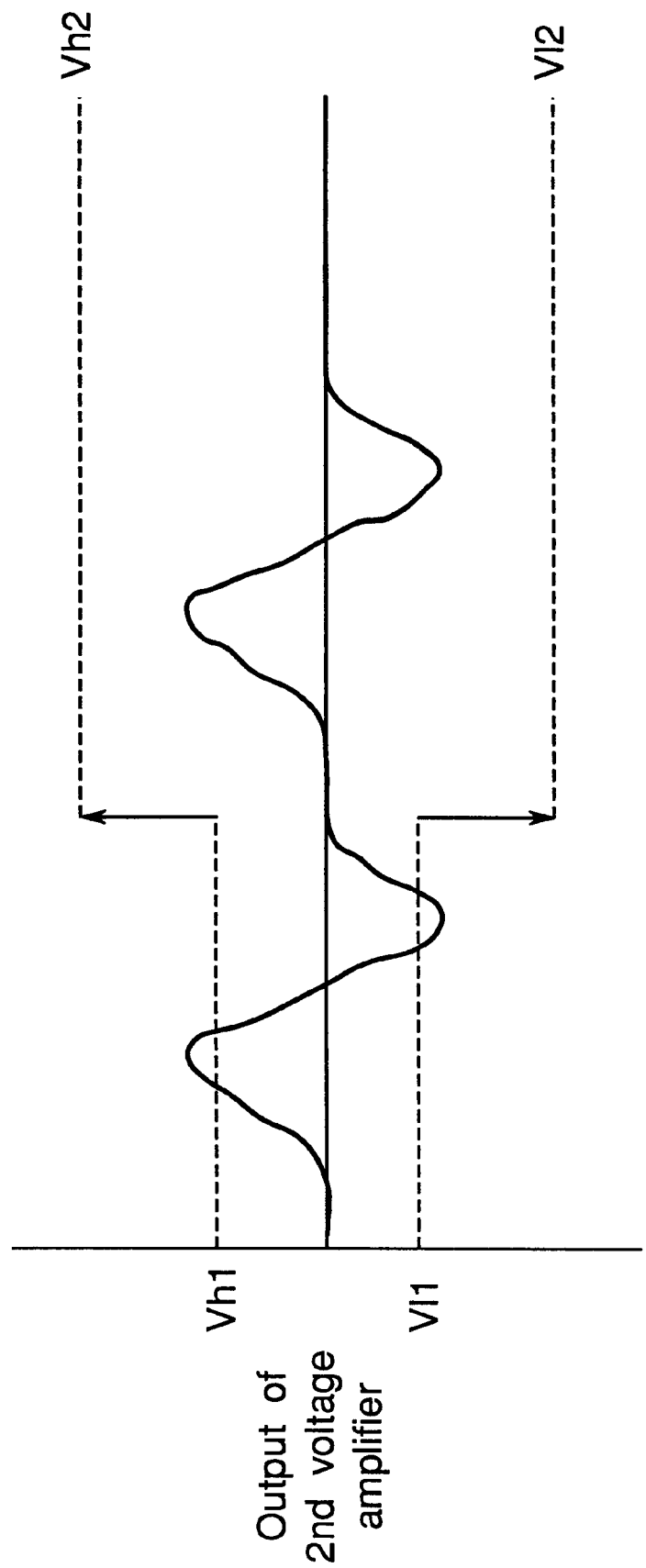
FIG. 45 is a diagram for illustrating operation of the popcorn noise detector.
Figure 46:
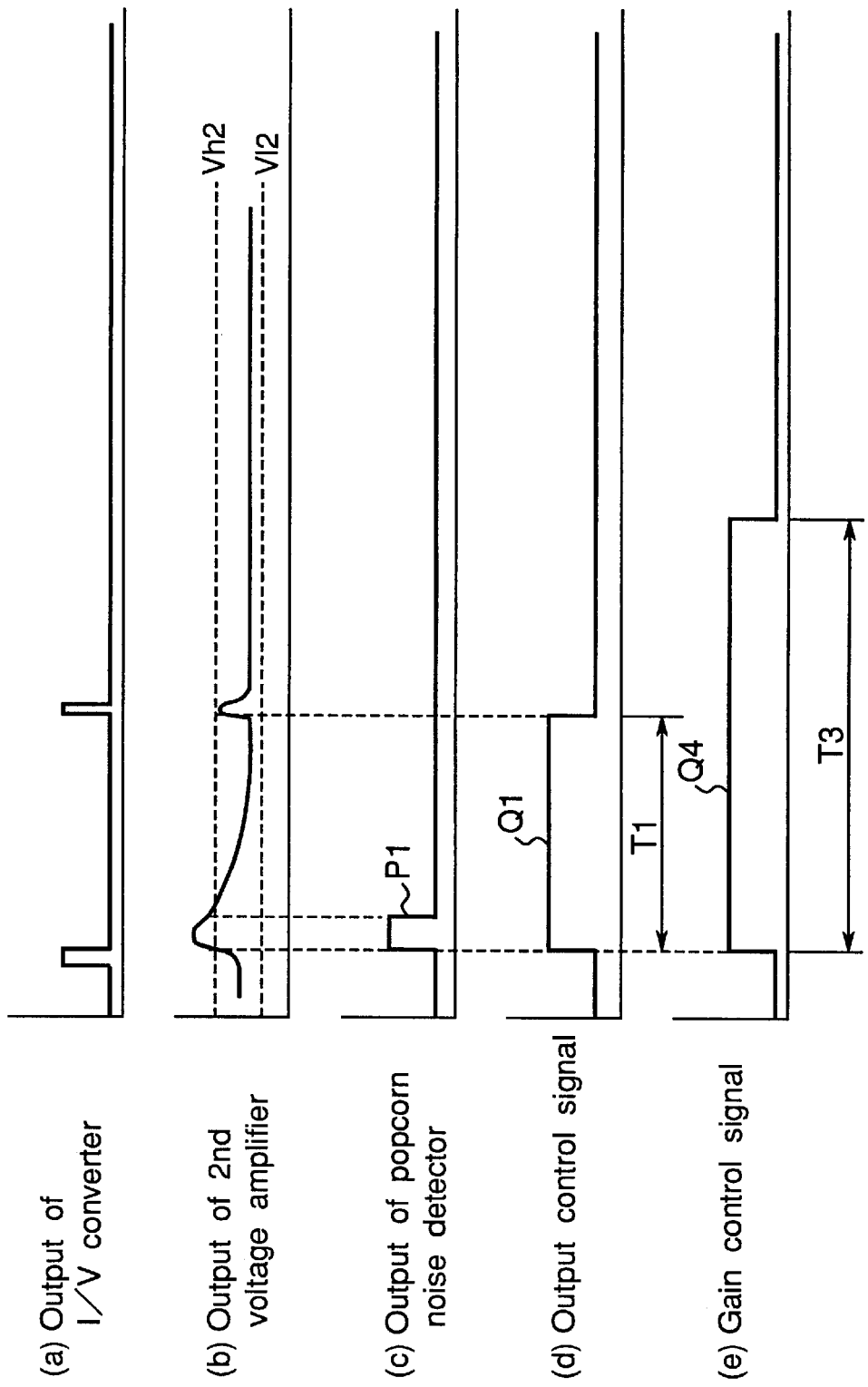
FIG. 46 is a timing chart for illustrating operation of the infrared-rays detector.

FIG. 46 is a timing chart for illustrating operation of the infrared-rays detector. When the popcorn noise detection signal P1 is received, the output controller 145 outputs an output control signal Q1 through the switch 146 to the I/V converter 2 for a predetermined time T1, as shown in (c) and (d) in FIG. 46. At the same time, as shown in (e), the output controller 145 outputs an output control signal Q4 through the switch 147 to the popcorn noise detector 144 for a predetermined time T3. While the detection level suppression signal Q4 is outputted, the popcorn noise detector 144 decreases the popcorn noise detection level to suppress a popcorn noise detection signal. In concrete, as shown in FIG. 45, the reference voltage Vh1 is shifted higher towards Vh2, or the reference voltage Vl1 is shifted lower towards Vl2. Then, in the popcorn noise detector 144, the output (b) of the second voltage amplifier 142 does not exceed the predetermined value Vh2 or Vl2, and the popcorn noise detection signal is not outputted by the popcorn noise detector 144.

As mentioned above, a popcorn noise has a pulse width equal to or shorter than a few milliseconds. Then, in order to decrease the conversion impedance of the I/V converter 2 and the detection level of the popcorn noise detector 144, it is desirable that the times T1, T2 for outputting the output control signal Q1 and the detection level suppression signal Q4 are set to a few seconds and that T1<T2.

In the I/V converter, an N-type MOS-FET is used as the FET in the I/V converter. However, there will be a case where a P-type MOS-FET is used, where the switch circuit is turned off when the control signal is changed from low to high level or the direction of the switching noises becomes negative. Therefore, the direction of the switching noise in the I/V converter 2 is determined uniquely when the structure of the switch circuit is determined. Then, when the popcorn noise detection level is decreased, it is not needed to shift both of reference voltages Vh1 and Vl1, and it is sufficient that one of them is shifted. When the detection level is decreased, the popcorn noise becomes more difficult to be detected, and this is not desirable inherently. However, one of the standard references is not needed to be shifted, and this means that the sensitivity to the direction to the standard reference is not decreased, and the sensitivity for the popcorn noise detection is not decreased in the direction advantageously.

Further, if the detection level suppression signal Q4 affects a path of a signal such as the output of the second voltage amplifier 142, the influence is treated at the same degree as the signal due to popcorn noise. Then, it is necessary to take care of the amplitude, frequency and the like of the signal. However, because the detection level suppression signal Q4 is sent to the window reference voltage terminal of the comparator, and the terminal is different from the input terminal for the output of the second voltage amplifier 142. Then, the interference between the two signals can be neglected. That is, the detection level can be decreased without affecting the path of the popcorn noise signal directly.

As explained above, the detection level can be decreased without affecting the path of the popcorn noise detection directly. Further, the sensitivity for the popcorn noise detection is not decreased in one direction, and a malfunction can be prevented at high precision.

In the infrared-rays detector as shown in FIG. 32, the I/V converter 2 and the first voltage amplifier 91 include a plurality of operational amplifiers. When a gain of the circuit is changed, the bias voltages of the amplifiers and the dc output signals thereof are affected by the bias voltages or bias currents. Then, the input at the first voltage amplifier 91 is changed like a step signal, and if such a signal is amplified, an erroneous report signal is generated. Therefore, even if bias voltages appear in amplifiers and the like in the I/V converter 2 or the first voltage amplifier 91 or if a popcorn noise happens before the signal is stabilized, it is desirable that a false report that an object is detected is prevented.

In some embodiments explained below, when a popcorn noise detection signal is received, the controller controls two or more components in the infrared-rays detector. The controller uses a timer to generate a plurality of times to be sent to the components. The times are selected so that in the flow of signals, a component at the downstream side is not affected by another component, in the upstream side.

Figure 47:
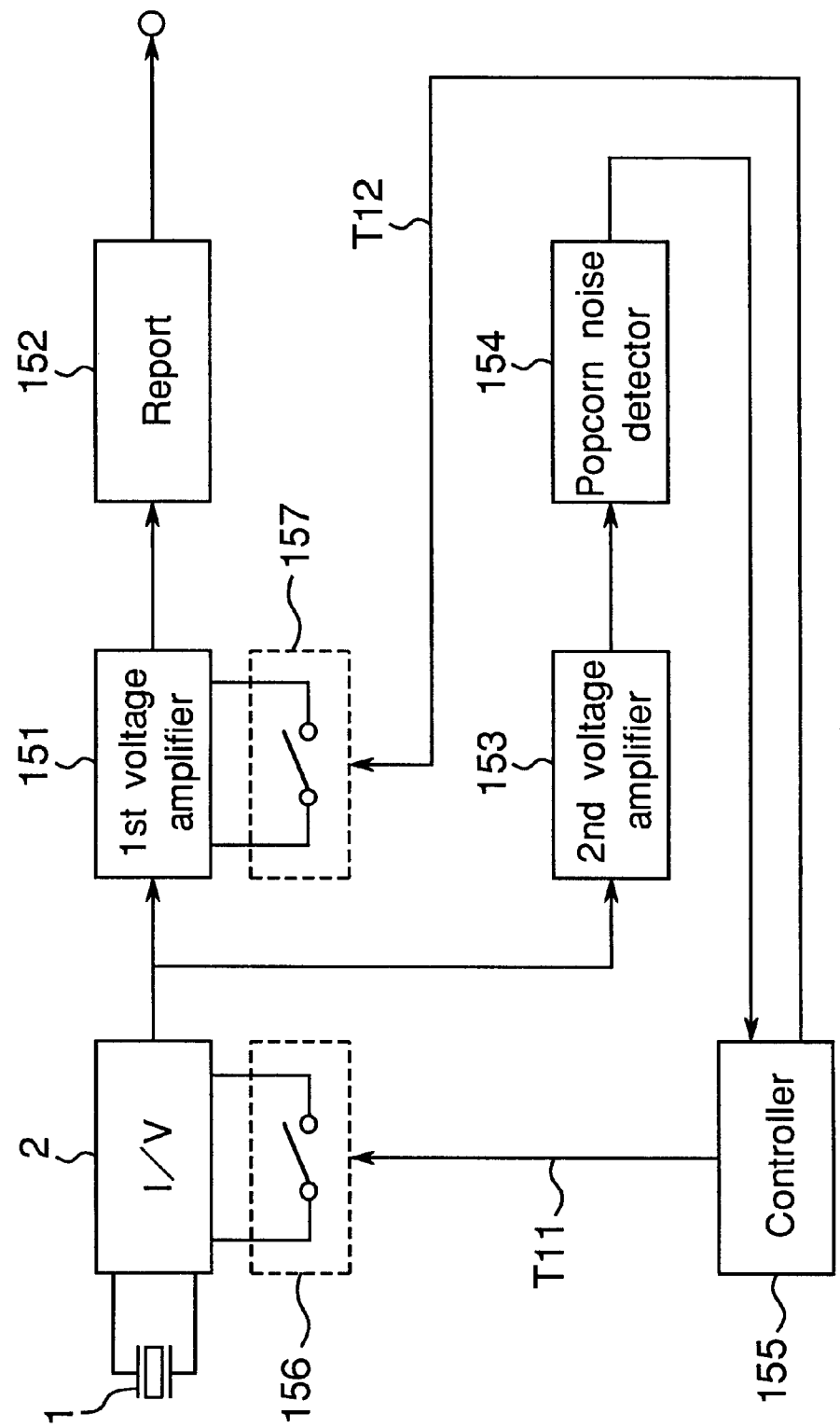
FIG. 47 is a block diagram of an infrared-rays detector of a sixteenth embodiment according to the invention.
Figure 48:
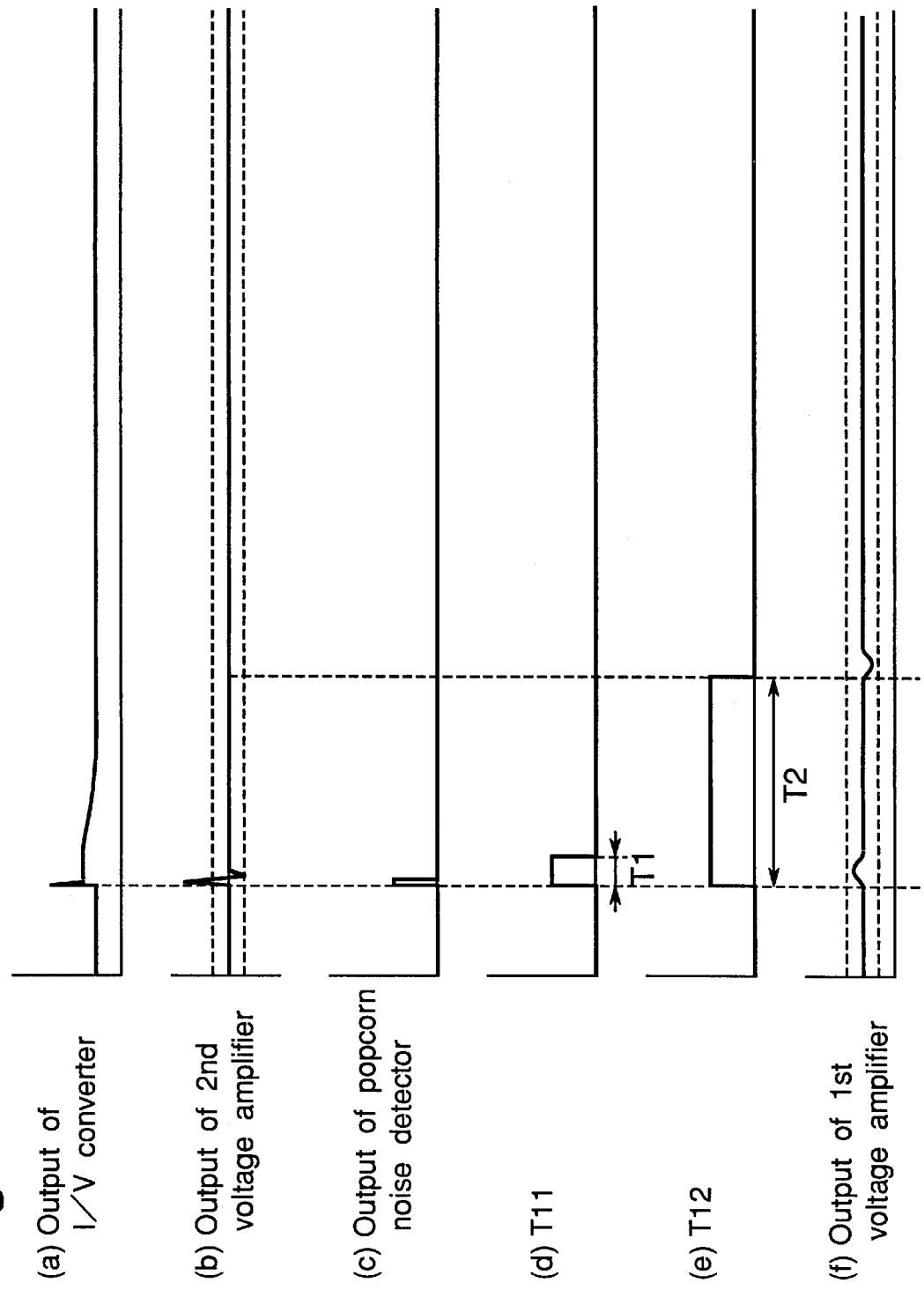
FIG. 48 is a timing chart for illustrating operation of the infrared-rays detector.

An infrared-rays detector of a sixteenth embodiment according to the present invention will be explained below with reference to FIGS. 47 and 48. As shown in FIG. 47, the infrared-rays detector comprises a pyroelectric element 1, an I/V converter 2, a first voltage amplifier 151, a second voltage amplifier 152, a report section 153, a popcorn noise detector 154, and a controller 155 having a timer circuit, a switch circuit 156 and another switch circuit 157. FIG. 48 is a timing chart for illustrating operation of the infrared-rays detector.

The pyroelectric element 1 outputs a current in correspondence to infrared rays radiated from a monitor area. The I/V converter 2 converts the detected current outputted from the pyroelectric element 1 to a voltage. The voltage signal is sent both to the first voltage amplifier 151 and to the second voltage amplifier 152. The report section 153 compares the signal outputted from the first voltage amplifier 151 with a predetermined value with a comparator, and it outputs a report signal if the signal received from the first voltage amplifier 151 has an amplitude exceeding the predetermined value. On the other hand, the second voltage amplifier 152 amplifies the signal by selecting frequencies higher than the first voltage amplifier 151 and sends it to the popcorn noise detector 154. When the output of the second voltage amplifier 152 has an amplitude equal to or higher than a predetermined value, as shown in (b) in FIG. 48, the popcorn noise detector 154 outputs a popcorn noise detection signal, as shown in (c) in FIG. 48.

When a popcorn noise detection signal is received from the popcorn noise detector 154, the controller 155 supplies two different timer outputs T11 and T12. The timer output T11 is a pulse signal with a time width T1 to the switch 156, and the timer output T12 is a pulse signal with a time width T2 to the switch 157. The timer output T11 having a pulse with T1, as shown in (d) in FIG. 48, is received by the switch 156 to decrease a gain of the I/V converter 2 over the time T1. Then, as shown in (f) in FIG. 48, even if the signal outputted by the first voltage amplifier 151 is received by the report section 153, it does not exceed the predetermined value. Then, a report signal is not outputted. The time width T1 is set longer than several milliseconds which is an output time of a popcorn signal. Then, the output of the I/V converter 2 is not affected by the signal level of the popcorn noise, and it is is affected only by bias voltages of the amplifiers and the like. On the other hand, the timer output T12 having the width T2, as shown in (e) in FIG. 48, is sent to the switch 157 to decrease the gain of the first voltage amplifier 151 over the time T2.

The time T2 is set longer than T1. Thus, the gain of the first voltage amplifier 151 is decreased for several seconds when a step-like input signal affected by bias voltages in the I/V converter and the like is amplified by the first voltage amplifier 151 and is not detected by the report section 153. Further, the effect of the fluctuations of the bias voltage in the first voltage amplifier 151 is reduced to become smaller than the predetermined value set in the report section 153. By setting the time T2 appropriately, the time of so-called missing report is shortened, and false report by decreasing the sensitivity can be prevented surely.

Figure 49:
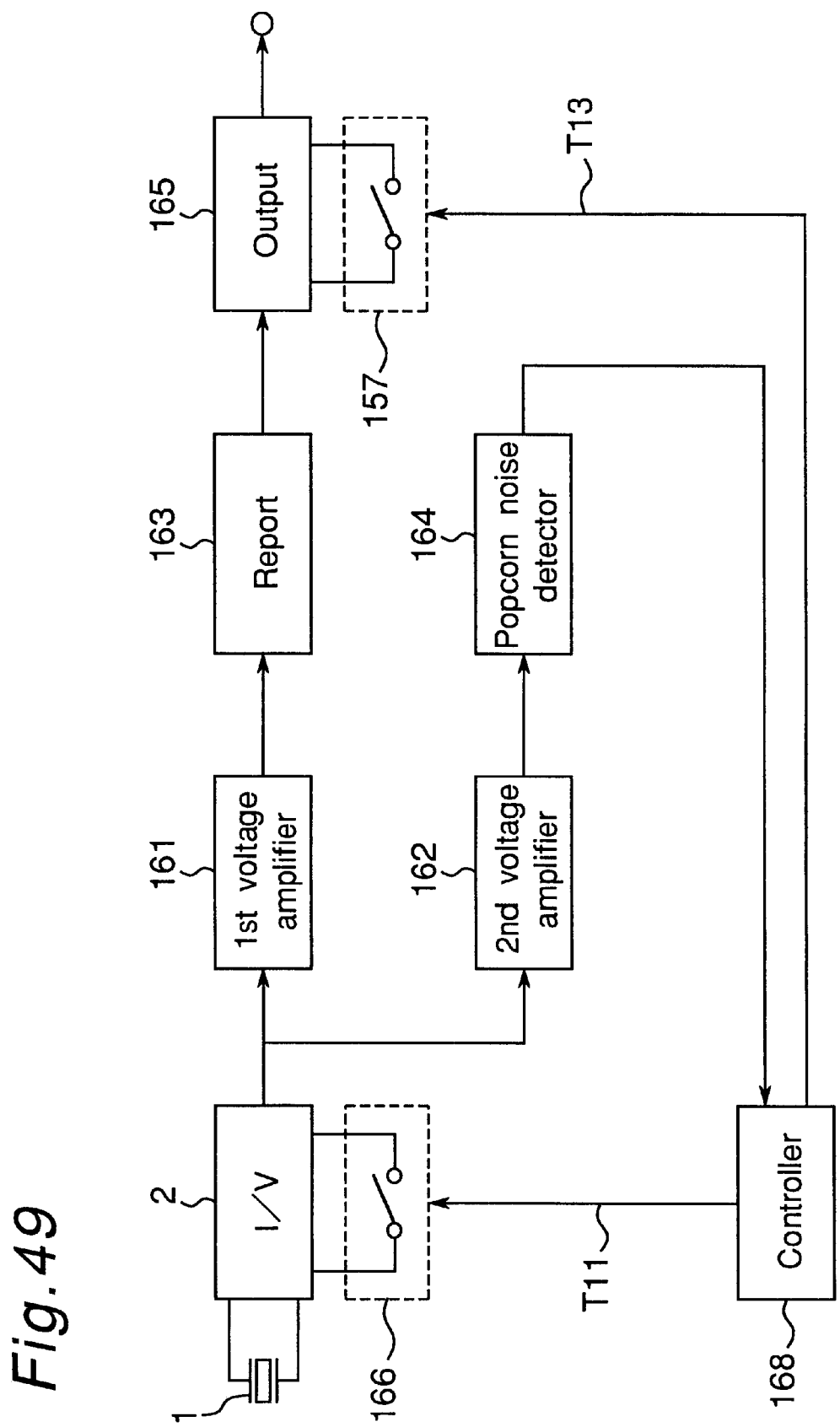
FIG. 49 is a block diagram of an infrared-rays detector of a seventeenth embodiment according to the invention.
Figure 50:
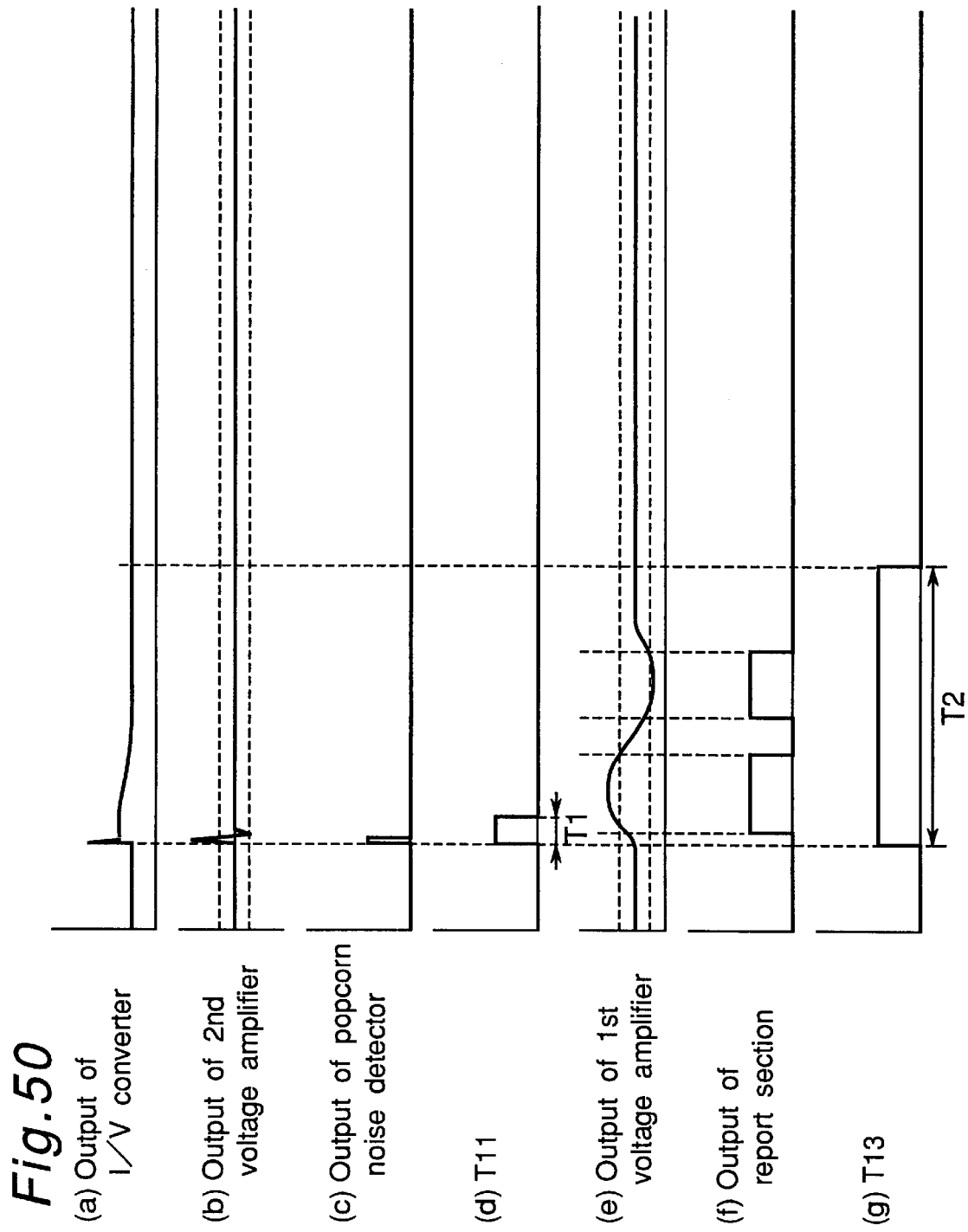
FIG. 50 is a timing chart for illustrating operation of the infrared-rays detector.

FIG. 49 is a block diagram of an infrared-rays detector of a seventeenth embodiment. The infrared-rays detector comprises a pyroelectric element 1, an I/V converter 2, a first voltage amplifier 161, a second voltage amplifier 162, a report section 163, a popcorn noise detector 164, and an output circuit 165, a switch circuit 166, another switch circuit 167 and a controller 168 having a timer circuit. The basic structure of the infrared-rays detector of the embodiment is similar to that of the sixteenth embodiment. FIG. 50 is a timing chart for illustrating operation of the infrared-rays detector.

Similarly to FIG. 48, when a popcorn noise detection signal is received from the popcorn noise detector 164, the controller 168 outputs two different timer outputs T1 and T13. The signal of the pulse width T1 is similar to the counterpart in the sixteenth embodiment. It decreases the gain of the I/V converter 2 for the time T1, and the output from the I/V converter is affected only by the bias voltages of the amplifiers and the like, irrespective of popcorn noise. Therefore, the output of the first voltage amplifier 161 exceeds the predetermined value in the report section 163 due to the output of the I/V converter 2, only for a determined time as shown in (e) in FIG. 50.

On the other hand, the timer output T13 has the width T3, as shown in (g) in FIG. 50, and it is sent to the switch 167 to control the output circuit 165 over the time T3 to inhibit a report signal. The pulse time of T3 is set to be longer than T1. Then, the time of so-called missing report is shortened, and false report can be prevented surely by using the output inhibitor.

Figure 51:
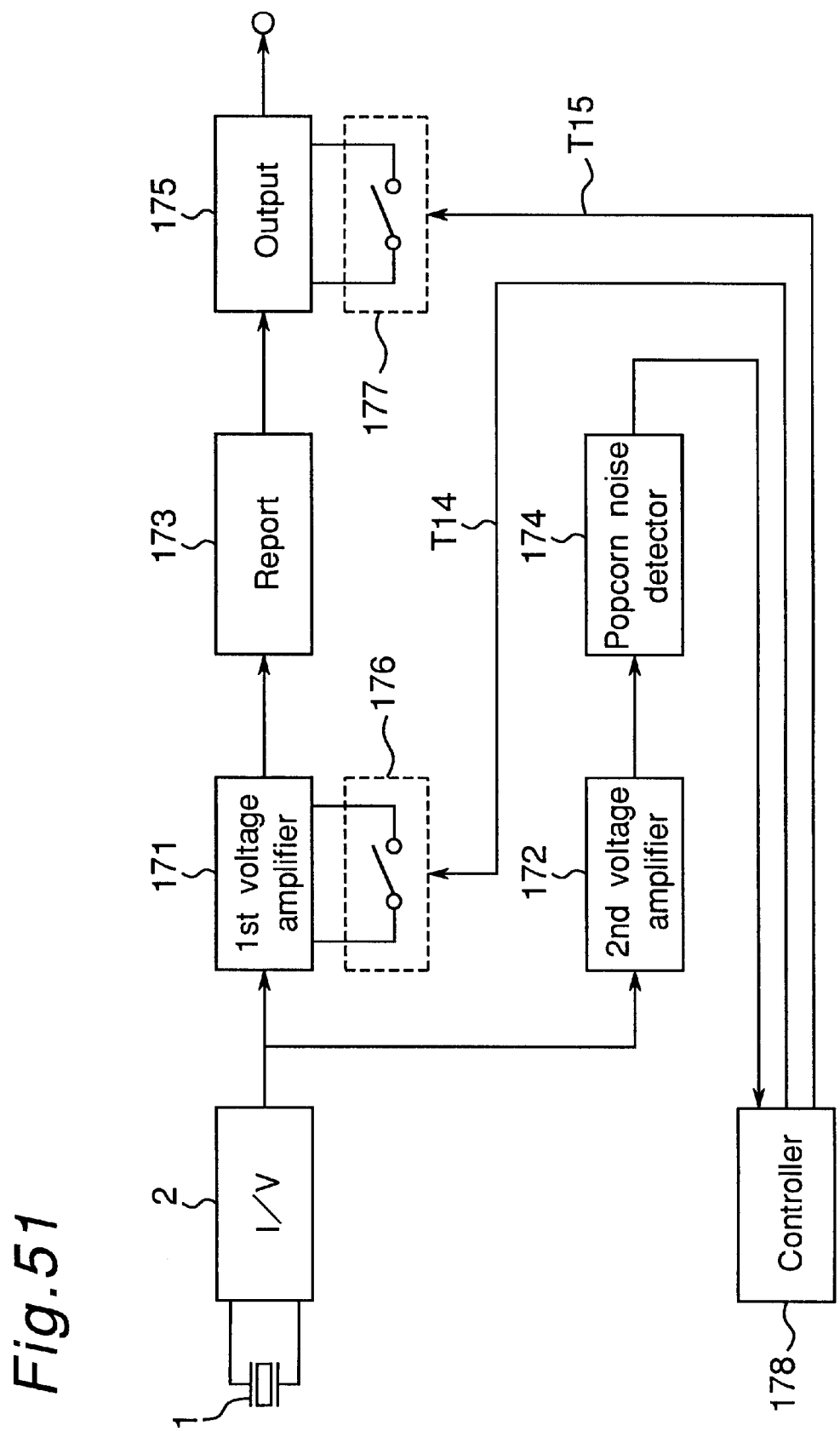
FIG. 51 is a block diagram of an infrared-rays detector of an eighteenth embodiment according to the invention.
Figure 52:
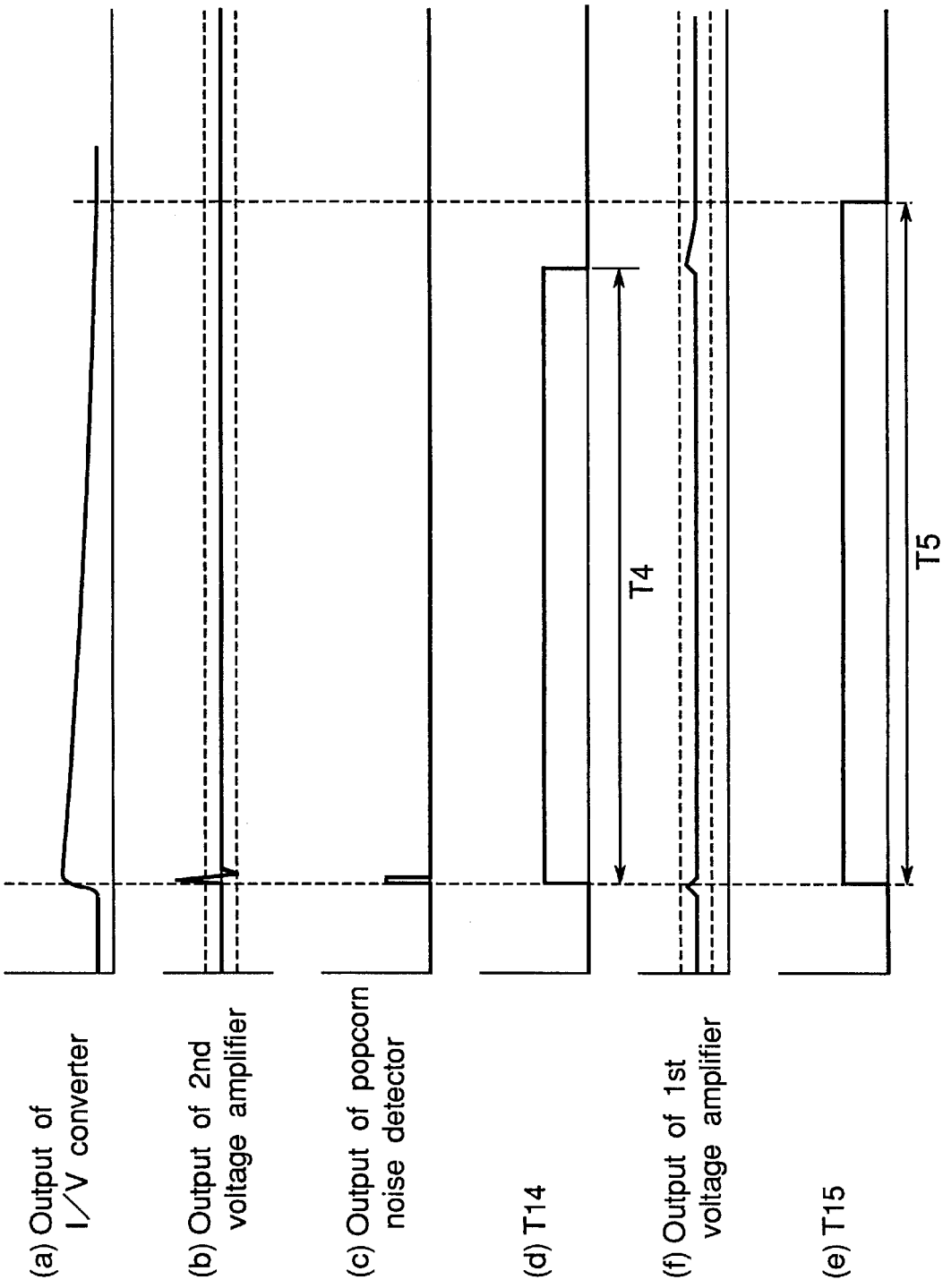
FIG. 52 is a timing chart for illustrating operation of the infrared-rays detector.

FIG. 51 is a block diagram of an infrared-rays detector of an eighteenth embodiment. The infrared-rays detector comprises a pyroelectric element 1, an I/V converter 2, a first voltage amplifier 171, a second voltage amplifier 172, a report section 173, a popcorn noise detector 174, an output circuit 175, a switch circuit 176, another switch circuit 177 and a controller 178 having a timer circuit. The basic structure of the infrared-rays detector is similar to that of the sixteenth embodiment. FIG. 52 is a timing chart for illustrating operation of the infrared-rays detector.

When a popcorn noise detection signal is received from the popcorn noise detector 174, the controller 178 outputs two different timer outputs T14 and T15. The timer output T14 is a pulse signal with a time width T4 to the switch 176, and the timer output T15 is a pulse signal with a time width T5 to the switch 177. The timer output T14 having a pulse with T4, as shown in (d) in FIG. 52, is received by the switch 176 to decrease a gain of the I/V converter 2 over the time T4. The width T4 is set to a few to a few tens seconds in order to deal a sufficiently large popcorn noise signal. As shown in (a) in FIG. 52, when the output of the I/V converter 2 rises and decreases gradually, a decrease in voltage per second is larger as the popcorn noise is larger. Then, if the gain of the first voltage amplifier 171 returns to the original value, the decreasing output signal of the I/V converter 2 may exceeds the threshold value if the popcorn noise is large. In order to prevent such a situation, the time T4 is set sufficiently longer, for example, a few tens seconds.

On the other hand, the timer output T15 having the width T5, as shown in (f) in FIG. 52, is sent to the switch 177 connected to the output circuit 175. The output of the report section 173 is inhibited for the time T5. The time T5 is set longer a little than T4.

As explained above, because the switch circuit is not connected to the I/V converter which needs a very high impedance, the switch circuit can be constructed relatively easily. Further, noises in the output as an effect of the leak current due to the unnecessary connection can be decreased.

Figure 53:
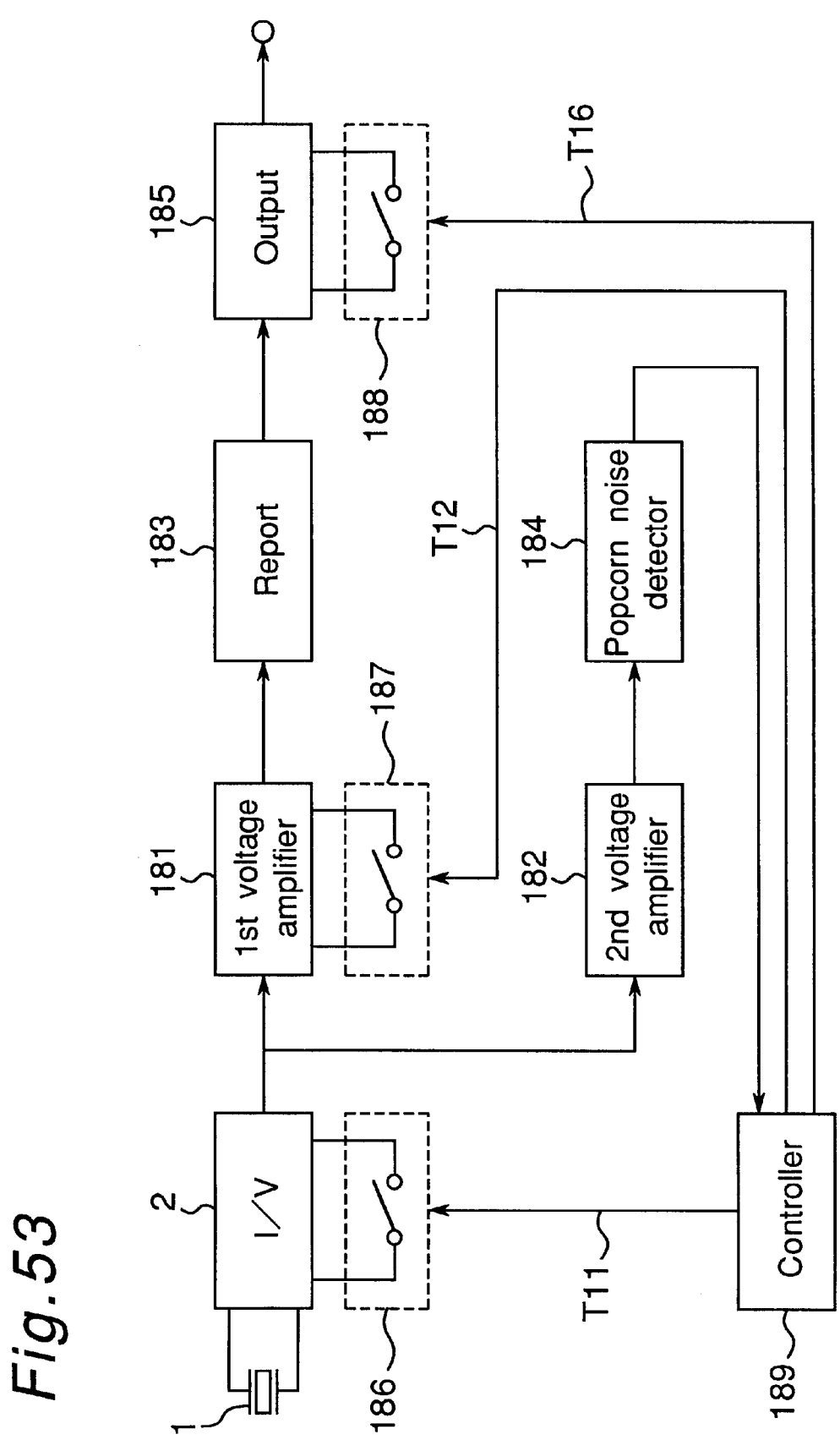
FIG. 53 is a block diagram of an infrared-rays detector of a nineteenth embodiment according to the invention.
Figure 54:
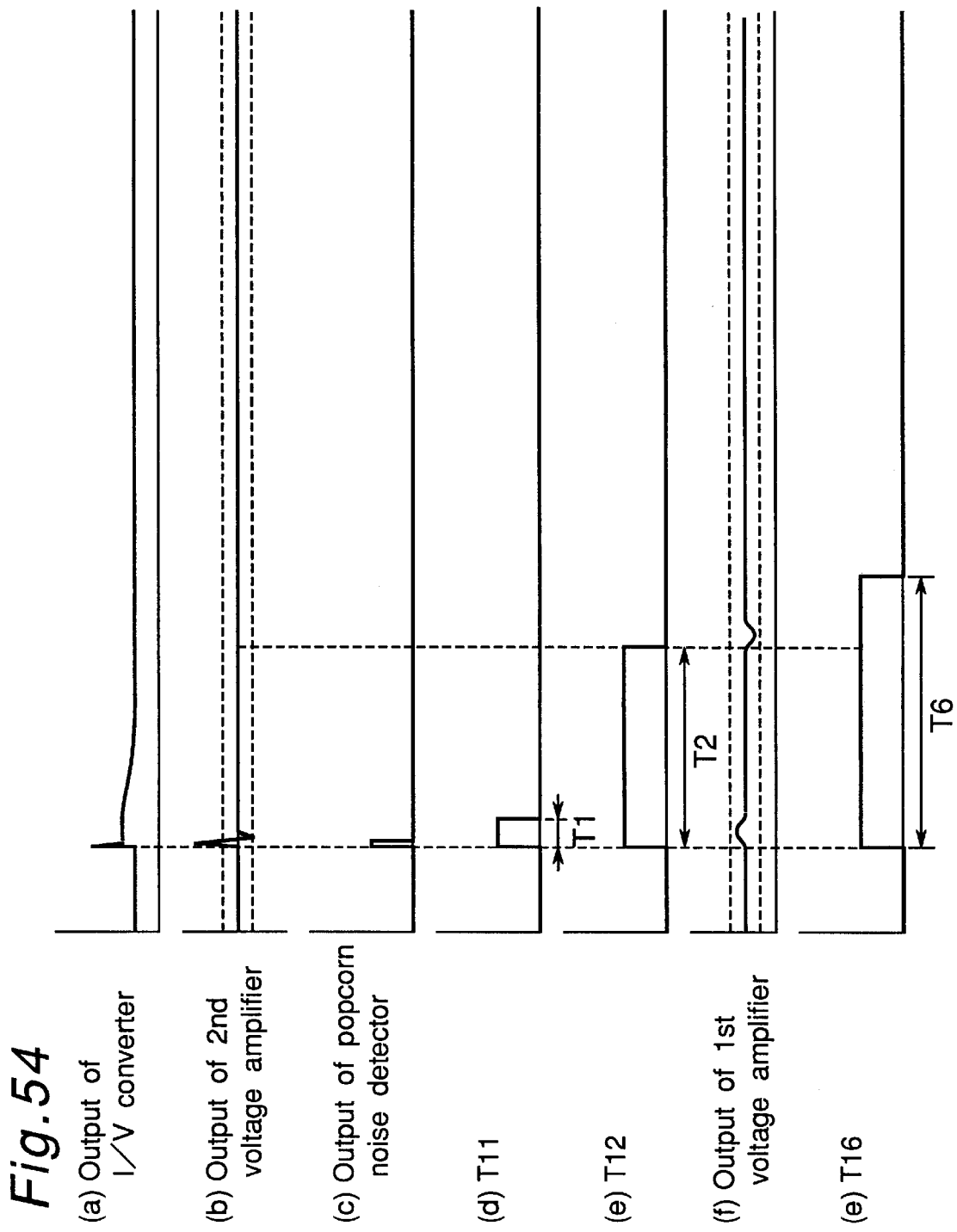
FIG. 54 is a timing chart for illustrating operation of the infrared-rays detector.

An infrared-rays detector of a nineteenth embodiment according to the present invention will be explained below with reference to FIGS. 53 and 54. As shown in FIG. 53, the infrared-rays detector comprises a pyroelectric element 1, an I/V converter 2, a first voltage amplifier 181, a second voltage amplifier 182, a report section 183, a popcorn noise detector 184, an output circuit 185 having a timer circuit, a first switch 186, a second switch 187, a third switch 189. The basic structure of the infrared-rays detector is similar to that of the sixteenth embodiment. FIG. 54 is a timing chart for illustrating operation of the infrared-rays detector.

In the nineteenth embodiment, the controller 189 outputs three different timer outputs T11, T12 and T16. The timer output T11 is a pulse signal with a time width T1 to the switch 186, the timer output T12 is a pulse signal with a time width T2 to the switch 187, and the timer output T16 is a pulse signal with a time width T6 to the switch 188. The pulse signal with a time width T1 is sent to the switch 186 to decrease a gain of the I/V converter 2. The time of T1 is about several milliseconds similarly to the sixteenth and seventeenth embodiments. By decreasing a gain of the I/V converter 2, a step-like output is supplied by the I/V converter 2, irrespective of popcorn noise. The T2 is a pulse of about several milliseconds similarly to the sixteenth embodiment. The pulse is received by the switch 187 to decrease the gain of the first voltage amplifier 181. Then, the output of the first voltage amplifier 181 is affected only by fluctuations of bias voltages of amplifiers therein, and it is sent to the report section 183. The T6 has a pulse width for a time until the signal of the first voltage amplifier 181 becomes stable. Then, the output of the report section 184 is inhibited for the predetermined time according to the pulse signal of T6. Similarly, the time of missing report is shortened similarly, and a false report can be prevented surely.

As explained above, by using a plurality of timer outputs, an erroneous report that existence or movement of a human body is detected can be prevented to be caused by bias voltages in the amplifiers or in the I/V converter or by a popcorn noise which happens before the signal becomes stable. Further, missing of report can be prevented though the detection sensitivity is decreased. Thus, an excellent infrared-rays detector can be provided.

In an infrared-rays detector which detects infrared radiation from a human body and outputs an analog detection signal, fluctuation in the analog output due to popcorn noise can be reduced, but it is difficult to eliminate it completely. Just after a popcorn noise happens, the detector does not respond for a predetermined time. However, it cannot be discriminated from the output signal whether the output signal is controlled due to a popcorn noise or not. Then, it is desirable that the occurrence of a popcorn noise can be discriminated from the analog output of the infrared-rays detector. Embodiments described below solve this problem by outputting a predetermined analog output for the predetermined time.

Figure 55:
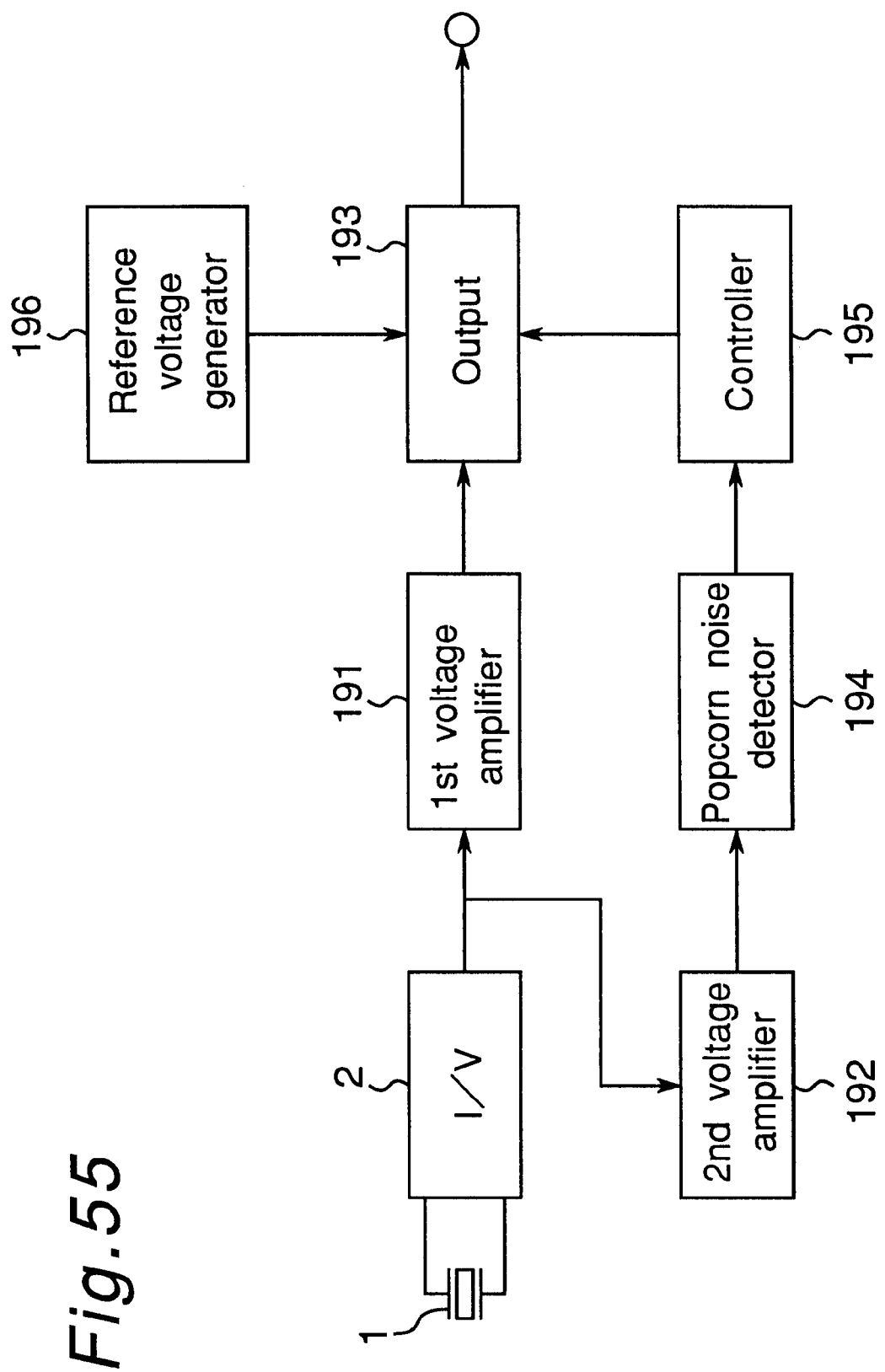
FIG. 55 is a block diagram of an infrared-rays detector of an example of a twentieth embodiment according to the invention.

An infrared-rays detector of a twentieth embodiment according to the present invention will be explained below with reference to FIGS. 55 and 56. As shown in FIG. 55, the infrared-rays detector comprises a pyroelectric element 1, an I/V converter 2, a first voltage amplifier 191, a second voltage amplifier 192, an output circuit 193 having an analog output terminal, a popcorn noise detector 194, a controller 195, and a reference voltage source 196. The infrared-rays detector is fabricated as an integrated circuit, and the reference voltage source 196 is provided to supply a reference voltage generated in the integrated circuit. The reference voltage source 196 is an example of a known signal which can be discriminated easily from the output signal based on the signal detected by the pyroelectric element. The output circuit 193 has a switch which changes the analog output between the reference voltage from the reference voltage source 196 and an input signal from the first voltage amplifier 191.

The pyroelectric element 1 outputs a current in correspondence to infrared rays radiated from a monitor area. The I/V converter 2 converts the detected current outputted from the pyroelectric element 1 to a voltage. The output voltage is supplied to the first voltage amplifier 191 and to the second voltage amplifier 192. The first voltage amplifier 191 amplifiers the input signal from the I/V converter 2 and supplies it to the output circuit 193. The second voltage amplifier 192 has a characteristic as a high-pass filter which transmits frequency components equal to or higher than a few tens Hz. It amplifies the output voltage of the I/V converter 2 at higher frequencies than the first voltage amplifier 191. Then, the popcorn noise can be discriminated from a signal due to movement of a human body. If an output signal of the second voltage amplifier 192 has an amplitude higher than a predetermined level, the popcorn noise detector 194 outputs a popcorn noise detection signal to the controller 195. When the controller 195 receives the popcorn noise detection signal, it outputs an output control signal to the output circuit 193 for a predetermined time. While the output circuit 193 receives the output control signal from the controller 195, it changes an analog output signal so as to supply a predetermined signal different from the output signal from the first voltage amplifier 191.

Figure 56:
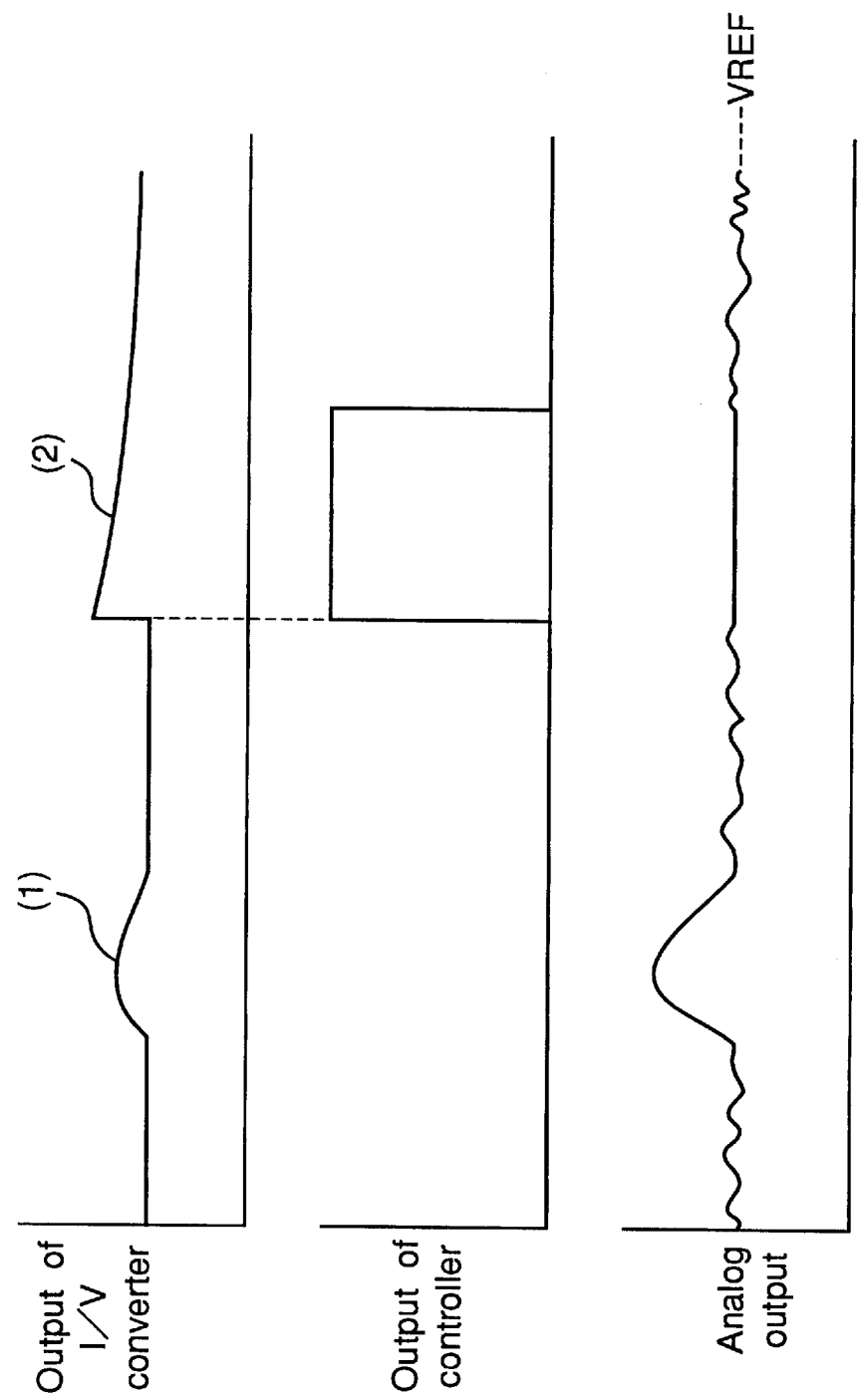
FIG. 56 is a timing chart for illustrating operation of the infrared-rays detector.

FIG. 56 is a timing chart for illustrating operation of the infrared-rays detector. In an example shown in FIG. 56, an output signal (a) of the I/V converter 2 has a first change (1) due to a human body and a second change (2) due to a popcorn noise. FIG. 56 also shows waveforms of an output signal (b) of the controller 195 and a voltage (c) at the analog output of the output circuit 193. While the controller 195 outputs the control signal, the controller 195 changes the analog output to an internal reference voltage VREF supplied by the reference voltage source 196. The output signal from the pyroelectric element 1 is very weak generally, and the gains at the I/V converter 2 and at the first voltage amplifier 191 will be set very high. Then, the output noise cannot be neglected at the analog output in an ordinary state or when no signal is received. On the other hand, when the internal reference voltage VREF is outputted at the analog output, the noise in the signal is negligible if compared with the above-mentioned counterpart in the ordinary state. Therefore, if the output is monitored with a precision higher than an amplitude of the output noise in the ordinary state, the change at the analog output to VREF can be discriminated. That is, the generation of a popcorn noise can be confirmed based on the analog output of the infrared detection apparatus.

Further, when the circuit of the infrared-rays detector is fabricated as an integrated circuit, the internal reference voltage VREF can be monitored at the analog output terminal when the integrated circuit is checked by inputting a signal similar to a popcorn noise. Then, it is not needed to provide a pad for VREF terminal, and the integrated circuit is fabricated compactly.

Figure 57:
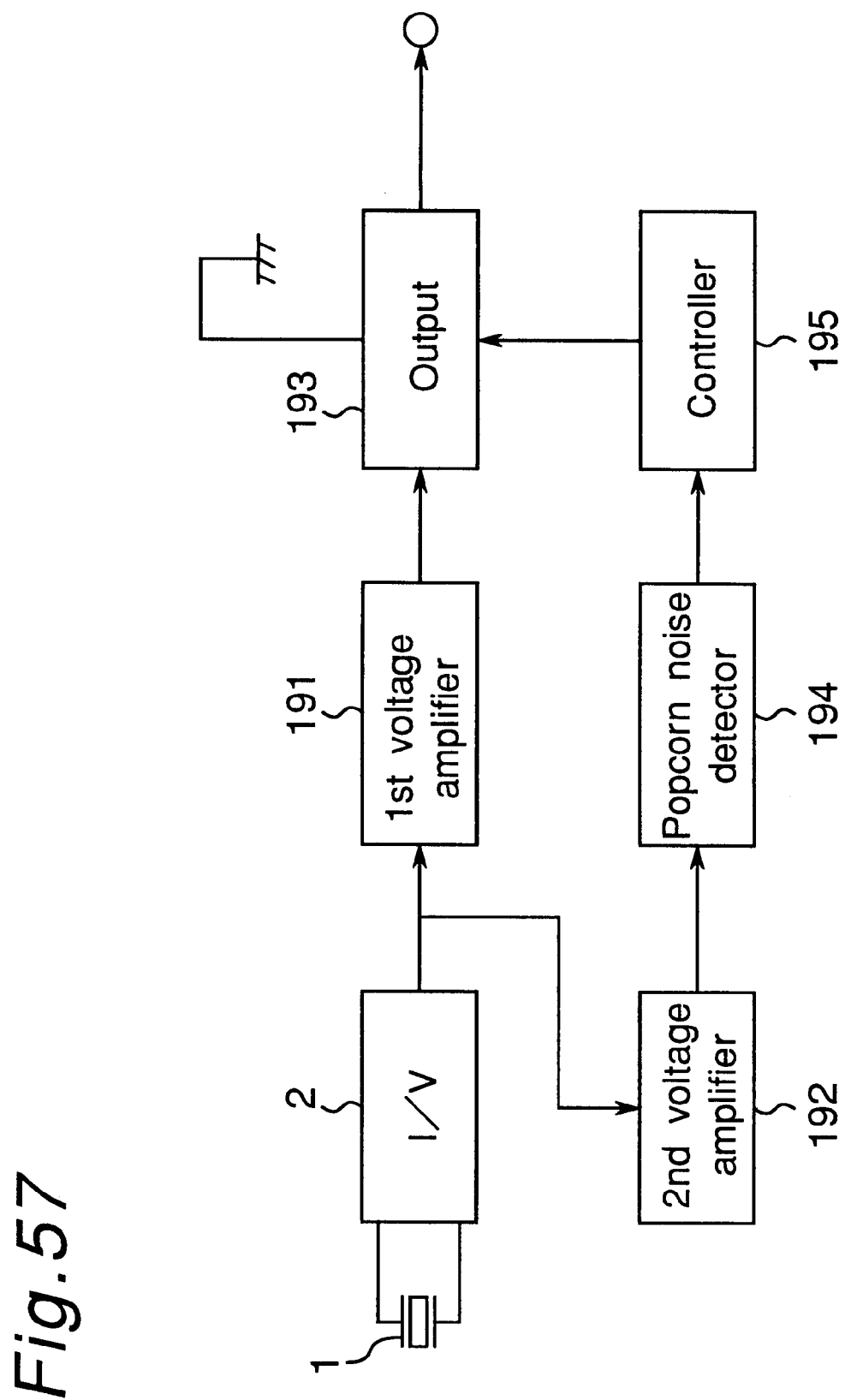
FIG. 57 is a block diagram of an infrared-rays detector of another example of the twentieth embodiment according to the invention.
Figure 58:
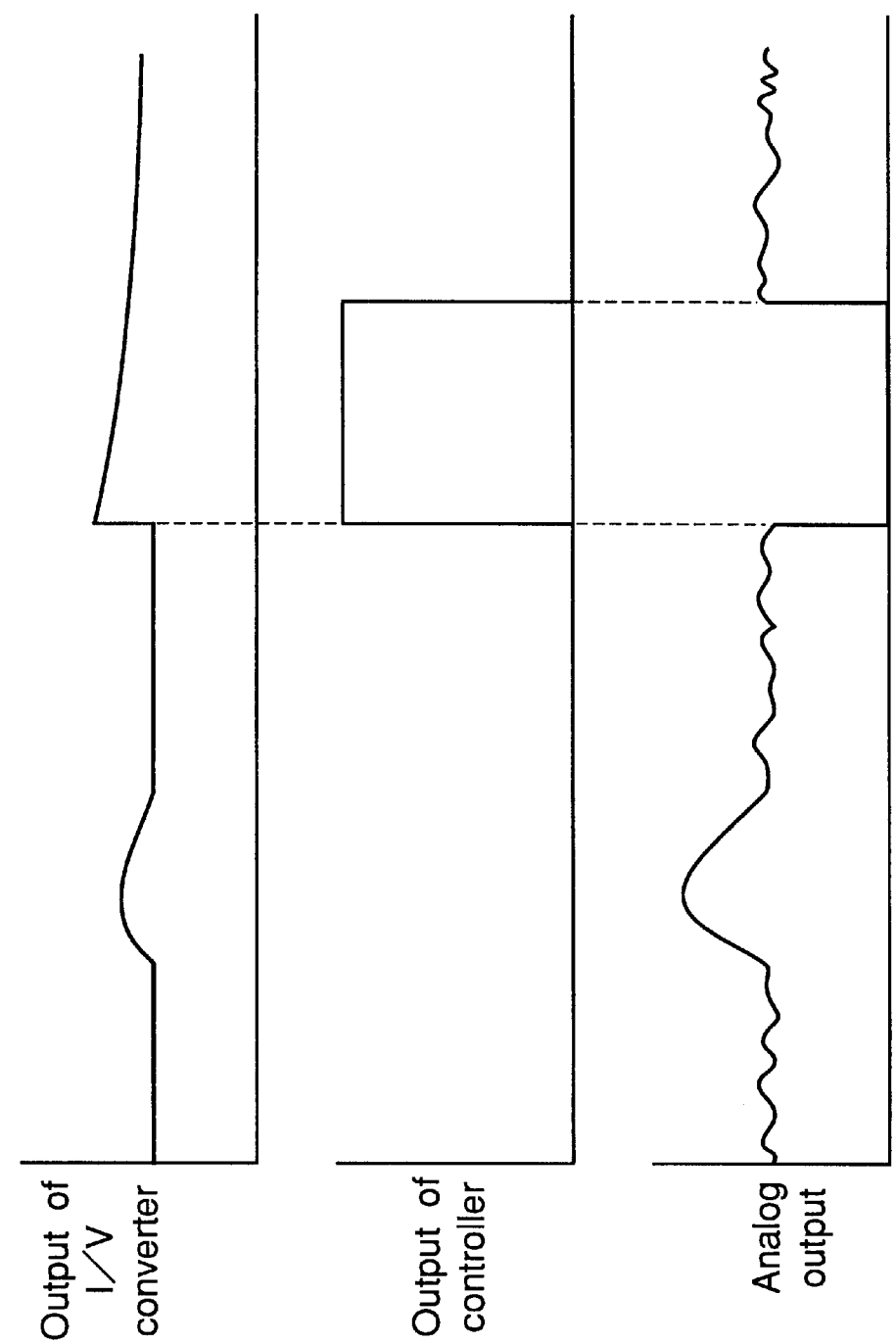
FIG. 58 is a timing chart for illustrating operation of the infrared-rays detector.

An infrared-rays detector of another example of the twentieth embodiment will be explained below with reference to FIGS. 57 and 58. The structure of the infrared-rays detector is similar to that shown in FIG. 55 except the reference voltage source 196. In this example, the ground potential (GND) is supplied to the output circuit 193. When a popcorn noise happens, as shown in (c) in FIG. 58, the output circuit 193 changes the analog output from the input signal from the first voltage amplifier 191 to the ground potential while the controller 195 outputs the control signal. The ground potential is the most stable voltage. Because it exists universally in the circuit of the infrared-rays detector, the infrared-rays detector is realized as a small-scale circuit.

Figure 59:
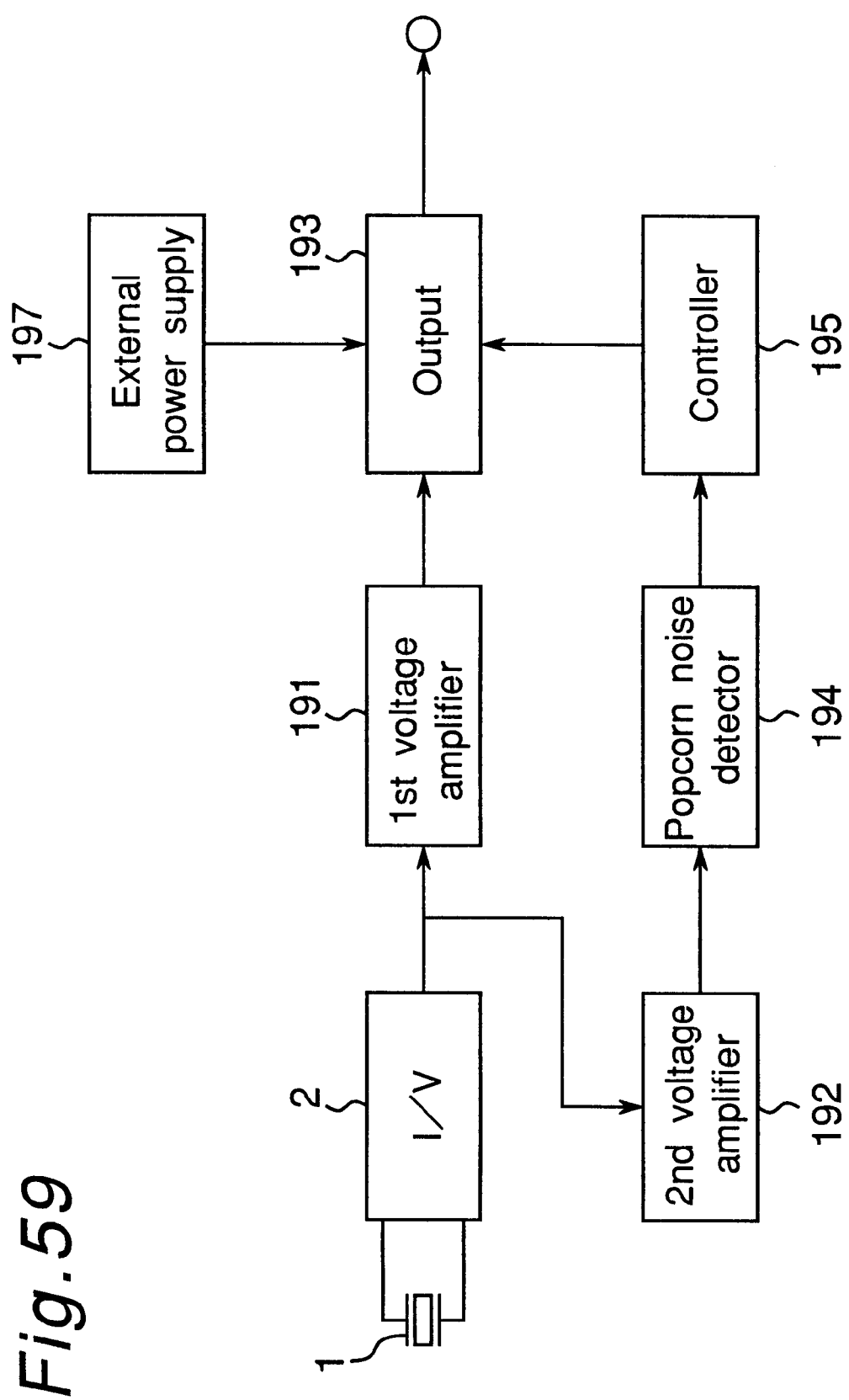
FIG. 59 is a block diagram of an infrared-rays detector of a different example of the twentieth embodiment according to the invention.
Figure 60:
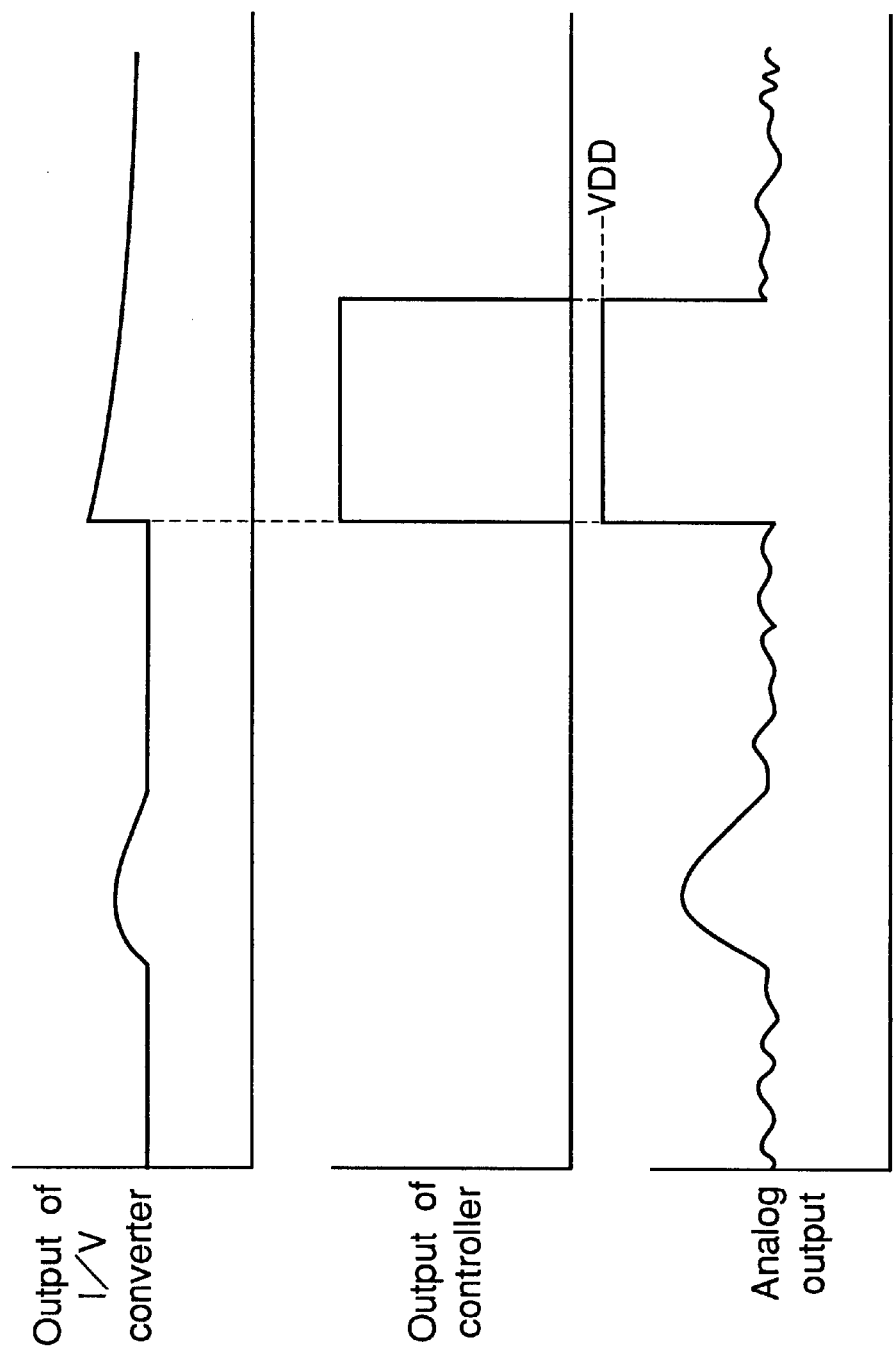
FIG. 60 is a timing chart for illustrating operation of the infrared-rays detector.

An infrared-rays detector of a different example of the twentieth embodiment will be explained below with reference to FIGS. 59 and 60. The structure of the infrared-rays detector is similar to that shown in FIG. 55, but an external supply voltage VDD is supplied to the output circuit 193 from an external power supply 197. When a popcorn noise happens, as shown as (c) in FIG. 60, the output circuit 193 changes the analog output from the input signal from the first voltage amplifier 191 to the external supply voltage VDD while the controller 195 outputs the control signal. The external supply voltage VDD is supplied by the power supply 197 for the infrared-rays detector. The operation becomes more surely because the analog output is changed to the external supply voltage VDD but the analog output usually does not exceed the internal supply voltage VCC (<VDD).

Figure 61:
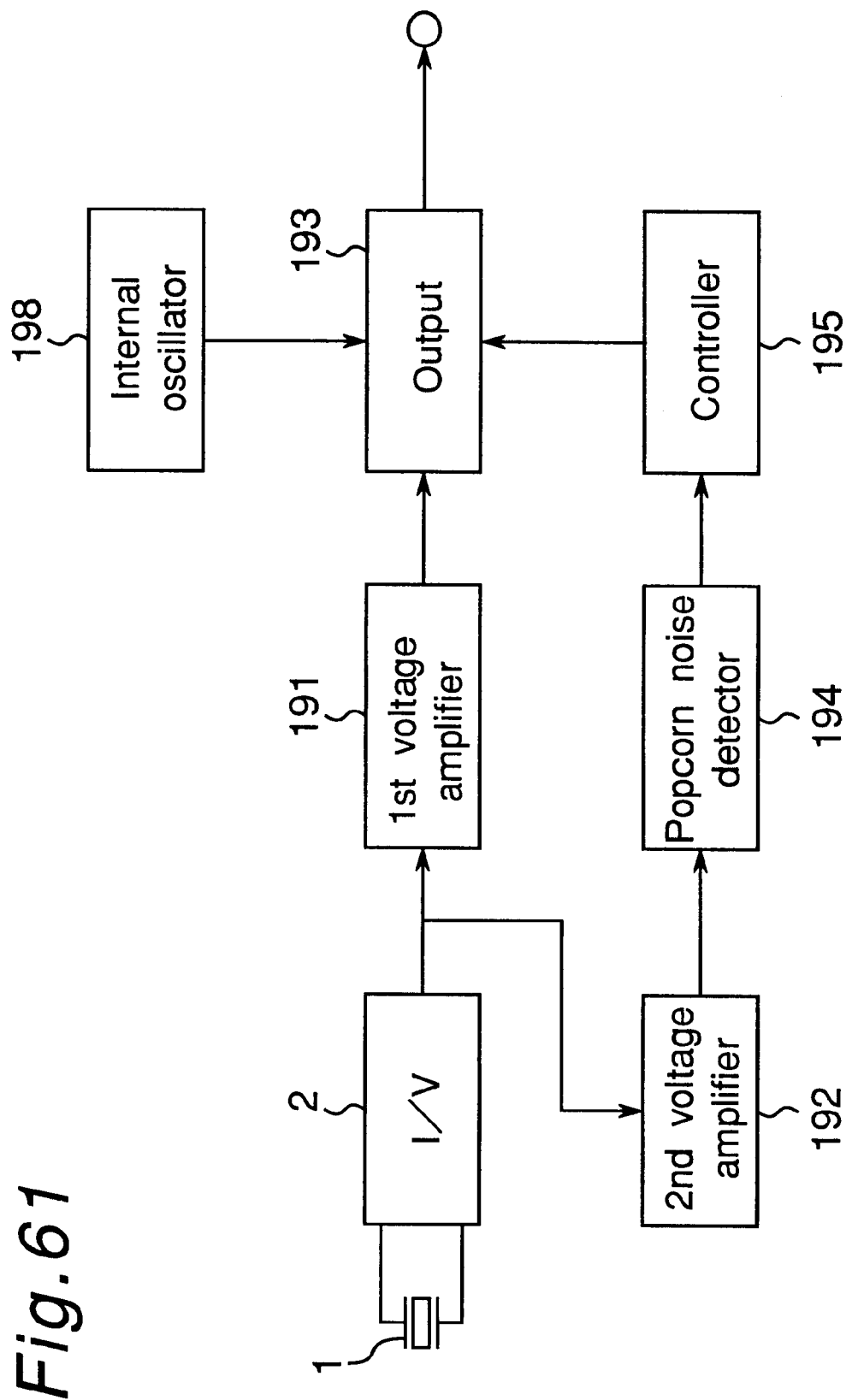
FIG. 61 is a block diagram of an infrared-rays detector of a still different example of the twentieth embodiment according to the invention.
Figure 62:
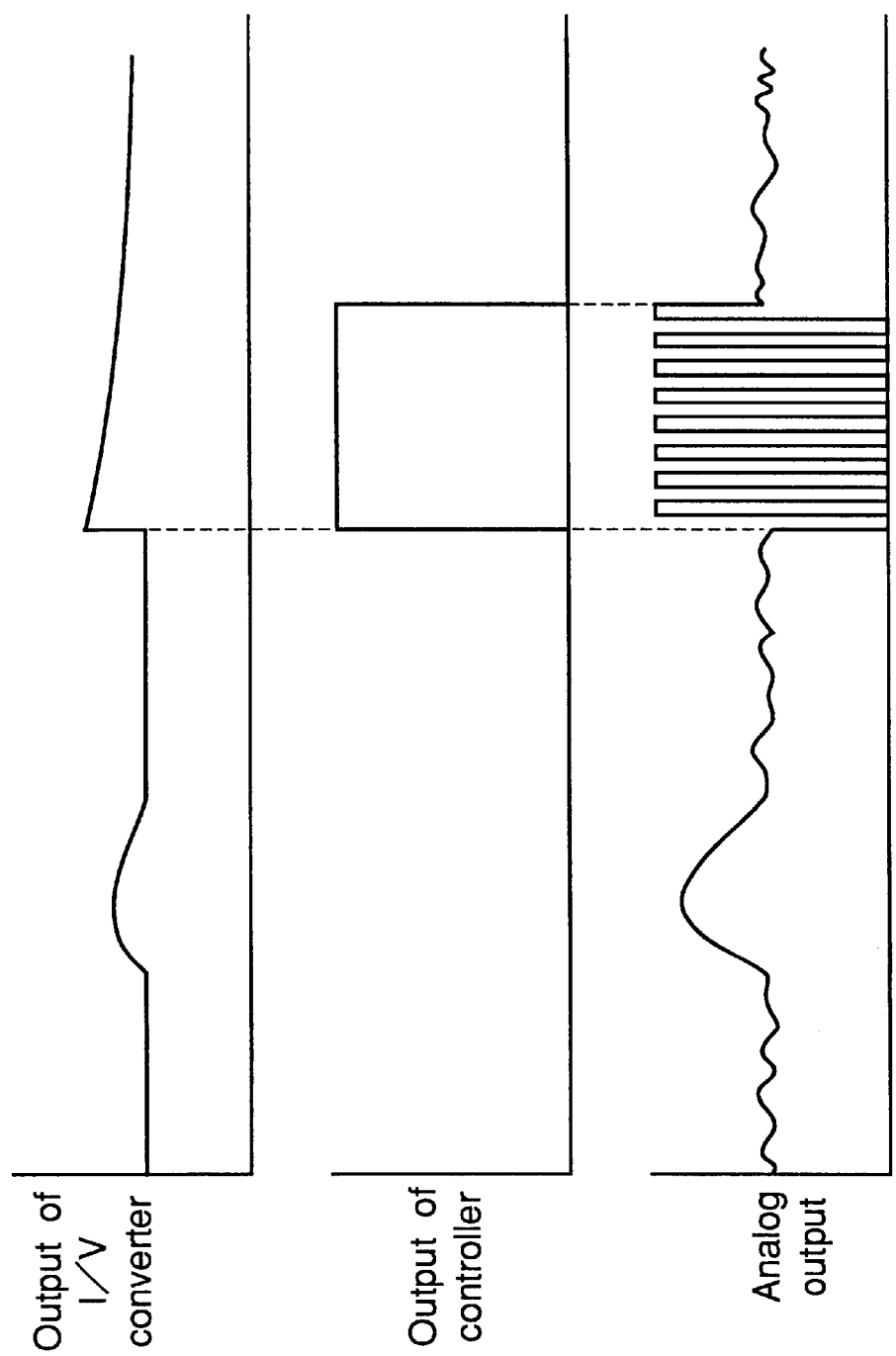
FIG. 62 is a timing chart for illustrating operation of the infrared-rays detector.

An infrared-rays detector of a still different example of the twentieth embodiment will be explained below with reference to FIGS. 61 and 62. The structure of the infrared-rays detector is similar to that shown in FIG. 55, but an oscillator 198 is connected to the output circuit 193 to supply an oscillating signal. When a popcorn noise happens, as shown in (c) in FIG. 62, the output circuit 193 changes the analog output from the input voltage from the first voltage amplifier 191 to an output of the oscillator 198 while the controller 192 outputs the control signal. Because the exclusive oscillator 198 is used, the analog output has a voltage not generated erroneously, and the operation becomes more surely. It is also advantageous that the oscillation signal can be used in a circuit following the analog output terminal of the infrared-rays detector.

Figure 63:
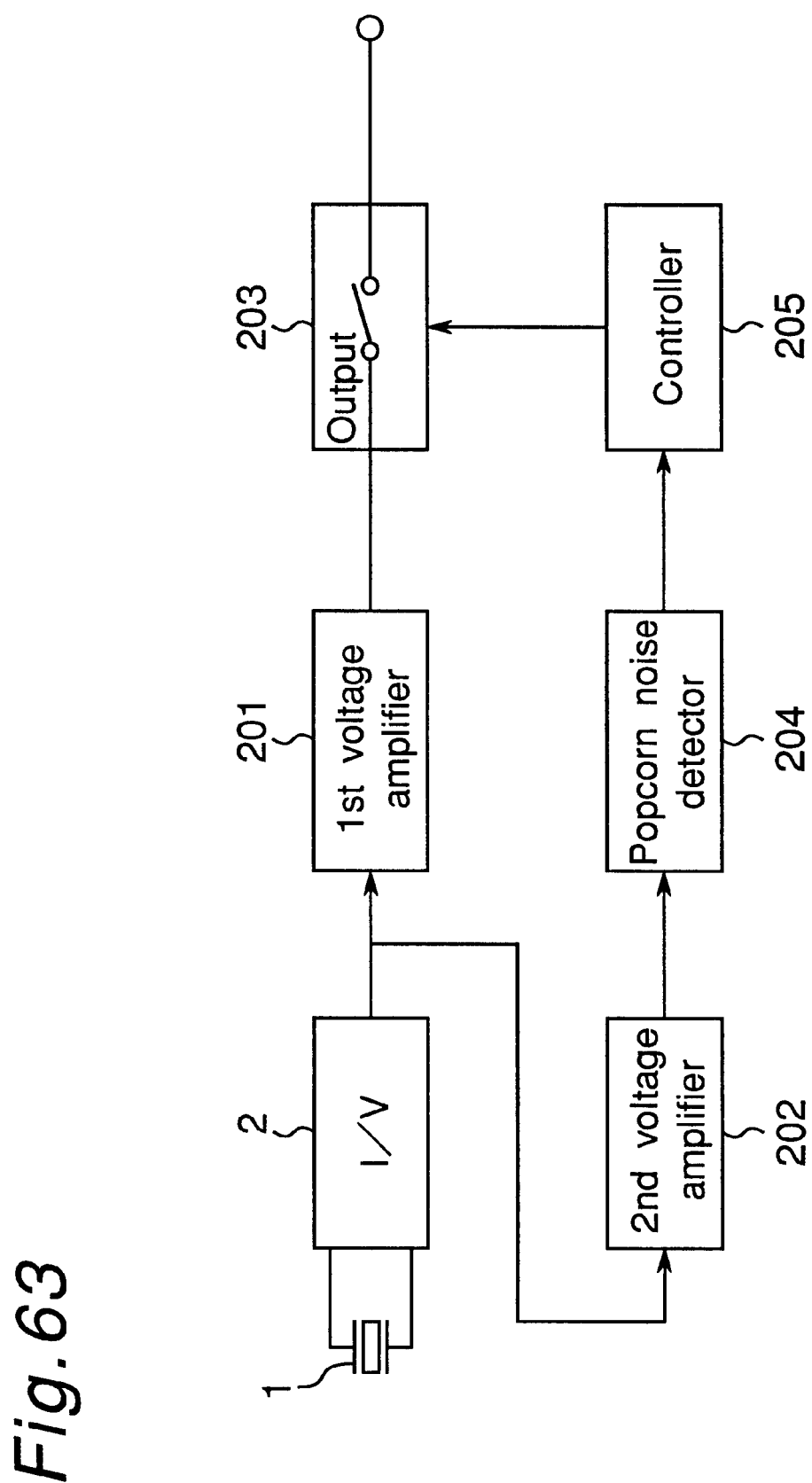
FIG. 63 is a block diagram of an infrared-rays detector of a twenty-first embodiment according to the invention.
Figure 64:
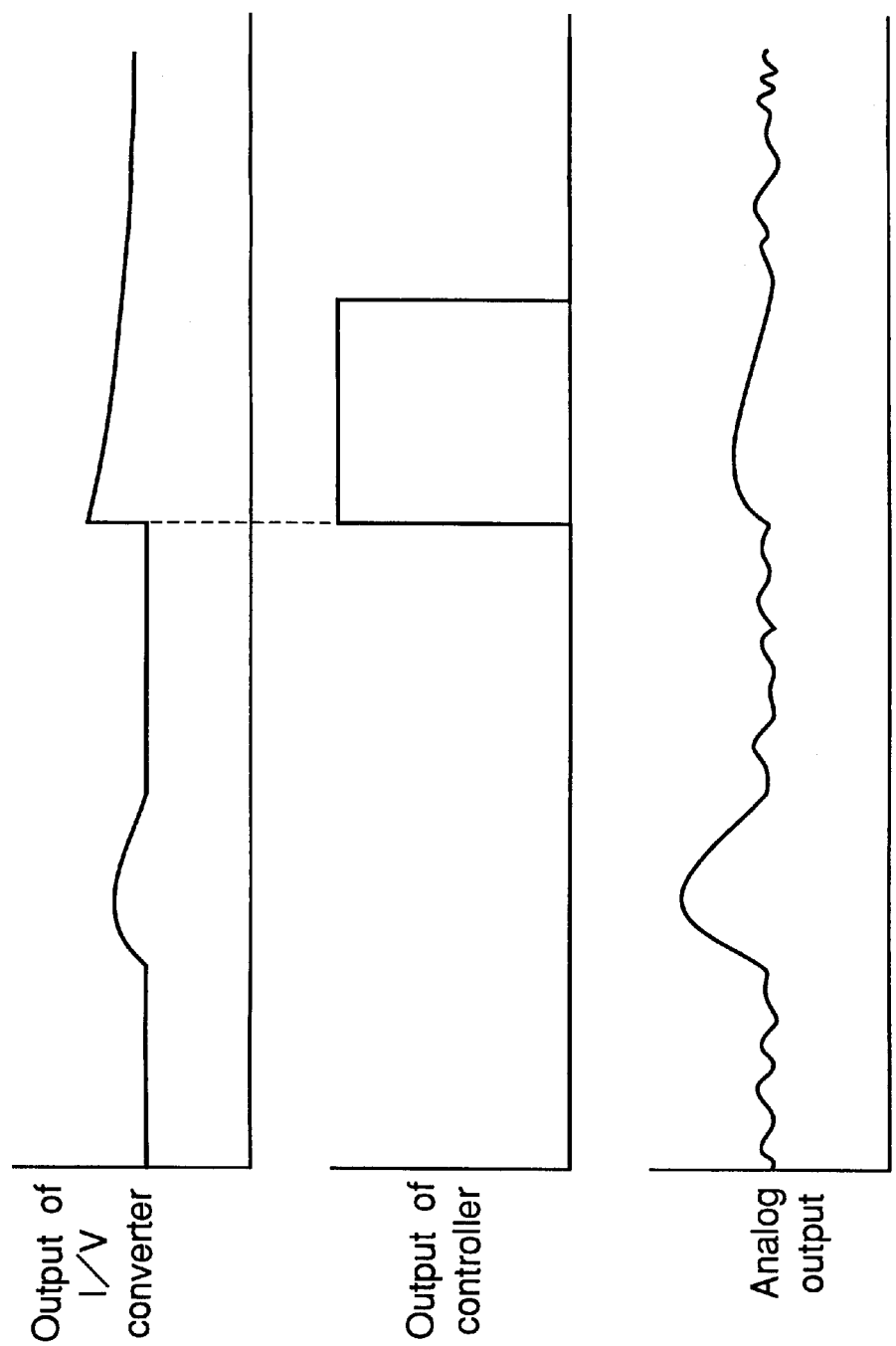
FIG. 64 is a timing chart for illustrating operation of the infrared-rays detector.

An infrared-rays detector of a twenty-first embodiment will be explained below with reference to FIGS. 63 and 64. As shown in FIG. 63, the infrared-rays detector comprises a pyroelectric element 1, an I/V converter 2, a first voltage amplifier 201, a second voltage amplifier 202, an output circuit 203, a popcorn noise detector 204, and a controller 205 having an analog output terminal. The output circuit 203 has a switch. The switch is opened for a predetermined time when the popcorn noise detector 204 outputs a popcorn detection signal and the controller 205 outputs a control signal. As shown in (c) in FIG. 61, when a popcorn noise happens, the controller 205 supplies a control signal to open the switch in the output circuit 193. Because the switch is opened, the analog output outputted through the switch is changed to have a high impedance. The opening of the switch is one means to realize a high impedance state. When the output signal of the output circuit 193 has a high impedance, a user can set the analog output terminal to a desired voltage, for example, to pull down or pull up the voltage at the analog output terminal. Then, the generation of popcorn noise is discriminated from the output signal.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An infrared-rays detector comprising:

a pyroelectric element which intermittently outputs a first current characteristic of noise caused by ambient conditions, and which outputs a second current different from the first current in the presence of a human body;

a current-to-voltage converter which converts current from said pyroelectric element to a voltage signal, said current-to-voltage converter intermittently outputting a first waveform corresponding to said first current, and outputting a second waveform corresponding to said second current and different from said first waveform in the presence of a human body; and a signal processor which performs waveform analysis on the voltage signal received from said current-to-voltage converter and outputs a detection signal when the second waveform generated by a human body is detected by the waveform analysis but does not output a detection signal when the first waveform is detected by the waveform analysis.

2. The infrared-rays detector according to claim 1, wherein said signal processor comprises:

an amplifier which amplifies the voltage signal received from said current-to-voltage converter;

a frequency analyzer which performs frequency analysis on an output signal of said amplifier; and a decision circuit which detects a waveform generated by a human body based on frequency components obtained by said frequency analyzer.

3. The infrared-rays detector according to claim 1, wherein said signal processor comprises:

a first amplifier which amplifies the voltage signal received from said current-to-voltage converter in a frequency range;

a second amplifier which amplifies the voltage signal received from said current-to-voltage converter in a frequency range different from that of said first amplifier; and a dicision circuit which detects the waveform generated by a human body according to a ratio of amplitude levels of output signals of said first and second amplifiers.

4. The infrared-rays detector according to claim 1, wherein said signal processor comprises:

a first amplifier which amplifies the voltage signal received from said current-to-voltage converter in a frequency range;

a second amplifier which amplifies the voltage signal received from said current-to-voltage converter in a frequency range different from that of said first amplifier;

a first comparator which compares an output signal of said first amplifier with a first threshold level;

a second comparator which compares an output signal of said second amplifier with a second threshold level; and a decision circuit which detects the waveform generated by a human body according to comparison signals of said first and second comparators.

5. The infrared-rays detector according to claim 1, wherein said signal processor comprises:

an amplifier which amplifies the voltage signal received from said current-to-voltage converter;

a frequency analyzer which performs frequency analysis on an output signal of said amplifier;

a decision circuit which detects the waveform generated by a human body according to time dependence of a result of the frequency analysis by said frequency analyzer.

6. The infrared-rays detector according to claim 1, wherein said signal processor comprises:

an amplifier which amplifies the voltage signal received from said current-to-voltage converter;

a comparator which compares an output signal of said first amplifier with a threshold level; and a decision circuit which detects the waveform generated by a human body according to a length of time when said comparator detects that an output of said amplifier exceeds the threshold level.

7. The infrared-rays detector according to claim 1, wherein said signal processor comprises:

a first amplifier which amplifies the voltage signal received from said current-to-voltage converter in a frequency range;

a second amplifier which amplifies the voltage signal received from said current-to-voltage converter in a frequency range different from that of said first amplifier;

a first comparator which compares an output signal of said first amplifier with a first threshold level;

a second comparator which compares an output signal of said second amplifier with a second threshold level; and a decision circuit which measures pulse widths of output signals of said first and second comparators and detects the waveform generated by a human body according to the two pulse widths.

8. The infrared-rays detector according to claim 1, wherein said signal processor comprises:

an amplifier which amplifies the voltage signal received from said current-to-voltage converter; and a decision circuit which measures a rise time of an output signal of said amplifier and detects the waveform generated by a human body according to the rise time.

9. The infrared-rays detector according to claim 1, wherein said signal processor comprises:

a first amplifier which amplifies the voltage signal received from said current-to-voltage converter with a first band-pass filter characteristic having a center of transmission band at a first frequency;

an output circuit which compares an output signal of said first amplifier with a predetermined threshold to output the detection signal;

a second amplifier which amplifies the voltage signal received from said current-to-voltage converter with a second band-pass filter characteristic having a center of transmission band at a second frequency higher than the first frequency;

a popcorn noise detector which compares an output signal of said second amplifier with a threshold value to output a popcorn detection signal; and a controller which controls at least one of said current-to-voltage converter, said first amplifier, said output circuit, said second amplifier and said popcorn noise detector to prevent that said controller outputs the detection signal when the popcorn detection signal is received from said popcorn noise detector.

10. The infrared-rays detector according to claim 9, wherein said controller decreases a gain of said current-to-voltage converter for a first predetermined time and a gain of said first amplifier for a second predetermined time longer than the first one when the popcorn detection signal is received from said popcorn noise detector.

11. The infrared-rays detector according to claim 9, wherein said controller decreases a gain of said current-to-voltage converter for a first predetermined time and prevents for said output circuit to provide an output signal for a second predetermined time longer than the first one when the popcorn detection signal is received from said popcorn noise detector.

12. The infrared-rays detector according to claim 9, wherein said controller decreases a gain of said first amplifier for a first predetermined time and prevents for said output circuit to provide an output signal for a second predetermined time longer than the first one when the popcorn detection signal is received from said popcorn noise detector.

13. The infrared-rays detector according to claim 9, wherein said controller decreases a gain of said current-to-voltage converter for a first predetermined time and a gain of said first amplifier for a second predetermined time longer than the first one and prevents for said output circuit to provide an output signal for a third predetermined time longer than the second one when the popcorn detection signal is received from said popcorn noise detector.

14. The infrared-rays detector according to claim 9, wherein said controller decreases a gain of said current-to-voltage converter for a predetermined time when the popcorn detection signal is received from said popcorn noise detector.

15. The infrared-rays detector according to claim 9, wherein said controller decreases a gain of said first amplifier for a predetermined time when the popcorn detection signal is received from said popcorn noise detector.

16. The infrared-rays detector according to claim 9, wherein said controller decreases an output signal of said output circuit for a predetermined time when the popcorn detection signal is received from said popcorn noise detector.

17. The infrared-rays detector according to claim 9, wherein said controller prevents for said first amplifier to receive an input signal for a predetermined time when the popcorn detection signal is received from said popcorn noise detector.

18. The infrared-rays detector according to claim 9, wherein said controller decreases a sensitivity to detect a popcorn signal for a predetermined time when the popcorn detection signal is received from said popcorn noise detector.

19. The infrared-rays detector according to claim 9, wherein said controller decreases a gain of said second amplifier for a predetermined time when the popcorn detection signal is received from said popcorn noise detector.

20. The infrared-rays detector according to claim 9, wherein said controller decreases a sensitivity to detect a popcorn signal by increasing a threshold of said popcorn detector for a predetermined time when the popcorn detection signal is received from said popcorn noise detector.

21. The infrared-rays detector according to claim 9. wherein said controller controls said output circuit to output a signal different from the output signal of said first voltage amplifier for a predetermined time when the popcorn detection signal is received from said popcorn noise detector.

22. The infrared-rays detector according to claim 21, wherein the infrared-rays detector is fabricated as an integrated circuit, and the signal different from the output signal of said first voltage amplifier is a reference electric potential.

23. The infrared-rays detector according to claim 21, wherein the signal different from the output signal of said first voltage amplifier is a ground potential in a circuit of the infrared-rays detector.

24. The infrared-rays detector according to claim 21, further comprising an external electric source for driving the infrared-rays detector, wherein the signal different from the output signal of said first voltage amplifier is a potential supplied by the external electric source to said controller.

25. The infrared-rays detector according to claim 21, further comprising an oscillator, wherein an output signal of said oscillator is supplied to said controller and the signal different from the detection signal is the output voltage of said oscillator.

26. The infrared-rays detector according to claim 21, wherein said controller comprises a switch for suppplying the detection signal, and an output signal of said switch has high impedance for a predetermined time when the popcorn detection signal is received from said popcorn noise detector.

* * * * *

UNITED STATES PATENT AND TRADEMARK OFFICE
CERTIFICATE OF CORRECTION

PATENT NO.     : 6,313,462 B1
DATED          : November 6, 2001
INVENTOR(S)    : H. Matsuda et al.

It is certified that error appears in the above-identified patent and that said Letters Patent is hereby corrected as shown below:

<u>Column 26,</u>
Line 17, "dicision" should be -- decision --.

Signed and Sealed this

Fourth Day of June, 2002

Attest:

Attesting Officer

JAMES E. ROGAN
*Director of the United States Patent and Trademark Office*